(12) United States Patent
Ouchi et al.

(10) Patent No.: US 10,505,703 B2
(45) Date of Patent: Dec. 10, 2019

(54) TERMINAL DEVICE, BASE STATION APPARATUS AND METHOD

(71) Applicant: Sharp Kabushiki Kaisha, Osaka-shi, Osaka (JP)

(72) Inventors: Wataru Ouchi, Osaka (JP); Tatsushi Aiba, Osaka (JP); Kimihiko Imamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/032,069

(22) PCT Filed: Oct. 31, 2014

(86) PCT No.: PCT/JP2014/079060
§ 371 (c)(1),
(2) Date: Apr. 26, 2016

(87) PCT Pub. No.: WO2015/064738
PCT Pub. Date: May 7, 2015

(65) Prior Publication Data
US 2016/0301515 A1  Oct. 13, 2016

(30) Foreign Application Priority Data
Nov. 1, 2013  (JP) .................. 2013-227800

(51) Int. Cl.
*H04L 5/14* (2006.01)
*H04L 5/22* (2006.01)
(Continued)

(52) U.S. Cl.
CPC .......... *H04L 5/1469* (2013.01); *H04L 5/0055* (2013.01); *H04L 5/0057* (2013.01);
(Continued)

(58) Field of Classification Search
CPC ....... H04L 5/1469; H04L 5/22; H04L 5/0073; H04L 5/0057; H04L 27/2602;
(Continued)

(56) References Cited

U.S. PATENT DOCUMENTS

2013/0114455 A1 * 5/2013 Yoo .................. H04W 24/00
370/252
2013/0242902 A1 * 9/2013 Liu .................. H04W 24/10
370/329

(Continued)

FOREIGN PATENT DOCUMENTS

JP  2012-222430 A  11/2012
WO  2013/070870 A2  5/2013
(Continued)

OTHER PUBLICATIONS

Official Communication issued in International Patent Application No. PCT/JP2014/079060, dated Feb. 3, 2015.
(Continued)

*Primary Examiner* — Shailendra Kumar
(74) *Attorney, Agent, or Firm* — Keating & Bennett, LLP

(57) ABSTRACT

Provided is a terminal device that communicates with a base station apparatus and that includes: a reception unit that receives first information relating to a configuration of enhanced interference management and traffic adaptation (eIMTA) and second information relating to a channel state information (CSI) subframe set, through higher layer signaling; and a transmission unit that drops a CSI report which uses a physical uplink control channel (PUCCH) considering priorities among subframe sets in a case where, in the second information, a first CSI subframe set and a second CSI subframe set are configured.

6 Claims, 4 Drawing Sheets

(51) Int. Cl.
*H04L 5/00* (2006.01)
*H04W 72/04* (2009.01)
*H04W 72/12* (2009.01)
*H04L 27/26* (2006.01)

(52) U.S. Cl.
CPC ........ *H04L 5/0073* (2013.01); *H04L 27/2602* (2013.01); *H04W 72/042* (2013.01); *H04W 72/0413* (2013.01); *H04W 72/0446* (2013.01); *H04W 72/1226* (2013.01); *H04L 5/0044* (2013.01); *H04L 5/22* (2013.01)

(58) Field of Classification Search
CPC ............... H04L 5/0055; H04L 5/0044; H04W 72/0446; H04W 72/042; H04W 72/0413; H04W 72/1226
See application file for complete search history.

(56) References Cited

U.S. PATENT DOCUMENTS

| | | | | |
|---|---|---|---|---|
| 2013/0322376 | A1* | 12/2013 | Marinier | H04W 72/06 370/329 |
| 2014/0029971 | A1 | 1/2014 | Pingel et al. | |
| 2014/0044109 | A1 | 2/2014 | Nogami et al. | |
| 2014/0293844 | A1* | 10/2014 | Meng | H04L 5/1438 370/280 |
| 2014/0341051 | A1* | 11/2014 | Gaal | H04W 24/10 370/252 |
| 2015/0029971 | A1 | 1/2015 | Nishio et al. | |
| 2016/0381587 | A1* | 12/2016 | Alexey | H04W 24/10 370/329 |
| 2018/0139751 | A1* | 5/2018 | Park | H04W 52/06 |

FOREIGN PATENT DOCUMENTS

| | | |
|---|---|---|
| WO | 2013/132774 A1 | 9/2013 |
| WO | 2013/145787 A1 | 10/2013 |

OTHER PUBLICATIONS

Ericsson et al., "On standardization impact of TDD UL-DL adaptation", 3GPP TSG-RAN WG1 #69, R1-122016, May 21-25, 2012, pp. 1-3.

Sharp, "Signaling of dynamic TDD UL-DL reconfiguration", 3GPP TSG-RAN WG1 #72bis, R1-131383, Apr. 15-19, 2013, pp. 1-3.

"3rd Generation Partnership Project; Technical Specification Group Radio Access Network; Evolved Universal Terrestrial Radio Access (E-UTRA); Physical Layer procedures (Release 11)", 3GPP TS 36.213 V11.1.0, Dec. 2012, pp. 1-160.

LG Electronics, "CSI Measurement and Report for TDD eIMTA", 3GPP TSG RAN WG1 Meeting #74, R1-133364, Aug. 19-23, 2013, 6 pages.

Samsung, "UCI Payload Aspects for eIMTA", 3GPP TSG RAN WG1 #74bis, R1-134155, Oct. 7-11, 2013, 4 pages.

Sharp, "Enhancements of DL CSI measurements for eIMTA", 3GPP TSG RAB WG1 Meeting #74, R1-133227, Aug. 19-23, 2013, 16 pages.

* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Special subframe | U Uplink subframe | D Downlink subframe

TERMINAL DEVICE, BASE STATION APPARATUS AND METHOD

TECHNICAL FIELD

The present invention relates to a wireless communication system, a terminal device, a base station apparatus, a wireless communication method, and an integrated circuit.

This application claims the benefit of Japanese Patent Application 2013-227800 filed on Nov. 1, 2013, the entire contents of which are incorporated herein by reference.

BACKGROUND ART

In communication systems approved by Third Generation Partnership Project (3GPP), such as Wideband Code Division Multiple Access (WCDMA) (a registered trademark), Long Term Evolution (LTE), and LTE-Advanced (LTE-A), or in communication systems approved by the Institute of Electrical and Electronics Engineers (IEEE), such as Wireless LAN and Worldwide Interoperability for Microwave Access (WiMAX), a base station apparatus (a cell, a first communication apparatus (a communication apparatus that is different from a terminal device), or an eNodeB) and a terminal device (a mobile terminal, a mobile station apparatus, a second communication apparatus (a communication device that is different from the base station apparatus), or user equipment (UE)) each include multiple transmit and receive antennas, and spatially multiplex a data signal and realize high-speed data communication by using a Multi Input Multi Output (MIMO) technology.

In LTE, in some cases, the base station apparatus is also referred to as an evolved NodeB (eNodeB) and the terminal device is also referred to as user equipment (UE). Furthermore, LTE is a cellular communication system in which an area is divided in a cellular pattern into multiple cells, each being served by the base station apparatus. A single base station apparatus may manage multiple cells.

In the communication system, in order to realize the data communication between the base station apparatus and the terminal device, the base station apparatus needs to perform various control processes on the terminal device. Accordingly, the base station apparatus notifies the terminal device of control information using a prescribed resource, and thus performs the data communication for downlink and uplink. For example, the base station apparatus notifies the terminal device of resource allocation information, modulation information on and coding information on the data signal, information on the number of times that spatial multiplexing is performed on the data signal, transmit power control information, and the like, and thus realizes the data communication.

The communication system supports time division duplex (TDD). LTE that employs a TDD scheme is also referred to as TD-LTE or LTE TDD. TDD is a technology that makes downlink and uplink communication possible in a single frequency band (a carrier frequency or a component carrier) by spatially multiplexing an uplink signal and a downlink signal.

In 3GPP, it is considered that a traffic adaptation technology and an interference reduction technology (DL-UL interference management and traffic adaptation), in both of which according to an uplink traffic and a downlink traffic, a ratio between an uplink resource and a downlink resource is changed are applied to TD-LTE (NPL 1).

CITATION LIST

Non Patent Literature

NPL 1: "On standardization impact of TDD UL-DL adaptation", R1-122016, 3GPP TSG-RAN WG1 Meeting #69, Prague, Czech Republic, 21st to 25 May 2012.

SUMMARY OF INVENTION

Technical Problem

However, transmission timings of various uplink physical channels each are configured implicitly or explicitly. In a communication system that performs dynamic time division duplex (DTDD), in a case where various uplink physical channels collide with one another during communication, signals that are transmitted interfere with each other and a problem occurs in that suitable communication is not performed.

An object of the present invention, which is made in view of the problem described above, is to provide a terminal device, a base station apparatus, and a method, in all of which suitable transmission control is possible.

Solution to Problem (1) According to an aspect of the present invention, which is made to deal with the problem described above, there is provided a terminal device that communicates with a base station apparatus, the terminal device including: a reception unit that receives first information relating to a configuration of enhanced interference management and traffic adaptation (eIMTA) and second information relating to a channel state information (CSI) subframe set, through higher layer signaling; and a transmission unit that drops a CSI report which uses a physical uplink control channel (PUCCH) considering priorities among subframe sets in a case where, in the second information, a first CSI subframe set and a second CSI subframe set are configured.

(2) Furthermore, according to the aspect of the present invention, in the terminal device described above, the transmission unit may transmit a hybrid automatic repeat request-acknowledgement (HARQ-ACK) that corresponds to a subframe which belongs to the first CSI subframe set and an HARQ-ACK that corresponds to a subframe which belongs to the second CSI subframe set, in a PUCCH format 3, if it is assumed that an HARQ-ACK is transmitted on a certain subframe, in a case where the PUCCH format 3 is configured.

(3) Furthermore, according to another aspect of the present invention, there is provided a base station apparatus that communicates with a terminal device, the base station apparatus including: a transmission unit that transmits first information relating to a configuration of enhanced interference management and traffic adaptation (eIMTA) and second information relating to a channel state information (CSI) subframe set, through higher layer signaling; and a reception unit that receives a CSI report which corresponds to a first CSI subframe set and a CSI report which corresponds to a second CSI subframe set, in a case where the first information is configured and where the first CSI subframe set and the second CSI subframe set are configured based on the second information.

(4) Furthermore, according to the aspect of the present invention, in the base station apparatus described above, the transmission unit may configure a resource for a PUCCH format 3 in a case where a hybrid automatic repeat request-acknowledgement (HARQ-ACK) that corresponds to a subframe which belongs to the first CSI subframe set and an HARQ-ACK that corresponds to a subframe which belongs to the second CSI subframe set are received through the same physical uplink control channel (PUCCH).

(5) According to still another aspect of the present invention, there is provided a method for use in a terminal device that communicates with a base station apparatus, the method including: a step of receiving first information relating to a configuration of enhanced interference management and traffic adaptation (eIMTA) and second information relating to a channel state information (CSI) subframe set, through higher layer signaling; and a step of dropping a CSI report which uses a physical uplink control channel (PUCCH) considering priorities among subframe sets in a case where, in the second information, a first CSI subframe set and a second CSI subframe set are configured.

(6) Furthermore, according to still another aspect of the present invention, there is provided a method for use in a base station apparatus that communicates with a terminal device, the method including: a step of transmitting first information relating to a configuration of enhanced interference management and traffic adaptation (eIMTA) and second information relating to a channel state information (CSI) subframe set, through higher layer signaling; and a step of receiving a CSI report which corresponds to a first CSI subframe set and a CSI report which corresponds to a second CSI subframe set, in a case where the first information is configured and where the first CSI subframe set and the second CSI subframe set are configured based on the second information.

Accordingly, the terminal device can perform suitable transmission control.

Advantageous Effects of Invention

According to the present invention, in a communication system in which a base station apparatus and a terminal device communicate with each other, the terminal device performs suitable transmission control and thus communication efficiency can be improved.

BRIEF DESCRIPTION OF DRAWINGS

FIG. 3 is a diagram illustrating a configuration of a subframe pattern in a TDD UL/DL configuration.

DESCRIPTION OF EMBODIMENTS

Figure 1:
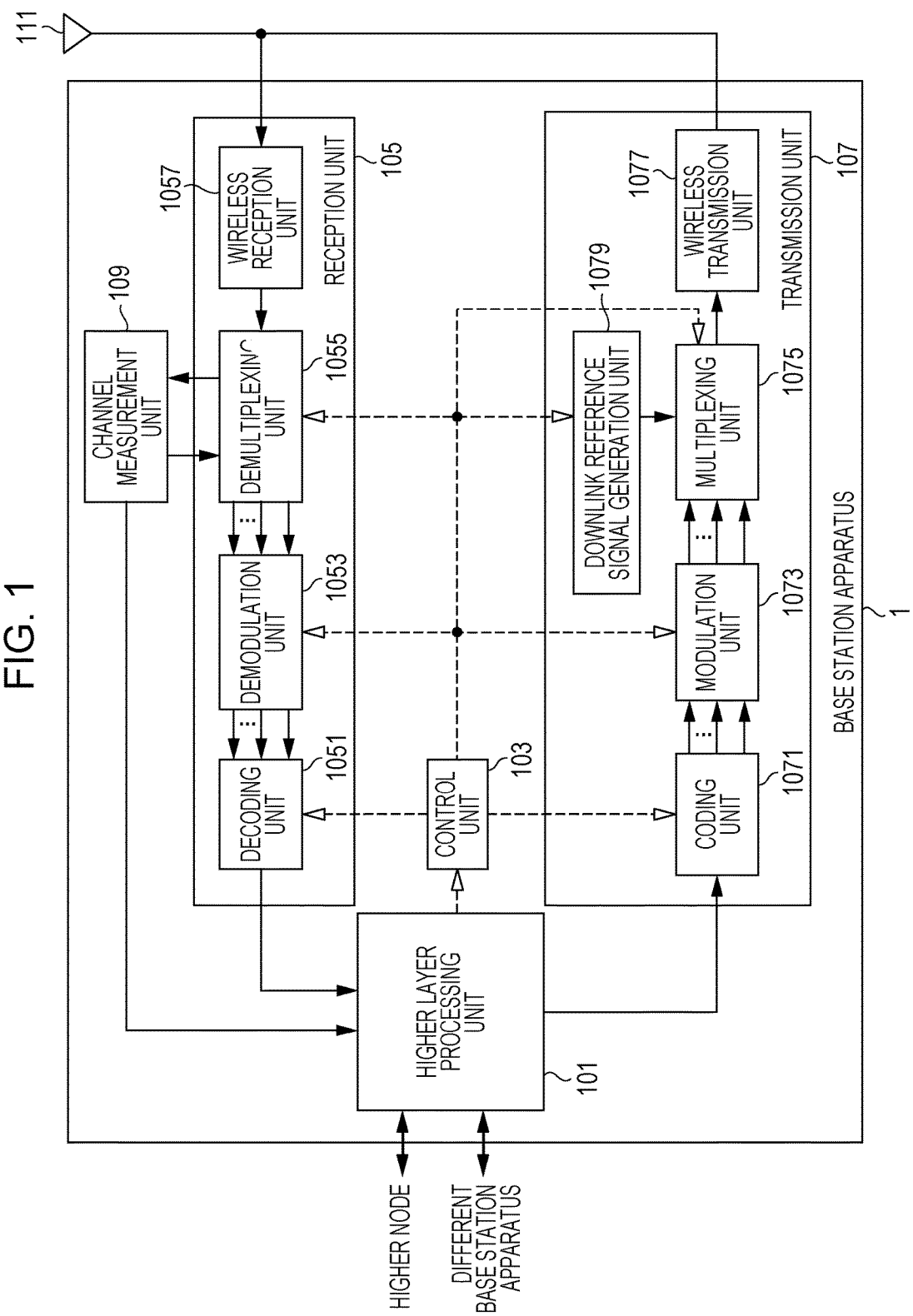
FIG. 1 is a schematic block diagram illustrating a configuration of a base station apparatus 1 according to a first embodiment of the present invention.

Embodiments of the present invention will be described below.

In a communication system according to an embodiment of the present invention, a cell aggregation in which multiple cells are put together and communication is performed is applied. That is, a base station apparatus 1 and/or the terminal device 2 can perform the communication using multiple cells. Because a cell can be constituted from component carriers, in some cases, the carrier aggregation is referred to as the cell aggregation. In some cases, the carrier aggregation in which multiple uplink component carriers are put together and the communication is performed is referred to as an uplink carrier aggregation, and the carrier aggregation in which multiple downlink component carriers are put together and the communication is performed is referred to as a downlink carrier aggregation.

The present invention may be applied to each of the multiple cells that are configured for the terminal device 2. Furthermore, the present invention may be applied to some of the multiple cells that are configured for the terminal device 2. In some cases, the cell that is configured for the terminal device 2 is also referred to as a serving cell. Furthermore, in some cases, the cell that is used for uplink is referred to as an uplink cell, and the cell that is used for downlink is referred to as a downlink cell.

A Time Division Duplex (TDD) scheme is applied to the communication system according to the embodiment of the present embodiment. In a case where the cell aggregation is performed, the TDD scheme may be applied to some or all of the multiple cells. In such a case, the present invention may also be applied.

In the cell aggregation, one primary cell and one or more secondary cells are put together and the communication is performed. Furthermore, while the primary cell is constituted from an uplink component carrier and a downlink component carrier, the secondary cell is constituted from only downlink component carriers.

Multiple serving cells (multiple cells) that are configured include one primary cell and one or multiple secondary cells. The primary cell is a cell that is indicated as a serving cell in which an initial connection establishment procedure is executed, a serving cell in which a connection re-establishment procedure starts, or a primary cell in a handover procedure. At a point of time at which an RRC connection is established, or later, the secondary cell may be configured. Moreover, multiple serving cells may be configured by one base station apparatus 1. Furthermore, multiple serving cells may be configured by multiple base station apparatuses 1. Furthermore, the base station apparatuses 1 (networks including the base station apparatuses 1) may be connected to one another in a wired manner (with an optical fiber, a copper wire, a coaxial cable, or the like), and/or in a wireless manner (with a wireless interface, an X2 interface, an X3 interface, an Xn interface, or the like).

In a case where multiple cells to which TDD is applied are put together, whether or not transmission and reception are performed at the same time among the cells that are put together may be determined. Information (simultaneous Rx-Tx) indicating whether or not the terminal device 2 supports such a function (performance or capability) may be transmitted to the base station apparatus 1.

In a case where a function of performing the transmission and the reception at the same time among the put-together cells is not supported, it is difficult for the terminal device 2 to perform uplink transmission and downlink reception on the same subframe in different cells in different bands. In this case, the terminal device 2 does not perform the transmission and the reception at the same time in one primary cell in a certain band (E-UTRA Operating Band), or one primary cell and one or multiple secondary cells in multiple different bands.

In a case where the function of performing the transmission and the reception at the same time among the put-together cells is supported, the terminal device 2 can perform the uplink transmission and the downlink reception at the same time in the multiple cells to which the TDD is applied. In this case, the terminal device 2 can perform the transmission and the reception at the same time on the same subframe in multiple serving cells in multiple different bands.

In the TDD, switching between downlink and uplink can be performed on a subframe basis by configuring a pattern of the switching between the downlink and the uplink in advance. Moreover, in the TDD, a subframe (special subframe) that is available for switching between downlink transmission and uplink transmission in a time domain (a symbol region) is defined by providing a subframe (a downlink subframe or a subframe that is reserved for the downlink transmission) that is available for the downlink transmission, a subframe (an uplink subframe or a subframe that is reserved for the uplink transmission) that is available for the uplink transmission, and a Guard Period (GP). Moreover, in the special subframe, the time domain that is available for the downlink transmission is referred to as a downlink pilot time slot (DwPTS), and the time domain that is available for the uplink transmission is referred to as an uplink pilot time slot (UpPTS). For example, in a case where a subframe i is the downlink subframe, the terminal device can receive a downlink signal that is transmitted from the base station apparatus, and in a case where a subframe j that is different from the subframe i is the uplink subframe, the terminal device can transmit an uplink signal to the base station apparatus. Furthermore, in a case where a subframe k that is different from the subframe i or the subframe j is the special subframe, the downlink signal can be received on a downlink time-domain DwPTS and the uplink signal can be transmitted on an uplink time-domain UpPTS.

Furthermore, a rate between the uplink and the downlink and a ratio between the DwPTS and the UpPTS within the special frame for realizing the TDD scheme in LTE or LTE-A can be configured using their respective tables. These tables can be configured with specific information elements (TDD uplink-downlink configuration (s) (TDD UL/DL configuration(s)), TDD configuration(s) (tdd-Config or TDD config), or uplink-downlink configuration(s) (UL/DL configuration)).

Furthermore, according to uplink traffic (an amount of information, an amount of data, or an amount of communication) and downlink traffic (an amount of information, an amount of data, or an amount of communication), a traffic adaptive control technology that changes a ratio between an uplink resource and a downlink resource may be applied to the TDD. For example, a ratio between the downlink subframe and the uplink subframe can be changed dynamically. A certain subframe can be adaptively switched between the downlink subframe and the uplink subframe. Such a subframe is referred to as a flexible subframe. The base station apparatus 1 can perform reception of the uplink signal or transmission of the downlink signal on the flexible subframe according to a condition (situation). Furthermore, as long as the base station apparatus 1 does not instruct the terminal device 2 to transmit the uplink signal on the flexible subframe, the terminal device 2 regards the flexible subframe as the downlink subframe and can perform reception processing. Furthermore, in some cases, the TDD in which the ratio between the downlink subframe and the uplink subframe, the subframe for the uplink and the downlink, or the TDD UL/DL (re-) configuration is changed dynamically is referred to as dynamic TDD (DTDD). Furthermore, in some cases, because the TDD UL/DL (re-) configuration is performed in an interference management (interference control) and traffic adaptive control technology, this technology is referred to as TDD enhanced Interference Management and Traffic Adaptation (TDD eIMTA). For example, TDD UL/DL configuration information may be transmitted by L1 signaling.

A single base station apparatus 1 may manage multiple cells. Furthermore, a single base station apparatus 1 may manage multiple remote radio heads (RRHs). Furthermore, a single base station apparatus 1 may manage multiple local areas. Furthermore, a single base station apparatus 1 may manage Heterogeneous Networks (HetNets). Furthermore, a single base station apparatus 1 may manage multiple low power base station apparatuses (Low Power Nodes (LPNs)).

In the communication system, the communication may be performed using a carrier (a component carrier) that is defined in LTE and to which one portion of a physical channel or signal is not allocated or mapped. At this point, such a carrier is referred to as a new carrier type (NCT). For example, a cell-specific reference signal, a physical downlink control channel, or a synchronization signal (a primary synchronization signal or a secondary synchronization signal) may not be mapped to the new carrier type. Furthermore, it has been considered that a physical channel (a physical discovery channel (PDCH) or a new discovery signal(s) (NDS(s))) for performing mobility measurement and time/frequency synchronization detection is introduced in a cell for which the new carrier type is configured. Moreover, in some cases, the new carrier type is referred to as an additional carrier type (ACT). Furthermore, in some cases, in contrast to the NCT, an existing carrier type is also referred to as a legacy carrier type (LCT). In a case where the TDD scheme is applied in the carrier (cell) that is the LCT or the NCT, the present invention may be applied.

Next, a physical channel and a physical signal according to the embodiment of the present invention are described.

A principal physical channel (or physical signal) that is LTE and LTE-A is described. A channel means a medium that is used for signal transmission. The physical channel means a physical medium that is used for the signal transmission. There is a likelihood that, in LTE and LTE-A, and in standard releases after LTE and LET-A, a physical channel will be added from now on or a structure or format type of the physical channel will be changed or added, but even in such a case, the addition or change does not have an effect on a description of each embodiment of the present invention.

In LTE or LTE-A, scheduling of the physical channel is managed using a radio frame. 1 radio frame is 10 ms, and 1 radio frame is constituted from 10 subframes. Moreover, 1 subframe is constituted from 2 slots (that is, 1 slot is 0.5 ms). Furthermore, management is performed using a resource block as a minimum unit of scheduling for allocating the physical channel. The resource block is defined by a fixed frequency domain that is constituted from a set of multiple subcarriers (for example, 12 subcarriers) along a frequency axis and by a region that is constituted from fixed transmission time intervals (for example, 1 slot or 7 symbols).

The physical channel corresponds to a set of resource elements on which information that is output from a higher layer is transmitted. The physical signal is used in a physical layer, and does not carry the information that is output from the higher layer. More precisely, higher layer control information, such as a radio resource control (RRC) message or system information (SI) is transmitted on the physical channel.

As downlink physical channels, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). Furthermore, as downlink physical signals, there are various reference signals and various synchronization signals. As downlink reference signals, there are a cell-specific reference signal (CRS), a UE-specific reference signal (UERS), and a channel state information reference signal (CSI-RS). As synchronization signals, there are a primary synchronization signal (PSS), and a secondary synchronization signal (SSS).

As uplink physical channels, there are a physical uplink shared channel (PUSCH), a physical uplink control channel (PUCCH), and a physical random access channel (PRACH). Furthermore, as uplink physical signals, there are various reference signals. As uplink reference signals, there are a demodulation reference signal (DMRS) and a sounding reference signal (SRS).

A synchronization signal is constituted from 3 types of primary synchronization signals (PSSs) and a secondary synchronization signal (SSS) that is constituted from 31 types of codes which are alternately arranged in the frequency domain, and frame timings for radio synchronization with 504 physical cell identifiers (PCIS) (physical layer cell identity or physical cell identity) by which to identify base station apparatuses are indicated by combinations of the primary synchronization signal and the secondary synchronization signal. The terminal device 2 specifies a PCI of the synchronization signal that is received though cell search.

A physical broadcast channel (PBCH) is transmitted for the purpose of notifying a control parameter (broadcast information or system information) that is common to terminal devices within a cell. For the broadcast information that is not notified on PBCH, a radio resource is notified on PDCCH, and a layer 3 message (system information (system control information), an RRC message) is transmitted on the PDSCH. As pieces of broadcast information, a cell global identifier (CGI) indicating an identifier that is dedicated to a cell, a tracking area identifier (TAI) for managing a waiting area by paging, random access configuration information (a transmission timing timer or the like), common radio resource configuration information (shared radio resource configuration information), and the like are notified.

Initial transmission of a system information block type 1 message is performed through the PDSCH on subframe 5 of a radio frame that satisfies SFN mod 8=0, and re-transmission (repetition) thereof is performed on subframe 5 of a different radio frame that satisfies SFN mod 2=0. The system information block type 1 message includes information indicating a configuration (lengths of the DwPTS, the GP, and the UpPTS) of the special subframe. The system information block type 1 message is cell-specific information.

A system information message is transmitted through the PDSCH. The system information message is the cell-specific information. The system information message may include a system information block X other than a system information block type 1.

The downlink reference signals are categorized by their usage into multiple types. For example, the cell-specific reference signal (CRS) is a pilot signal that is transmitted at a prescribed power for every cell, and is a downlink reference signal that is periodically repeated in a frequency domain and a time domain based on a prescribed rule. The terminal device 2 receives a CRS and thus measures received quality for every cell. Furthermore, the terminal device 2 can use the CRS as a reference signal for demodulation of the PDCCH or the PDSCH that is transmitted at the same time as the CRS. As a sequence that is used for the CRC, a sequence that is identifiable for every cell is used. For example, the sequence may be generated based on a pseudo-random sequence. Furthermore, the sequence may be generated based on a Zadoff-Chu sequence. Furthermore, the sequence may be generated based on a gold sequence. Furthermore, variants of these sequences may be available. These sequences may be generated by a sequence generator. The sequence generator may be initialized with a certain initial value at the beginning of each radio frame. The certain initial value may be defined (configured) independently of every physical channel/physical signal.

Furthermore, the downlink reference signal is also used for estimation of propagation fluctuation in the downlink. The downlink reference signals that are used for the estimation of the propagation fluctuation may be referred to as channel state information reference signals (CSI-RS) or CSI reference signals. CSI reference signals that are not actually signal-transmitted, more precisely, resources, the signal transmission on which the base station apparatus 1 does not perform, may also be referred to as zero power channel state information reference signals (zero power CSI-RS) or zero power CSIs.

Furthermore, the downlink resource that is used to measure an interference component is referred to as a channel state information-interference measurement resource (CSI-IMR), the terminal device 2 may perform interference signal measurement for calculating a value of a CQI, using the zero power CSI reference signal that is included in a CSI-IM resource.

Furthermore, the downlink reference signals that are dedicatedly configured for every terminal device 2 are referred to as UE-specific reference signals (UERS), dedicated reference signals, downlink demodulation reference signals (DL DMRS), or the like, and are used for the demodulation of the PDCCH or the PDSCH.

The physical downlink shared channel (PDSCH) is also used for notifying the terminal device 2 of the broadcast information (the system information) that is not notified by paging or on a physical broadcast channel, in addition to downlink data, as the layer 3 message (the RRC message). Radio resource allocation information of the physical downlink shared channel is indicated with the physical downlink control channel. Furthermore, the PDSCH is also used for notifying a parameter (an information element or an RRC message) relating to the uplink and the downlink.

The RRC message is transferred through the PDSCH. The RRC message is information or a signal that is processed in an RRC layer. The RRC message may be common to multiple mobile station apparatuses 1 within a cell, and may be dedicated to a specific mobile station apparatus 1. Moreover, in some cases, the RRC message is also referred to as higher layer signaling or RRC signaling.

The physical downlink control channel (PDCCH) is transmitted on several OFDM symbols starting from the head of each subframe, and is used for the purpose of instructing the terminal device 2 as to resource allocation information in accordance with scheduling by the base station apparatus 1, or an amount of adjustment for an increase or a decrease in transmit power. The PDCCH is used for the purpose of transmitting downlink control information (DCI) to the terminal device 2. The terminal device 2 monitors the physical downlink control channel that is destined for the terminal device 2 itself before transmitting and receiving the layer 3 message (the paging, a handover command, the RRC message, or the like) that is the downlink data or downlink control data and receives the PDCCH that is destined for the terminal device 2 itself. Thus, the terminal device 2 needs to acquire from the PDCCH (the DCI that is transmitted using the DCI format which accompanies the PDCCH) the resource allocation information that is referred to as an uplink grant at the time of the transmission and is referred to as a downlink grant (also referred to as downlink assignment) at the time of the reception. Moreover, in addition to being transmitted on the OFDM symbol described above, it is also possible that the PDCCH is configured to be transmitted on a region of the resource block that is dedicatedly allocated from the base station apparatus 1 to the terminal device 2. In some cases, the PDCCH that is transmitted on the region of the resource block which is dedicatedly allocated from the base station apparatus 1 to the terminal device 2 is also referred to as the Enhanced physical downlink control channel (enhanced PDCCH (EPDCCH)). Furthermore, in some cases, the PDCCH that is transmitted on the OFDM symbol described above is also referred to as a first control channel. Furthermore, in some cases, the EPDCCH is also referred to as a second control channel. Furthermore, in some cases, a resource region to which the PDCCH is allocable is also referred to as a first control channel region and a resource region to which the EPDCCH is allocable is also referred to as a second control channel region. Moreover, according to the present invention, for brief description, it is assumed that the EPDCCH is included in a place where the PDCCH is expressed. In other words, in the place where the PDCCH is expressed, the PDCCH may be replaced with the EPDCCH.

At this point, the terminal device 2 monitors a set of PDCCH candidates and/or a set of EPDCCH candidates. The PDCCH candidate refers to a candidate for the PDCCH that has the likelihood of being mapped and transmitted by the base station apparatus 1. Furthermore, the PDCCH candidate is constituted from one or multiple control channel elements (CCEs). Furthermore, the monitoring may include an attempt by the terminal device 2 to perform decoding on each of the PDCCHs within the set of PDCCH candidates, according to all DCI formats that are monitored. Furthermore, the monitoring may include measuring a reception level of a reception signal.

At this point, the set of PDCCH candidates that is monitored by the terminal device 2 is also referred to as a search space. The search space is a set of resources that have a likelihood of being used by the base station apparatus 1 for transmission of the PDCCH. In a PDCCH region, a common search space (CSS) and a UE-specific search space (USS) are constituted (defined or configured).

A PUCCH resource for performing HARQ feedback on the PDSCH may be determined based on a CCE (ECCE) index of the PDCCH (the EPDCCH) indicating PDSCH transmission.

The CSS is used for DCI transmission to multiple terminal devices 2. That is, the CSS is defined by a resource that is common to the multiple terminal devices 2. Furthermore, the USS is used for the DCI transmission to a certain specific terminal device 2. That is, the USS is defined by a resource that is dedicated to the certain specific terminal device 2. For the DCI, multiple formats are prepared according to a type of DCI that is transmitted (for example, a DCI format 0/1/1A/1B/1C/1D/2/2A/2B/2C/2D/3/3A/4). A format that is used for uplink transmission control (for example, scheduling of the PUSCH) may be referred to as an uplink DCI format (for example, a DCI format 0/4), and a format that is used for downlink reception control (for example, scheduling of the PDSCH or the like) may be referred to as a downlink DCI format (for example, a DCI format 1/1A/1B/1C/1D/2/2A/2B/2C/2D). A format that is used for multiple terminal devices 2 may be referred to as a group triggering DCI format (for example, a DCI format 3/3A). Furthermore, a DCI format 0 may also be referred to as DCI in a first format or a first DCI format, and a DCI format 1 may also be referred to as DCI in a second format or a second DCI format. One DCI format is constituted from one or more pieces of DCI (or information).

The terminal device 2 monitors the PDCCH in the CSS and/or the USS of the PDCCH region, and detects the PDCCH that is destined for the terminal device 2 itself.

Furthermore, for the DCI transmission (transmission on the PDCCH), a Radio Network Temporary Identifier (RNTI) that the base station apparatus 1 assigns to the terminal device 2 is used. Specifically, a cyclic redundancy check (CRC) parity bit is attached to the DCI format (which may be the downlink control information), and after being attached, a CRC parity bit is scrambled by the RNTI.

The terminal device 2 attempts to perform the decoding on the DCI format to which the CRC parity bit scrambled by the RNTI is attached, and detects the DCI format that succeeds in CRC, as the DCI format that is destined for the terminal device 2 itself (which is also called blind decoding). That is, the terminal device 2 attempts to perform the decoding on the PDCCH that is accompanied by the CRC that is scrambled by the RNTI, and detects the PDCCH that succeeds in the CRC, as the PDCCH that is destined for the terminal device 2 itself.

At this point, a cell-radio network temporary identifier (C-RNTI) is included in the RNTI. The C-RNTI is a unique identifier that is used for RRC connection and scheduling identification. The C-RNTI is used for unicast transmission that is dynamically scheduled.

Furthermore, a temporary C-RNTI is included in the RNTI. The temporary C-RNTI is an identifier that is used for a random access procedure (for example, initial access). For example, the terminal device 2 may attempt to perform the decoding on the DCI format to which the CRC that is scrambled by the temporary C-RNTI is attached, only in the common search space.

It is also possible that uplink data and uplink control data are mainly transmitted on the physical uplink shared channel (PUSCH), and that the PUSCH includes control data, such as downlink received quality or an ACK/NACK. In some cases, the control data is referred to as the channel state information (CSI). In some cases, the CSI that is transmitted on the PUSCH is also referred to as an aperiodic CSI (A-CSI). Furthermore, in addition to the uplink data, the physical uplink shared channel (PUSCH) is also used for notifying the base station apparatus 1 of uplink control information as the layer 3 message. Furthermore, as is the case with the downlink, the information on resource allocation to the physical uplink shared channel is indicated with the physical downlink control channel. Furthermore, in response to a dynamic scheduling grant, the uplink data is transmitted on the PUSCH. Furthermore, in response to a random access response grant, information (for example, identification information of the terminal device 2, or message 3) of the terminal device 2 itself, which is associated with random access, is transmitted on the PUSCH. Furthermore, in some cases, for the PUSCH, a parameter that is used for transmit power control differs according to a type of detected grant.

The physical uplink control channel (PUCCH) is used for notification of a reception acknowledgement response (acknowledgement/negative acknowledgement (ACK/NACK)) for data that is transmitted on the physical downlink shared channel or a report (CSI report) on downlink channel information (channel state information), or for making a scheduling request (SR) that is a request (a radio resource request) for allocation of an uplink resource. Pieces of channel state information (CSI) include a channel quality indicator (CQI), a precoding matrix indicator (PMI), a precoding type indicator (PTI), and a rank indicator (RI). In some cases, each indicator is expressed as an indication, but the indicator and the indication have the same application and meaning. Furthermore, the terminal device 2 may perform switching between PUCCH formats according to the UCI that is transmitted.

Furthermore, as a PUCCH format 1/1a/1b, there is a shortened format that is punctured for 1 symbol in order to avoid contention with the SRS and a normal format that is not punctured. For example, in a case where concurrent transmission of the PUCCH and the SRS on the same subframe is effective, a PUCCH format 1/1a/1b is transmitted in the shortened format on an SRS subframe. For example, in a case where the concurrent transmission of the PUCCH and the SRS on the same subframe is not effective, the PUCCH format 1/1a/1b is transmitted in the normal format on the SRS subframe. At this time, although SRS transmission takes place, the SRS may not be transmitted.

As types of CSI reporting, there are a periodic CSI reporting (P-CSI reporting) by which the channel state information is reported periodically or in a case where an event condition is satisfied, and an aperiodic CSI reporting (A-CSI reporting) by which the channel state information is reported in a case where the CSI reporting is requested with a CSI request that is included in the DCI format. The periodic CSI reporting is performed using the PUCCH or the PUSCH, and the aperiodic CSI reporting is performed using the PUSCH. That is, the P-CSI is transmitted using the PUCCH or the PUSCH, and the A-CSI is transmitted using the PUSCH. In a case where the request for the CSI reporting is made to the terminal device 2 based on information (the CSI request) included in the DCI format, the terminal device 2 can transmit the CSI (A-CSI) that is not accompanied by the uplink data, on the PUSCH.

A PUCCH subframe (reporting instances) on which the CSI reporting is possible is determined based on a periodicity and a subframe offset that are associated with an index (CQI PMI index or an RI index) that is configured in the higher layer. Moreover, the index that is configured in the higher layer is able to be configured for every subframe set that is configured to measure the CSI. In a case where only one index is configured for multiple subframe sets, the index may be regarded as being common to the subframe sets.

One P-CSI report on each serving cell to the terminal device 2 that is configured in transmission modes 1 to 9 is configured by the higher layer signaling.

One or more P-CSI reports on each serving cell to the terminal device 2 that is configured in transmission mode 10 is configured by the higher layer signaling.

An 8 CSI-RS port is configured for the terminal device 2 that is configured in transmission mode 9 or 10, and a report mode (mode 1-1) of a single PMI is configured by the higher layer signaling, with a wideband CQI, for submode 1 or submode 2 using a certain parameter (PUCCH_format1-1_CSI_reporting_mode).

For UE-selected subband CQI, CQI reporting on a certain subframe in a certain serving cell is reporting on channel quality in a specific portion (one portion) of a bandwidth in the serving cell, which is indicated as a bandwidth part.

A CSI reporting type supports a PUCCH CSI reporting mode. In some cases, the CSI reporting type is also referred to as a PUCCH reporting type. The type 1 reporting supports CQI feedback to a UE-selected subband. Type 1a reporting supports a subband CQI and second PMI feedback. Type 2 reporting, type 2b reporting, and type 2c reporting support the wideband CQI and PMI feedback. Type 2a reporting supports wideband PMI feedback. Type 3 reporting supports RI feedback. Type 4 reporting supports the wideband CQI. Type 5 reporting supports an RI and the wideband PMI feedback. Type 6 reporting supports the RI and PTI feedback.

The uplink reference signal includes the demodulation reference signal (DMRS) that is used by the base station apparatus 1 for demodulating the physical uplink control channel (PUCCH) and/or the physical uplink shared channel (PUSCH), and the sounding reference signal (SRS) that is used by the base station apparatus 1 mainly for estimating an uplink channel state. Furthermore, as sounding reference signals, there are a periodic sounding reference signal (Periodic SRS (P-SRS)) that is configured in such a manner that the periodic sounding reference signal is transmitted periodically by the higher layer, and an aperiodic sounding reference signal (Aperiodic SRS (A-SRS)) of which transmission is requested by the SRS request that is included in a downlink control information (DCI) format. In some cases, the uplink reference signal is also referred to as an uplink pilot signal or an uplink pilot channel.

Moreover, a sequence of these uplink reference signals may be generated based on the pseudo-random sequence. Furthermore, the sequence of the uplink reference signals may be generated based on the Zadoff-Chu sequence. Furthermore, the sequence of the uplink reference signals may be generated based on the gold sequence. Furthermore, the sequence of the uplink reference signals may be the subspecies of or the modification to the pseudo-random sequence, the Zadoff-Chu sequence, or the gold sequence.

Furthermore, in some cases, the periodic sounding reference signal is also referred to as a periodic sounding reference signal or a trigger type 0 sounding reference signal (trigger type 0 SRS). Furthermore, in some cases, the aperiodic sounding reference signal is also referred to as an aperiodic sounding reference signal or a trigger type 1 sounding reference signal (trigger type 1 SRS).

Moreover, the A-SRS may be divided into a signal (for example, which, in some cases, is referred to as a trigger type 1a SRS) that is a specialized signal for uplink channel estimation, in coordinated communication, and a signal (for example, which, in some cases, is referred to as a trigger type 1b SRS) that is used for causing the base station apparatus 1 to measure the downlink channel state (the CSI, the CQI, the PMI, or the RI). Moreover, the DMRS is set to correspond to each of the PUSCH and the PUCCH. Furthermore, the DMRS is time-multiplexed onto the same subframe as with the PUSCH or the PUCCH and is transmitted.

Furthermore, in the case of the PUSCH and in the case of the PUCCH, the DMRS may differ in terms of a time multiplexing method. For example, while the DMRS for the PUSCH is mapped within 1 slot that is constituted from 7 symbols, using only 1 symbol, the DMRS for the PUCCH is mapped within 1 slot that is constituted from 7 symbols, using 3 symbols. Furthermore, the number of the symbols that are used for the mapping of the DMRS for the PUCCH may differ according to the number of the symbols that are included within 1 slot. That is, in a case where 1 slot is constituted from 7 symbols and in a case where 1 slot is constituted from 6 symbols, the number of the symbols that are used to map the DMRS for the PUCCH may differ.

Furthermore, for the SRS, various parameters (a bandwidth, a cyclic shift, a transmission subframe, and the like) are notified with the higher layer signaling. Furthermore, for the SRS, a subframe on which the SRS is transmitted is determined based on information relating to the transmission subframe, which is included in an SRS configuration which is notified with the higher layer signaling. As pieces of information relating to the transmission subframe, there are information (shared information) that is configured to be cell-specific, and information (dedicated information or individual information) that is configured to be UE-specific. Pieces of information that are configured to be cell-specific include information indicating a subframe on which the SRS that is shared among all terminal devices 2 within a cell is transmitted. Furthermore, pieces of information that are configured to be UE-specific include information indicating a subframe offset that is a subset of subframes that are configured to be cell-specific, and a periodicity. With these pieces of information, the terminal device 2 can determine a subframe (which, in some cases, is referred to as an SRS subframe or an SRS transmission subframe) on which the SRS can be transmitted. Furthermore, on the subframe on which the SRS that is configured to be cell-specific is transmitted, in a case where the PUSCH is transmitted, the terminal device 2 can puncture as many time resources for the PUSCH as symbols on which the SRS is transmitted, and can transmit the PUSCH on the time sources. By doing this, contention can be avoided between the transmission of the PUSCH and the transmission of the SRS between the terminal devices 2. Performance degradation can be stopped for the terminal device 2 that transmits the PUSCH. Furthermore, channel estimation precision can be secured for the terminal device 2 that transmits the SRS. At this point, the information that is configured to be UE-specific may be constituted independently with the P-SRS or the A-SRS.

For example, in a case where various parameters are configured by the higher layer signaling, a first uplink reference signal is periodically transmitted based on the transmission subframe that is configured. Furthermore, in a case where a transmission request is made, a second uplink reference signal is aperiodically transmitted with a field (the SRS request) relating to a request for transmission of the second uplink reference signal, which is included in a downlink control information format. In a case where the SRS request that is included in a certain downlink control information format indicates a positive or positive-equivalent index (value), the terminal device 2 transmits the A-SRS on a prescribed transmission subframe. Furthermore, in a case where the detected SRS request indicates the negative or negative-equivalent index (value), the terminal device 2 does not transmit the A-SRS on a prescribed subframe. Moreover, the information (shared parameter or shared information) that is configured to be cell-specific is notified using the system information or a dedicated control channel (DCCH). Furthermore, the information (a dedicated parameter, an individual parameter, the dedicated information, or the individual information) that is configured to be UE-specific is notified using a common control channel (CCCH). These pieces of information may be notified with the RRC message. The RRC message may be notified by the higher layer.

The physical random access channel (PRACH) is a channel that is used for notifying a preamble sequence and has a guard time. The preamble sequence is configured in such a manner that 64 types of sequences are prepared to express G-bit information. The physical random access channel is used as a means by which the terminal device 2 has access to the base station apparatus 1. The terminal device 2 uses the PRACH in order to make a request for the radio resource at the time of non-configuration of the PUCCH or to make a request to the base station apparatus 1 for transmission timing alignment information that is indispensable to adjust uplink transmission timing to a reception timing window of the base station apparatus 1. Moreover, in some cases, the transmission timing alignment information is also referred to as timing advance (TA).

Specifically, the terminal device 2 transmits the preamble sequence using the radio resource for the PRACH that is configured by the base station apparatus 1. The terminal device 2 that receives the transmission timing alignment information configures the transmission timing timer that counts the available time of the transmission timing alignment information that is configured to be in common use by the broadcast information (or is dedicatedly set with the layer 3 message), and manages an uplink state as a transmission timing alignment state during the available time of the transmission timing timer (while the counting is in progress) and as a transmission timing non-adjustment state (transmission timing unadjusted state) during the non-available time (after the transmission timing timer expires). The layer 3 message is a control-plane (C-plane) message that is exchanged in a radio resource control (RRC) layer between the terminal device 2 and the base station apparatus 1, and is used as a message that has the same meaning as the RRC signaling or the RRC message. Furthermore, in some cases, the RRC signaling is also referred to as the higher layer signaling or dedicated signaling. In some cases, the dedicated signaling is also referred to as individual signaling.

The random access procedures include two random access procedures. One is a contention-based random access procedure and the other is a non-contention-based random access procedure. The contention-based random access procedure is random access in which there is a likelihood that contention will be incurred between multiple terminal devices 2.

Furthermore, the non-contention-based random access procedure is a random access in which contention does not occur between the multiple terminal devices 2. For example, in the non-contention-based random access procedure, the base station apparatus 1 can allocate a random access preamble to the terminal device 2 in such a manner that contention is not incurred.

The non-contention-based random access procedure is made up of 3 steps, and the base station apparatus 1 notifies the terminal device 2 of a random access preamble assignment with the dedicated signaling for the downlink. At this time, with the random access preamble assignment, the base station apparatus 1 allocates the random access preamble for non-contention to the terminal device 2, and the random access preamble assignment is transmitted by a source base station apparatus for handover, and is signaled by the handover command that is generated by a target base station apparatus or, in the case of a downlink data arrival, is signaled by the PDCCH.

The terminal device 2 that receives the random access preamble assignment transmits the random access preamble (message 1) on the RACH for the uplink. At this time, the terminal device 2 transmits the random access preamble for non-contention that is allocated.

The base station apparatus 1 that receives the random access preamble transmits the random access response to the terminal device 2 on the downlink data (downlink shared channel (DL-SCH)). At this time, semi-synchronization is performed with message 1, the HARQ is not included, addressing to the RA-RNTI on the PDCCH is performed, and an initial uplink grant and timing alignment information for at least handover, timing alignment information for the downlink data arrival, and a random access preamble identifier are transferred with one DL-SCH message 1 toward one or more terminal devices 2. In some cases, the downlink data is also referred to as downlink shared channel data.

At this point, the non-contention-based random access procedure is applied to the handover, the downlink data arrival, and positioning. The contention-based random access procedure is applied to initial access from RRC_IDLE, RRC connection re-establishment, the handover, the downlink data arrival, and an uplink data arrival.

Next, an example of the contention-based random access procedure is described.

The terminal device 2 acquires system information block type 2 (SIB2) that is transmitted by the base station apparatus 1. SIB2 is a configuration (common information) that is common to all terminal devices 2 (or multiple terminal devices 2) within a cell. For example, the common configuration includes a configuration of the PRACH.

The terminal device 2 randomly selects a number of the random access preamble. Furthermore, the terminal device 2 transmits the random access preamble (message 1) of which a number is selected, to the base station apparatus 1 using the PRACH. The base station apparatus 1 estimates uplink transmission timing using the random access preamble.

The base station apparatus 1 transmits the random access response (the DL-SCH or message 2) using the PDSCH. The random access response includes multiple pieces of information for the random access preamble that is detected by the base station apparatus 1. For example, the multiple pieces of information include a number of the random access preamble, the temporary C-RNTI, a timing advance command (TA command), and the random access response grant.

The terminal device 2 transmits (initially transmits) the uplink data (UL-SCH or message 3) on the PUSCH that is scheduled using the random access response grant. The uplink data includes an identifier (information indicating InitialUE-Identity or the C-RNTI) for identifying the terminal device 2. In some cases, the downlink data is also referred to as downlink shared channel data.

In a case where the base station apparatus 1 fails to decode the uplink data, the base station apparatus 1 gives an instruction to re-transmit the uplink data using the DCI format to which the CRC parity bit scrambled by the temporary C-RNTI is attached. The terminal device 2, when instructed with the DCI format to re-transmit the uplink data, re-transmits the same uplink data on the PUSCH that is scheduled using the DCI format to which the CRC parity bit scrambled by the temporary C-RNTI is attached.

Furthermore, in the case where the base station apparatus 1 fails to decode the uplink data, the base station apparatus 1 can give an instruction to re-transmit the uplink data using the PHICH (NACK). The terminal device 2, when instructed with the NACK to re-transmit the uplink data, re-transmits the same uplink data on the PUSCH.

In a case where the base station apparatus 1 succeeds in decoding the uplink data, the base station apparatus 1 can know which of the terminal devices 2 performs transmission of the random access preamble and the uplink data, by acquiring the uplink data. That is, before succeeding in decoding the uplink data, no base station apparatus 1 can know which of the terminal devices 2 performs the transmission of the random access preamble and the uplink data.

In a case where the message 3 including InitialUE-Identity is received, the base station apparatus 1 transmits a contention resolution identifier (a contention resolution identity) (message 4) that is generated based on InitialUE-Identity that is received, to the terminal device 2, using the PDSCH. In a case where the received contention resolution identifier and the transmitted InitialUE-Identity are matched to each other, the terminal device 2 (1) regards the random access preamble as succeeding in contention resolution, (2) sets a value of the temporary C-RNTI to the C-RNTI, (3) discards the temporary C-RNTI, and (4) regards the random access procedure as being correctly completed.

Furthermore, in a case where the message 3 is received that includes information indicating the C-RNTI, the base station apparatus 1 transmits to the terminal device 2 the DCI format (message 4) to which the CRC parity bit scrambled by the received C-RNTI is attached. In a case where the DCI format to which the CRC parity bit scrambled by the C-RNTI is attached is decoded, the terminal device 2 (1) regards the random access preamble as succeeding in contention resolution, (2) discards the temporary C-RNTI, and (3) regards the random access procedure as being correctly completed.

That is, the base station apparatus 1 schedules the PUSCH, using the random access response grant, as part of the contention-based random access procedure.

The terminal device 2 transmits the uplink data (message 3) on the PUSCH that is scheduled using the random access response grant. That is, the terminal device 2 performs transmission on the PUSCH that corresponds to the random access response grant, as part of the contention-based random access procedure.

Furthermore, the base station apparatus 1 schedules the PUSCH, using the DCI format to which the CRC scrambled by the temporary C-RNTI is attached, as part of the contention-based random access procedure. Furthermore, the base station apparatus 1 schedules the transmission on the PUSCH or gives an instruction for the transmission on the PUSCH using the PHICH (NACK), as part of the contention-based random access procedure.

The terminal device 2 transmits (re-transmits) the uplink data (message 3) on the PUSCH that is scheduled using the DCI format to which the CRC scrambled by the temporary C-RNTI is attached. Furthermore, the terminal device 2 transmits (re-transmits) the uplink data (message 3) on the PUSCH that is scheduled, according to reception of the PHICH. That is, the terminal device 2 performs the transmission on the PUSCH that corresponds to re-transmission of the same uplink data (transport block), as part of the contention-based random access procedure.

In the TDD scheme, the base station apparatus 1 may transmit the PCFICH, the PHICH, the PDCCH, the EPDCCH, the PDSCH, the synchronization signal, and the downlink reference signal, on the DwPTS of a special subframe. Furthermore, the base station apparatus 1 may not transmit the PBCH on the DwPTS of the special subframe.

Furthermore, in the TDD scheme, the terminal device 2 may transmit the PRACH and the SRS on the UpPTS of the special subframe. Furthermore, the terminal device 2 may not transmit the PUCCH, the PUSCH, and the DMRS on the UpPTS of the special subframe.

Furthermore, in the TDD scheme, in a case where the special subframe is constituted from only the GP and the UpPTS, the terminal device 2 may transmit the PUCCH and/or the PUSCH and/or the DMRS on the UpPTS of the special subframe.

A logical channel will be described.

The logical channel is used for transferring the RRC message or the information element. Furthermore, the logical channel is transmitted on the physical channel through a transport channel.

A broadcast control channel (BCCH) is a downlink channel that is used for broadcasting the system control information. For example, the system information or information that is indispensable for the initial access is transmitted using this channel. A master information block (MIB) or system information block type 1 (SIB1) is transferred using this channel.

The common control channel (CCCH) is a channel that is used for transmitting control information between the terminal device that does not have the RRC connection to a network and the network. For example, UE-specific control information or configuration information is transmitted using this logical channel.

The dedicated control channel (DCCH) is a channel that is used for bidirectionally transmitting dedicated control information between the terminal device that has the RRC connection and the network. For example, cell-specific re-configuration information is transmitted using this channel.

In some cases, signaling that uses the CCCH or the DCCH is collectively referred to as the RRC signaling (the higher layer signaling).

As pieces of information (an information element, a parameter, or a configuration) relating to uplink power control, there are information that is configured as broadcast information, information that is (re-)configured as information (shared information) that is shared among the terminal devices 2 within the same cell, and information that is (re-)configured as UE-specific dedicated information. The terminal device 2 performs the transmit power control based on only the information that is configured as the broadcast information, or based on the information that is configured as the broadcast information/shared information and on the information that is configured as the dedicated information.

Radio resource control configuration shared information may be notified as the broadcast information (or the system information). Furthermore, the radio resource control configuration shared information may be notified as the dedicated information (mobility control information).

Radio resource configurations include a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, the uplink power control, uplink cyclic prefix length, and the like. In a case where information is notified as the broadcast information, and in a case where information is configured as reconfiguration information, the pieces of information that are notified may not be the same. More precisely, various configurations that are notified by the broadcast information and the re-configuration information may be set independently.

Each of the information elements, which are indispensable for configuring various physical channels/physical signals (the PRACH, PUCCH, the PUSCH, the SRS, the UL DMRS, the CRS, the CSI-RS, the PDCCH, the PDSCH, the PSS/SSS, the DL DMRS, the PBCH, the PMCH, and the like), is constituted from shared configuration information that is shared among the terminal devices 2 within the same cell and dedicate configuration information that is configured for every terminal device 2. The shared configuration information may be transmitted with the system information. Furthermore, the shared configuration information may be transmitted as the dedicated information in a case where re-configuration is performed. These pieces of configuration information include a configuration of a parameter. Configurations of parameters include a configuration of a parameter value. Furthermore, in a case where a parameter is managed using a table, the configurations of parameters include an index value.

Information relating to a parameter for the physical channel described above is transmitted to the terminal device 2 using the RRC message. More precisely, based on the received RRC message, the terminal device 2 configures the resource allocation or the transmit power for each physical channel. As RRC messages, there are a message relating to a broadcast channel, a message relating to a multi-casting channel, a message relating to a paging channel, a message relating to each channel for the downlink, a message relating to each channel for the uplink, and the like. Each RRC message may be constituted to include the information elements (IEs). Furthermore, information that is equivalent to a parameter may be configured for the information element. Moreover, in some cases, the RRC message is also referred to as a message. Furthermore, a message class is a set of one or more messages. The message may include the information element. As information elements, there are an information element relating to the radio resource control, an information element relating to security control, an information element relating to mobility control, an information element relating to measurement, an information element relating to a multimedia broadcast multicast service (MBMS), and the like. Furthermore, the information element may include a lower-level information element. The information element may be configured as a parameter. Furthermore, the information element may be defined as the control information indicating one or more parameters.

The information element (IE) is used for stipulating (designating or configuring) a parameter for various channels/signals/pieces of information with the system information (SI) or the dedicated signaling. Furthermore, a certain information element includes one or more fields. The information element may be constituted from one or more information elements. Moreover, in some cases, the field that is included in the information element is also referred to as a parameter. More precisely, the information element may include one or more types of parameters (one or more parameters). Furthermore, the terminal device 2 performs radio resource allocation control, uplink power control, transmission control, and the like based on various parameters. Furthermore, the system information may be defined as the information element.

The information element may be configured to be in the field that constitutes the information element. Furthermore, a parameter may be configured to be in the field that constitutes the information element.

The RRC message includes one or more information elements. Furthermore, the RRC message for which multiple RRC messages are set is referred to as the message class.

As parameters relating to the uplink transmit power that is notified to the terminal device 2 using the system information, there are a nominal power (a nominal level, a nominal power level, a reference power, a reference level, a reference power level, an official power, an official level, and an official power level), for the PUSCH, a normal power for the PUCCH, a channel loss compensation coefficient $\alpha_c$, a list of power offsets that are configured for every PUCCH format, and power offsets for the preamble and message 3. Furthermore, as parameters relating to the random access channel, which is notified to the terminal device 2 using the system information, there are a parameter relating to the preamble, a parameter relating to the transmit power control of the random access channel, and a parameter relating to the transmission control of the random access preamble. These parameters are used at the time of the initial access, or when a re-connection is made after a Radio Link Failure (RLF) occurs. Furthermore, as parameters relating to downlink power control, which is notified to the terminal device 2 using the system information, there are a transmit power (reference signal power) for a cell-specific reference signal, and an index $P_B$(p-b) indicating a power ratio between transmit power for the physical downlink shared channel and transmit power for the cell-specific reference signal on a subframe on which the cell-specific reference signal is present.

Information relating to the transmit power control (the uplink power control, the random access channel, or the downlink power control) may be notified to the terminal device 2 as the broadcast information. Furthermore, the information relating to the transmit power control may be notified as the shard information to the terminal device 2. Furthermore, the information relating to the transmit power control may be notified as the dedicated information to the terminal device 2. Furthermore, the information relating to the transmit power control may be notified as the system information to the terminal device 2.

A communication system according to the embodiment of the present embodiment includes the base station apparatus 1 (also referred to as an access point, a point, a transmission point, a reception point, a cell, a serving cell, a transmission apparatus, a reception apparatus, a transmission station, a reception station, a transmit antenna group, a transmit antenna port group, a receive antenna group, a receive antenna port group, a communication apparatus, a communication terminal, and an eNodeB). Furthermore, as the base station apparatus 1, a master base station apparatus (also referred to as a macro base station apparatus, a first base station apparatus, a first communication apparatus, a serving base station apparatus, a primary base station apparatus, an anchor base station apparatus, a first access point, a first point, a first transmission point, a first reception point, a macro cell, a first cell, and a primary cell) may be included.

Moreover, the communication system according to the embodiment of the present invention may include a secondary base station apparatus (also referred to as a Remote Radio Head (RRH), a remote antenna, a forward-extending antenna, a distributed antenna, a second access point, a second point, a second transmission point, a second reception point, a reference point, a low power base station apparatus (a Low Power Node (LPN)), a micro base station apparatus, a pico base station apparatus, a femto base station apparatus, a small base station apparatus, a local area base station apparatus, a phantom base station apparatus, a home (indoor) base station apparatus (a home eNodeB, a home NodeB, a HeNB, or a HNB), a second base station apparatus, a second communication apparatus, a coordinated base station apparatus group, a coordinated base station apparatus set, a coordinated base station apparatus, a hot spot, a micro cell, a pico cell, a femto cell, a small cell, a phantom cell, a local area, a second cell, and a secondary cell). Here, the secondary base station apparatus may be described as multiple secondary base station apparatuses. For example, the master base station apparatus and the secondary base station apparatus may perform communication with the terminal device 2 using a heterogeneous network arrangement, with some or all portions of the coverage of the secondary base station apparatus being included in the coverage of the master base station apparatus. Furthermore, the secondary base station apparatus may be arranged out of the coverage of the master base station apparatus.

Furthermore, the communication system according to the embodiment of the present invention includes the terminal device 2 (hereinafter also referred to as a mobile station, a mobile station device, a mobile terminal, a reception device, a transmission device, a reception terminal, a transmission terminal, a third communication device, a receive antenna group, a receive antenna port group, a transmit antenna group, a transmit antenna port group, a user device, and user equipment (UE)).

Furthermore, the communication system according to the embodiment of the present invention includes the base station apparatus 1 and the terminal device 2.

A single base station apparatus 1 may manage one or more terminal devices 2. Furthermore, a single base station apparatus 1 may manage one or more cells (the serving cell, the primary cell, the secondary cell, the macro cell, the femto cell, the pico cell, the small cell, and the phantom cell). Precisely, a single base station apparatus 1 may manage the macro cell and the small cell. Furthermore, a single base station apparatus 1 may manage one or more frequency bands (component carriers or carrier frequencies). Furthermore, a single base station apparatus 1 may manage one or more low power base station apparatuses (low power nodes (LPNs)). Furthermore, a single base station apparatus 1 may manage one or more home (indoor) base station apparatuses (home eNodeBs (HeNBs)). Furthermore, a single base station apparatus 1 may manage one or more access points. The base station apparatuses 1 may be connected to one another in a wired manner (with an optical fiber, a copper wire, a coaxial cable, or the like), or in a wireless manner (with an X2 interface, an X3 interface, an Xn interface, or the like). Furthermore, the multiple base station apparatuses 1 may be managed with a network. Furthermore, a single base station apparatus 1 may manage one or more relay station apparatuses (relays). Furthermore, a network that is made up of the multiple base station apparatuses 1 may be set up. Furthermore, multiple base station apparatuses 1 may be clustered.

Furthermore, the communication system according to the embodiment of the present invention may realize the coordinated communication (Coordination Multiple Points (COMP)) with multiple base station apparatuses, low power base station apparatuses, and/or home base station apparatuses. More precisely, the communication system according to the embodiment of the present invention may perform dynamic point selection (DPS) in which switching between points (the base station apparatuses or the cells) that are dynamically connected to the terminal devices 2 takes place.

Furthermore, the communication system according to the embodiment of the present invention may perform coordinated scheduling (CS) or coordinated beamforming (CB). Furthermore, the communication system according to the embodiment of the present invention may perform joint transmission (JT) or joint reception (JR).

Furthermore, multiple low power base station apparatuses or small cells, which are arranged close to one another, may be clustered (clustering or grouping). The multiple low power base station apparatuses that are clustered may notify the same configuration information. Furthermore, in some cases, areas (coverage) of the small cells that are clustered are also referred to a local area.

In the downlink transmission, in some cases, the base station apparatus 1 is also referred to as a transmission point (TP). Furthermore, in some cases, in the uplink transmission, the base station apparatus 1 is also referred to as a reception point (RP). Furthermore, a downlink transmission point and an uplink reception point are path loss reference points (reference points) for downlink path loss measurement. Furthermore, the reference point for the pass loss measurement may be configured independently of the transmission point or the reception point.

Furthermore, the small cell, the phantom cell, or the local area cell may be configured as a third cell. Furthermore, the small cell, the phantom cell, or the local area cell may be re-configured as the primary cell. Furthermore, the small cell, the phantom cell, or the local area cell may be re-configured as the secondary cell. The small cell, the phantom cell, or the local area cell may be re-configured as the serving cell. Furthermore, the small cell, the phantom cell, or the local area cell may be included in the serving cell.

The base station apparatus 1 that is able to constitute the small cell may perform discrete reception (DRX) or discrete transmission (DTX) when the need arises. Furthermore, the base station apparatus 1 that is able to constitute the small cell may intermittently perform powering-on or powering-off.

In some cases, an independent identifier (identity (ID)) is configured for the base station apparatus 1 that constitutes the macro cell and the base station apparatus 1 that constitutes the small cell. More precisely, in some cases, the identifiers of the macro cell and the small cell are configured independently. For example, in a case where the cell-specific reference signals (CRSS) are transmitted from the macro cell and the small cell, respectively, in some cases, the cell-specific reference signals, although they are the same in transmission frequency and radio resources, are scrambled with different identifiers. The scrambling may be performed with the physical cell ID (physical cell layer identity (PCI)) in the macro cell, and may be performed with a virtual cell ID (virtual cell identity (VCI)) in the small cell. The scrambling may be performed with the physical cell ID (physical cell layer identity (PCI)) in the macro cell, and may be performed with a global cell ID (global cell identity (GCI)) in the small cell. The scrambling may be performed with a first physical cell ID in the macro cell, and may be performed with a second physical cell ID in the small cell. The scrambling may be performed with a first virtual cell ID in the macro cell, and may be performed with a second virtual cell ID in the small cell. Furthermore, the virtual cell ID may be an ID that is configured independently of the physical cell ID. Furthermore, the virtual cell ID may include a physical channel ID or a reference signal ID. The virtual cell ID may be an ID that is configured for the physical channel or the physical signal independently of the physical cell ID.

Furthermore, one portion of the physical channel or of the physical signal may not be transmitted in the small cell, the serving cell that is configured as the small cell, or the component carrier that corresponds to the small cell. For example, the CRS or the PDCCH may not be transmitted. However, the EPDCCH may be transmitted in the small cell. Furthermore, a new physical channel/physical signal may be transmitted in the small cell, the serving cell that is configured as the small cell, or the component carrier that corresponds to the small cell.

According to the embodiment of the present invention, a processing procedure in a case where, by performing the dynamic TDD, the subframe on which the PUCCH for performing the CSI reporting is able to be transmitted is limited and contention with the PUCCH on which the multiple-times CSI reporting are performed is incurred is described.

Furthermore, according to the embodiment of the present invention, a processing procedure in a case where, by satisfying a specific condition, multiple subframe sets are configured for one serving cell (cell) to which the TDD scheme is applied and the subframes on which the CSI reporting is performed on each of the multiple subframe sets are the same is described.

Figure 4:
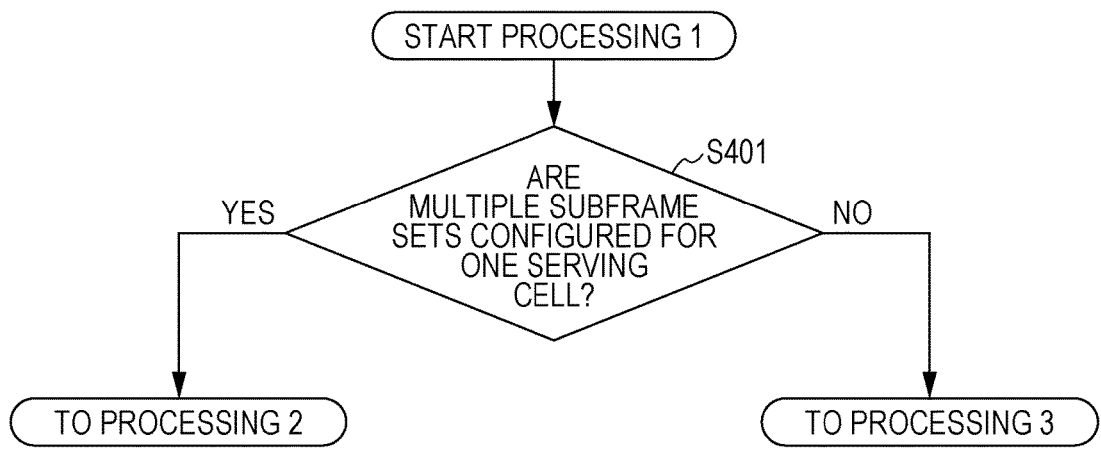
FIG. 4 is a flowchart illustrating a procedure for processing 1 by the terminal device 2 according to the embodiment of the present invention.

FIG. 4 is a flowchart illustrating a procedure for processing 1 by the terminal device 2 according to the embodiment of the present invention. In a case where a specific condition is satisfied, the terminal device 2 determines whether multiple subframe sets are configured for one serving cell (Step S401). In a case where multiple subframe sets are configured for one serving cell (YES in S401), proceeding to processing 2 takes place. In a case where multiple subframe sets are not configured for one serving cell (NO in S401), proceeding to processing 3 takes place.

An example of processing 2 will be described.

In a case where multiple subframe sets are configured for one serving cell to which the TDD scheme is applied, if it is assumed that on a certain subframe, the CSI reporting on each of the multiple subframe sets takes place, the terminal device 2 gives preference to the CSI reporting on a specific subframe set. That is, the CSI report on subframe sets other than the specific subframe set is dropped. In this case, the base station apparatus 1 does not expect that on the subframe, the CSI reporting is performed on subframe sets other than the specific subframe set. Accordingly, on the subframe, the base station apparatus 1 may not perform the reception processing of the CSI report on subframe sets other than the specific subframe set. In other words, on the subframe, the base station apparatus 1 may not perform the reception processing on the PUCCH for the CSI report on subframe sets other than the specific subframe set. The base station apparatus 1 performs the reception processing on the PUCCH on which the CSI reporting on the specific subframe set is performed, and detects the CSI report on the specific subframe set.

In the case where multiple subframe sets are configured for one serving cell to which the TDD scheme is applied, if it is assumed that on a certain subframe, the CSI reporting (the P-CSI reporting) on each of the multiple subframe sets on the PUCCH and the CSI reporting (the A-CSI reporting) on the PUSCH take place, the terminal device 2 gives preference to the CSI reporting on the PUSCH. In this case, the base station apparatus 1 does not expect that the CSI reporting is performed on the PUCCH.

In the case where multiple subframe sets are configured for one serving cell to which the TDD scheme is applied, if it is assumed that on a certain subframe, the CSI reporting on each of the multiple subframe sets takes place, and if it is assumed that the CSI reporting on each of the multiple subframe sets has the same priority, the terminal device 2 gives preference to the CSI reporting on a specific subframe set. That is, the CSI report on subframe sets other than the specific subframe set is dropped. In this case, the base station apparatus 1 does not expect that on the subframe, the CSI reporting is performed on subframe sets other than the specific subframe set. Accordingly, on the subframe, the base station apparatus 1 may not perform the reception processing of the CSI report on subframe sets other than the specific subframe set. In other words, on the subframe, the base station apparatus 1 may not perform the reception processing on the PUCCH for the CSI report on subframe sets other than the specific subframe set. The base station apparatus 1 performs the reception processing on the PUCCH on which the CSI reporting on the specific subframe set is performed, and detects the CSI report on the specific subframe set.

Moreover, the CSI reporting on different subframe sets may have the same priority. Furthermore, the CSI reporting on different subframe sets may have a different priority.

At this point, the specific subframe set may be a set of subframes that is constituted from the same types of subframes, among multiple subframe sets. For example, referring to FIG. 3, subframes 0, 1, 2, and 5 are described as the same types of subframes among different TDD UL/DL configurations. A subframe set that is constituted from these subframes may be defined as a specific subframe set.

Furthermore, the specific subframe set may be a set of subframes that is constituted from the different types of subframes, among multiple subframe sets. For example, referring to FIG. 3, subframes 3, 4, 6, 7, 8, and 9 are described as the different types of subframes among different TDD UL/DL configurations. A subframe set that is constituted from these subframes may be defined as a specific subframe set.

The specific subframe set may be a subframe set that is constituted from fixed subframes. The specific subframe set may be a subframe set that is constituted from flexible subframes.

Furthermore, the specific subframe set may be a subframe set that has a high priority in terms of reporting.

In the case where multiple subframe sets are configured for one serving cell to which the TDD scheme is applied, if it is assumed that on a certain subframe, the CSI reporting on each of the multiple subframe sets, which has the same priority, takes place, the terminal device 2 gives preference to the CSI reporting on a specific subframe set that has a high priority. That is, the CSI report that has a low priority is dropped regardless of a type of subframe set. In this case, the base station apparatus 1 does not expect that on the subframe, the CSI reporting that has a low priority is performed.

In the case where multiple subframe sets are configured for one serving cell to which the TDD scheme is applied and where the terminal device 2 has a function of performing transmission of multiple PUCCHs on the same subframe, although on a certain subframe, the CSI reporting on each of the multiple subframe sets takes place, the terminal device 2 performs each of the CSI reporting on a first subframe set and the CSI reporting on a second subframe set using different PUCCHs. More precisely, the PUCCH resource on which the CSI reporting on the first subframe set is performed and the PUCCH resource on which the CSI reporting on the second subframe set is performed may be configured independently. More precisely, a frequency offset may be configured for the PUCCH resource on which the CSI reporting on the first subframe set is performed and the PUCCH resource on which the CSI reporting on the second subframe set is performed. Furthermore, code division multiplexing (CDM) may be performed on the PUCCH resource on which the CSI reporting on the first subframe set is performed and the PUCCH resource on which the CSI reporting on the second subframe set is performed, using the same time frequency resource. Furthermore, in this case, on the subframe, the base station apparatus 1 performs the reception processing on the transmission of the multiple PUCCHs. That is, the base station apparatus 1 performs the reception processing of the CSI report on the multiple subframe sets.

In the case where multiple subframe sets are configured for one serving cell to which the TDD scheme is applied and where the terminal device 2 has the function of performing transmission of multiple PUCCHs on the same subframe, although in a certain subframe, the CSI reporting on each of the multiple subframe sets takes place, the terminal device 2 performs the CSI reporting on each subframe set, using different PUCCHs. In this case, on the subframe, the base station apparatus 1 performs the reception processing on the transmission of the multiple PUCCHs. That is, the base station apparatus 1 performs the reception processing of the CSI report on the multiple subframe sets.

In a case where multiple subframe sets are configured for one serving cell to which the TDD scheme is applied and where the terminal device 2 does not have a function of performing concurrent transmission of the PUSCH and the PUCCH, if the CSI reporting on the multiple subframe sets takes place on the same subframe, the terminal device 2 gives preference to the CSI reporting on a specific subframe set. In this case, the base station apparatus 1 receives the CSI report on the specific subframe set.

In a case where multiple subframe sets are configured for one serving cell to which the TDD scheme is applied and where the terminal device 2 does not have the function of performing the concurrent transmission of the PUSCH and the PUCCH, if the CSI reporting on the multiple subframe sets takes place on the same subframe and if the PUSCH is able to be transmitted on the same subframe, the terminal device 2 performs the transmission on the PUSCH. In this case, the base station apparatus 1 detects the CSI report on each of the multiple subframe sets from the PUSCH.

In the case where multiple subframe sets are configured for one serving cell to which the TDD scheme is applied, if the terminal device 2 has a function of performing multi-CSI reporting, although on a certain subframe, the CSI reporting on each of the multiple subframe sets, which has the same priority, takes place, the terminal device 2 can perform the reporting, using a PUCCH format 3.

In the case where multiple subframe sets are configured for one serving cell to which the TDD scheme is applied, if the terminal device 2 has the function of performing the multi-CSI reporting and a resource for the PUCCH format 3 is present, although on a certain subframe, the CSI reporting on each of the multiple subframe sets, which has the same priority, takes place, the terminal device 2 can perform the reporting using the PUCCH format 3.

In a case where multiple subframe sets are configured for one serving cell to which the TDD scheme is applied and where the terminal device 2 has the function of performing the concurrent transmission of the PUSCH and the PUCCH, if the CSI reporting on the multiple subframe sets takes place on the same subframe, the terminal device 2 may transmit the CSI report on the multiple subframe sets on the PUSCH. In this case, the base station apparatus 1 detects the CSI report on each of the multiple subframe sets from the PUSCH.

In the case where multiple subframe sets are configured for one serving cell to which the TDD scheme is applied, the terminal device 2 may at all times transmit the CSI report on the multiple subframe sets on the PUSCH. In this case, multiple subframe sets are configured for a certain terminal device 2, the base station apparatus 1 recognizes that the CSI reporting is at all times performed by the terminal device 2 on the PUSCH, and performs the reception processing. At this time, the base station apparatus 1 does not expect that the CSI reporting is performed on the PUCCH. In this case, the CSI reporting is not performed until PUSCH transmission takes place.

In the case where multiple subframe sets are configured for one serving cell to which the TDD scheme is applied, if it is assumed that on a certain subframe, the CSI reporting on each of the multiple subframe sets takes place, the terminal device 2 performs each CSI reporting on the same subframe using the PUCCH format 3. That is, the terminal device 2 transmits the CSI reporting on the first subframe set and the CSI reporting on the second subframe set in state of being included in the PUCCH format 3. At this time, the base station apparatus 1 performs the reception processing on the PUCCH format 3, and detects the CSI report on each subframe set. In this case, the terminal device 2 supports a function of performing the transmission of the PUCCH format 3. Furthermore, in this case, the terminal device 2 may not support the function of the concurrent transmission of the PUSCH and the PUCCH.

In the PUCCH format 3, if it is assumed that concurrent transmission of the HARQ and the CSI is supported and on a certain subframe and that the CSI reporting on each of the multiple subframe sets takes place, the terminal device 2 transmits the CSI report on each of the multiple subframe sets using the PUCCH format 3. At this time, the base station apparatus 1 performs the reception processing on the PUCCH format 3, and detects the CSI report on each subframe set.

In a case where multiple subframe sets are configured for one serving cell to which the TDD scheme is applied and where the terminal device 2 does not have a function of transmitting the CSI in the PUCCH format 3, if it is assumed that on a certain subframe, the CSI reporting on the each of the multiple subframe sets takes place, the terminal device 2 gives preference to the CSI reporting on a specific subframe set, and transmits the UCI on the PUCCH. The base station apparatus 1 detects the CSI report on the specific subframe set from the received PUCCH.

In the case where multiple subframe sets are configured for one serving cell to which the TDD scheme is applied, if it is assumed that on a certain subframe, the CSI reporting on each of the multiple subframe sets takes place, and if reporting subframes (reporting instances) that are obtained by an index (cqi-pmi-ConfigIndex, or ri-ConfigIndex) which corresponds to the CSI reporting on each of the multiple subframe sets are the same, the terminal device 2 transmits the CSI report on each subframe set on the PUCCH using the format 3. At this time, if the PDSCH or the PDCCH is not received in the terminal device 2, HARQ-ACK may not be multiplexed. The base station apparatus 1 detects the CSI report on each subframe set from the PUCCH format 3. For example, if the reporting subframes that are indicated by an index (a first index) which corresponds to the CSI reporting on the first subframe set and an index (a second index) that corresponds to the CSI reporting on the second subframe set are the same, the CSI report on the first subframe set and the CSI report on the second subframe set are transmitted using the PUCCH format 3. In this case, the UCI is constituted from pieces of P-CSI (the CSI that corresponds to the first subframe set and the CSI that corresponds to the second subframe set) that corresponds to two subframe sets, respectively.

In the case where multiple subframe sets are configured for one serving cell to which the TDD scheme is applied, if the reporting subframes (reporting instances) that are obtained by the index (cqi-pmi-ConfigIndex, or ri-ConfigIndex) which corresponds to the CSI reporting on each of the multiple subframe sets are the same, the terminal device 2 transmits the CSI report on each subframe set on the PUCCH using the format 3, regardless of the priority of the CSI reporting on each subframe set. At this time, if the PDSCH or the PDCCH is not received in the terminal device 2, the HARQ-ACK may not be multiplexed. The base station apparatus 1 detects the CSI report on each subframe set from the PUCCH format 3.

In the case where multiple subframe sets are configured for one serving cell to which the TDD scheme is applied, if the reporting subframes (reporting instances) that are obtained by the index (cqi-pmi-ConfigIndex, or ri-ConfigIndex) which corresponds to the CSI reporting on each of the multiple subframe sets are the same, the terminal device 2 transmits the CSI report on each subframe set on the PUCCH using the format 3, without depending on the priority of the CSI reporting on each subframe set. However, in a case where the CSI reporting is performed only one-time on one subframe set, the CSI report that has a low priority is dropped. The CSI reporting that has the highest priority is performed on one subframe set.

In the case where multiple subframe sets are configured for one serving cell to which the TDD scheme is applied, the terminal device 2 may preferentially transmit the CSI report that has a longer reporting periodicity. That is, the terminal device 2 gives preference to the CSI reporting that has less reporting opportunity. At this time, the base station apparatus 1 does not expect that the CSI reporting that has a longer reporting periodicity is performed.

In the case where multiple subframe sets are configured for one serving cell to which the TDD scheme is applied, the terminal device 2 may preferentially transmit the CSI report that has a shorter reporting periodicity. That is, the terminal device 2 gives preference to the CSI reporting that has more reporting opportunity. At this time, the base station apparatus 1 does not expect that the CSI reporting that has a shorter reporting periodicity is performed.

In a case where multiple subframe sets are configured for one serving cell to which the TDD scheme is applied and where the CSI report is able to be transmitted on the PUSCH, the terminal device 2 may transmit the CSI report on each subframe set on the same subframe (the same PUSCH on the same subframe). In this case, the base station apparatus 1 detects the CSI report on each subframe set from the PUSCH.

An example of processing 3 will be described below.

If the terminal device 2 does not have the function of performing the concurrent transmission of the PUSCH and the PUCCH in one serving cell, and if it is assumed that the terminal device 2 does not transmit the UCI on the PUSCH, the UCI is transmitted on the PUCCH in a format 1/1a/1b/3 or 2/2a/2b. Furthermore, if the PUSCH transmission that corresponds to the random access response grant or the retransmission of the same transport block that is one portion of the contention-based random access procedure does not take place on the same subframe, the UCI is transmitted on the PUSCH.

If the terminal device 2 has the function of performing the concurrent transmission of the PUSCH and the PUCCH in one serving cell, and if it is assumed that the UCI is constituted from the HARQ-ACK and/or the SR, the UCI may be transmitted on the PUCCH (a PUCCH format 1/1a/1b/3) that uses the format 1/1a/1b/3. Furthermore, if it is assumed that the UCI is constituted from only the periodic CSI, the UCI may be transmitted on the PUCCH that uses a format 2 (a PUCCH format 2). Furthermore, if the UCI is constituted from the periodic CSI and the HARQ-ACK and the terminal device 2 does not transmit the PUSCH, the UCI may be transmitted on the PUCCH (a PUCCH format 2/2a/2b/3) that uses a format 2/2a/2b/3.

If the terminal device 2 has the function of performing the concurrent transmission of the PUSCH and the PUCCH in one serving cell, and if it is assumed that for the terminal device 2, the UCI is constituted from HARQ-ACK/HARQ-ACK+SR/positive SR and P-CSI/A-CSI, the UCI is transmitted on the PUCCH and the PUSCH. Furthermore, the HARQ-ACK/HARQ-ACK+SR/positive SR is transmitted on the PUCCH and if the PUSCH transmission that corresponds to the random access response grant or the retransmission of the same transport block that is one portion of the contention-based random access procedure does not take place on the same subframe, the P-CSI/A-CSI is transmitted on the PUSCH. If the PUSCH transmission that corresponds to the random access response grant or the retransmission of the same transport block that is one portion of the contention-based random access procedure takes place on the same subframe, the P-CSI/A-CSI is not transmitted. In this case, the base station apparatus 1 does not expect that the P-CSI/A-CSI is transmitted from the terminal device 2.

In a case where for the terminal device 2, one or more serving cells are configured and the concurrent transmission of the PUSCH and the PUCCH is not configured, if it is assumed that the terminal device 2 does not transmit the PUSCH on a certain subframe (a subframe n), the UCI is transmitted on the PUCCH that uses the format 1/1a/1b/3 or 2/2a/2b. Furthermore, in this case, if the UCI is constituted from the A-CSI, or the A-CSI and the HARQ-ACK, the UCI is transmitted on the PUSCH in the serving cell. Furthermore, if it is assumed that the UCI is constituted from the P-CSI and/or the HARQ-ACK and that the PUSCH in the primary cell is transmitted on a certain subframe, and if the PUSCH transmission in the primary cell that corresponds to the random access response grant or the retransmission of the same transport block in the contention-based random access procedure does not take place, the UCI is transmitted on the PUSCH. In this case, the base station apparatus 1 detects the UCI from the PUSCH. In the other cases, the UCI is not transmitted. In this case, the base station apparatus 1 does not expect that the UCI is transmitted from the terminal device 2.

In the case where for the terminal device 2, one or more serving cells are configured and the concurrent transmission of the PUSCH and the PUCCH is not configured, if the UCI is constituted from the P-CSI and/or the HARQ-ACK and the terminal device 2 does not transmit the PUSCH in the primary cell, but the terminal device 2 transmits the PUSCH in at least one secondary cell, the UCI is transmitted on the PUSCH in the secondary cell with a minimum secondary cell index among the secondary cells in which the PUSCH is transmitted. In this case, the base station apparatus 1 detects the UCI from the PUSCH in the secondary cell with the minimum secondary cell index in which the PUSCH is transmitted.

In a case where for the terminal device 2, one or more serving cells and the concurrent transmission of the PUSCH and the PUCCH are configured, if it is assumed that the UCI is constituted from the HARQ-ACK and/or the SR, the UCI is transmitted on the PUCCH that uses the format 1/1a/1b/3. Furthermore, in this case, if it is assumed that the UCI is constituted from only the P-CSI, the UCI is transmitted on the PUCCH that uses the format 2. Furthermore, in this case, if it is assumed that the UCI is constituted from the HARQ-ACK and/or the P-CSI and that the terminal device 2 transmits the PUSCH in the primary cell, the terminal device 2 transmits the UCI on the PUCCH and the PUSCH in the primary cell. In this case, the HARQ-ACK is transmitted on the PUCCH that uses the format 1/1a/1b/3, and if the transmission on the PUSCH in the primary cell that corresponds to the random access response grant or the retransmission of the same transport block in the contention-based random access procedure does not take place, the P-CSI is transmitted on the PUSCH. In the other cases, the P-CSI is not transmitted.

In the case where for the terminal device 2, one or more serving cells and the concurrent transmission of the PUSCH and the PUCCH are configured, if it is assumed that the UCI is constituted from the HARQ-ACK and the P-CSI, and that the terminal device 2 transmits the PUSCH in at least one secondary cell without transmitting the PUSCH in the primary cell, the UCI is transmitted on the PUSCH in the secondary cell with the minimum secondary index among the secondary cells in which the PUSCH is transmitted. In this case, the HARQ-ACK is transmitted on the PUCCH that uses the format 1/1a/1b/3 and the P-CSI is transmitted on the PUSCH. In this case, the base station apparatus 1 detects the P-CSI from the PUSCH, and detects the HARQ-ACK from the PUCCH format 1/1a/1b/3.

In the case where for the terminal device 2, one or more serving cells and the concurrent transmission of the PUSCH and the PUCCH are configured, if it is assumed that the UCI is constituted from the HARQ-ACK/HARQ-ACK+SR/positive SR and the A-CSI, the UCI is transmitted on the PUCCH and the PUSCH. In this case, the HARQ-ACK/HARQ-ACK+SR/positive SR is transmitted on the PUCCH that uses the format 1/1a/1b/3, and the A-CSI is transmitted on the PUSCH in a certain serving cell. In this case, the base station apparatus 1 detects the HARQ-ACK/HARQ-ACK+SR/positive SR from the PUCCH format 1/1a/1b/3, and detects the A-CSI from the PUSCH in a certain serving cell.

In a case where one serving cell is configured and where contention between the P-CSI reporting and the HARQ-ACK on the subframe on which the PUSCH transmission does not occur with respect to the terminal device 2 for which the PUCCH format 3 is not configured is incurred, if a parameter relating to concurrent transmission of an AckNack and the CQI is set to TRUE and is notified by the higher layer, the P-CSI report is multiplexed with the HARQ-ACK and is transmitted on the PUCCH. In this case, the base station apparatus 1 detects the HARQ-ACK and the P-CSI from the received PUCCH. In the other cases (if the parameter relating to the concurrent transmission of the AckNack and the CQI is not set to "TRUE") the CSI is dropped.

In a case where in the TDD scheme, one serving cell is configured and the contention between the P-CSI reporting and the HARQ-ACK occurs on the subframe on which the PUSCH transmission does not take place with respect to the terminal device 2 for which the PUCCH format 3 is configured is incurred, if any one of the parameter relating to the concurrent transmission of the AckNack and the CQI or a parameter relating to the concurrent transmission of the AckNack and the CQI in the format 3 is set to TRUE and is notified by the higher layer, the P-CSI report is multiplexed with the HARQ-ACK and is transmitted. In the other cases, the CSI is dropped.

Whether the periodic CSI reporting is performed using the PUCCH or is performed using the PUSCH may be determined depending on whether or not the terminal device 2 supports the function of performing the concurrent transmission of the PUSCH and the PUCCH. For example, in a case where the terminal device 2 does not have the function of performing the concurrent transmission of the PUSCH and the PUCCH, the periodic CSI reporting is performed using the PUCCH. Furthermore, in a case where the terminal device 2 supports the function of performing the concurrent transmission of the PUSCH and the PUCCH (the transmission of the PUSCH and the PUCCH on the same subframe), if the transmission of the PUSCH takes place on the subframe on which the periodic CSI reporting is performed, the periodic CSI reporting is performed using the PUSCH. Furthermore, if the transmission of the PUSCH does not take place on the subframe on which the periodic CSI reporting is performed, the periodic CSI reporting is performed using the PUCCH.

Moreover, according to the embodiment of the present invention, in a case where multiple-times CSI reporting is performed using the PUCCH format 3, a PUCCH format that is different from the PUCCH format 3 may be available. For example, a PUCCH format 3a may be available, a PUCCH format 3b may be available, and a PUCCH format 4 may be available. More precisely, multiple CSI reports are transmitted to the base station apparatus 1 using the PUCCH format.

In a case where multiple subframe sets are configured for one cell, for the terminal device 2, transmit power for each of the P-SRS and the PUSCH is set using a common parameter (a nominal power, a channel loss compensation coefficient, a power correction value that is obtained by a transmit power control (TPC) command, or the like), without depending on a subframe on which the P-SRS is transmitted. Moreover, the TPC command is a parameter that is used to adjust a power.

Furthermore, without depending on a subframe on which the A-SRS is transmitted, transmit power for each of the A-SRS and the PUSCH is set using the common parameter (the nominal power, the channel loss compensation coefficient, the power correction value that is obtained by the TPC command, or the like). More precisely, the terminal device 2 for which multiple subframe sets are not configured for one cell sets the transmit powers for the P-SRS, the A-SRS, and the PUSCH using at least one common parameter. At this point, the TPC command is one field that is set for the DCI format. A value of a TPC command field and the power correction value are managed using a table, and associated in advance with each other. More precisely, in other words, the power correction value that is obtained by the TPC command can be said to be a power correction value that is associated with the value of the TPC command field.

More precisely, in other words, the power correction value that is obtained by the TPC command can be said to be a power adjustment value that is determined based on the power correction value that is associated with the value of the TPC command field. An initial value for the power adjustment value may be 0. In a case where a UE-specific power control parameter is changed or re-configured, the initial value for the power adjustment value may be 0. In a case where a random access response message for a serving cell c is received, the initial value for the power adjustment value may be determined based on transmit power control for random access. Moreover, the power adjustment value may be configured based on the power correction value that is obtained by the TPC command.

In other words, in a case where multiple subframe sets (subframe subsets, or subframe types) are configured (constituted, set, or defined) for the terminal device 2 by satisfying a specific condition, the transmit power for the P-SRS is set based on a parameter that is used for power control for the PUSCH which is transmitted on the uplink subframe that is included in the first subframe set (or the second subframe set), without depending on the subframe on which the P-SRS is transmitted. For example, the specific condition may be one for setting a first configuration and a second configuration. In a case where the transmission is performed on the uplink subframe that is included in the first subframe set, the transmit power for the A-SRS is set based on the parameter that is used for the power control for the PUSCH which is transmitted on the uplink subframe that is included in the first subframe set. In a case where the transmission is performed on the uplink subframe that is included in the second subframe set, the transmit power for the A-SRS is set based on the parameter that is used for the power control for the PUSCH which is transmitted on the uplink subframe that is included in the second subframe set. However, in the case of the A-SRS, without depending on the subframe set, power offsets (pSRS-OffsetAp) for the PUSCH and the A-SRS may be in common use. At this point, in other words, the subframe that is included in the subframe set can be said to be a subframe that belongs to the subframe set.

In a case where in a situation in which multiple subframe sets are set, multiple configurations of parameters relating to power control for the PUSCH are set for the terminal device 2, the transmit power for the P-SRS is set based on the parameter that is used for the power control for the PUSCH which is transmitted on the uplink subframe that is included in the first subframe set (or the second subframe set), and the transmit power for the A-SRS is set based on a parameter that is used for the power control for the PUSCH that is transmitted on the same subframe set, according to the subframe set to which the subframe on which the A-SRS is transmitted belongs. Moreover, in a case where multiple configurations of parameters relating to the power control for the PUSCH are not set, the terminal device 2 may not perform the processing described above although the multiple subframe sets are configured.

At this point, a PUSCH nominal power (p0-Nominal-PUSCH) may be included in the configuration of the parameter relating to the power control for the PUSCH. Furthermore, a UE-specific PUSCH power (p0-UE-PUSCH) may be included in the configuration of the parameter relating to the power control for the PUSCH. Furthermore, the channel loss compensation coefficient (alpha) may be included in the configuration of the parameter relating to the power control for the PUSCH.

Furthermore, the power correction value that is obtained by a transmit power command for the PUSCH may be included in the configuration of the parameter relating to the power control for the PUSCH. Moreover, among these parameters that are set for the configuration of the parameter relating to the power control for the PUSCH, some of the parameters may be notified (transferred or transmitted) with the higher layer signaling (the RRC signaling or L3 signaling).

Furthermore, among the parameters that are set for the configuration of the parameter relating to the power control for the PUSCH, some of the parameters may be notified by the L1 signaling (in the DCI format, with a control signal, or on the PDCCH or the EPDCCH). Furthermore, among the parameters that are set for the configuration of the parameter relating to the power control for the PUSCH, some of the parameters may be notified with the system information.

Furthermore, in a case where multiple configurations of shared parameters relating to the power control for the PUSCH are set and where a configuration of a dedicated parameter relating to the power control for the PUSCH is not set, with regard to a parameter, a default (a default value or a default configuration) for which is set in advance, such a default may be used. Furthermore, the configuration of the parameter relating to the power control for the PUSCH that corresponds to the first subframe set (a specific subframe set) may be notified with the system information, and the configuration of the parameter relating to the power control for the PUSCH that corresponds to the second subframe set (a subframe set other than the specific subframe set) may be notified with the higher layer signaling. Furthermore, in a case where the configuration of the parameter relating to the power control for the PUSCH for each of the first subframe set and the second subframe set is not notified, with regard to a parameter, a default (a default value or a default configuration) for which is set in advance, the terminal device 2 sets the transmit power for the PUSCH or the SRS using such a default. More precisely, in a case where the configuration of the parameter relating to the power control that corresponds to the subframe set is not notified to the terminal device 2 for which multiple subframe sets are configured, the power control that corresponds to each subframe set is performed based on a default for each parameter. Moreover, the subframe set and the subframe type may be associated with each other. Moreover, information relating to the first configuration and/or information relating to the second configuration may be transmitted with the system information.

Furthermore, the information relating to the first configuration and/or the information relating to the second configuration may be transmitted with the higher layer signaling (the L3 signaling, the RRC signaling, implicit signaling, and semi-static signaling). Furthermore, any one of the information relating to the first configuration and the information relating to the second configuration may be transmitted with dynamic signaling (the L1 signaling, control signaling, and explicit signaling). Furthermore, any one of the information relating to the first configuration and the information relating to the second configuration may be transmitted with MAC signaling (L2 signaling).

Furthermore, according to the embodiment of the present invention, the terminal device 2 may switch a method of configuring the transmit power of each of the P-SRS and the A-SRS, depending on whether or not multiple subframe sets are configured. More precisely, in a case where the multiple subframe sets (the subframe types or the subframe subsets) are not configured (constituted, set, or defined), the terminal device 2 sets the transmit power for the P-SRS based on the parameter that is used for the power control for the PUSCH. Furthermore, the terminal device 2 sets the transmit power for the A-SRS based on the parameter that is used for the power control for the PUSCH. In a case where multiple subframe sets are configured, the terminal device 2 may set the transmit power for the P-SRS based on a parameter that is used for the power control for the PUSCH which is transmitted on the uplink subframe that is included in one subframe set (for example, the first subframe set, a prescribed subframe set, or a specific subframe set), among multiple subframe sets. Furthermore, the terminal device 2 may set the transmit power for the A-SRS based on the parameter that is used for the power control for the PUSCH which is transmitted on each of the multiple subframe sets.

For example, in a case where the A-SRS is transmitted on the uplink subframe that is included in the first subframe set, the transmit power for the A-SRS is set based on a parameter that is used for the power control for the PUSCH that is transmitted on the first subframe set. In a case where the A-SRS is transmitted on the uplink subframe that is included in the second subframe set, the transmit power for the A-SRS is set based on a parameter that is used for the power control for the PUSCH that is transmitted on the second subframe set. The same processing is performed for a third or later subframe set. Moreover, in a case where the power offsets for the PUSCH and the SRS are configured for every subframe set, the transmit power for the SRS that is transmitted on the uplink subframe that is included in the subframe set is set using the power offsets as well. At this point, the uplink subframe is a subframe on which the uplink signal is able to be transmitted.

FIG. 1 is a schematic block diagram illustrating a configuration of the base station apparatus 1 according to the present invention. As illustrated, the base station apparatus 1 is constituted to include a higher layer processing unit 101, a control unit 103, a reception unit 105, a transmission unit 107, a channel measurement unit 109, and a transmit and receive antenna 111. Furthermore, the reception unit 105 is constituted to include a decoding unit 1051, a demodulation unit 1053, a demultiplexing unit 1055, and a wireless reception unit 1057. Furthermore, reception processing by the base station apparatus 1 is performed in the higher layer processing unit 101, the control unit 103, the reception unit 105, and the transmit and receive antenna 111. Furthermore, the transmission unit 107 is constituted to include a coding unit 1071, a modulation unit 1073, a multiplexing unit 1075, a wireless transmission unit 1077, and a downlink reference signal generation unit 1079. Furthermore, transmission processing by the base station apparatus 1 is performed in the higher layer processing unit 101, the control unit 103, the transmission unit 107, and the transmit and receive antenna 111.

The higher layer processing unit 101 performs processing of a medium access control (MAC) layer, a packet data convergence protocol (PDCP) layer, a radio link control (RLC) layer, and a radio resource control (RRC) layer.

The higher layer processing unit 101 generates information that is arranged in each channel for the downlink, or acquires such information from a higher node, and outputs the generated or acquired information to the transmission unit 107. Furthermore, the higher layer processing unit 101 allocates a radio resource to which the terminal device 2 allocates the PUSCH that is uplink data information, from uplink radio resources.

Furthermore, the higher layer processing unit 101 determines a radio resource to which the PDSCH that is downlink data information is allocated, for downlink radio resources. The higher layer processing unit 101 generates the DCI indicating the allocation of the radio resource, and transmits the generated DCI to the terminal device 2 through the transmission unit 107.

Furthermore, when the radio resource to which the PUSCH is allocated, the higher layer processing unit 101 preferentially allocates a radio resource that has good channel quality, based on a result of uplink channel measurement that is input from the channel measurement unit 109. More precisely, the higher layer processing unit 101 sets configurations of various downlink signals and configurations of various uplink signals for a certain terminal device 2 or a certain cell.

Furthermore, the higher layer processing unit 101 may set the configurations of the various downlink signals and the configurations of the various uplink signals for every cell.

Furthermore, the higher layer processing unit 101 may set the configurations of the various downlink signals and the configurations of the various uplink signals for every terminal device 2. Furthermore, the higher layer processing unit 101 may set first to n-th configurations (n is a natural number), for a certain terminal device 2 or a certain cell, more precisely, in a UE-specific and/or cell-specific manner, and may transmit the first configuration to n-th configuration that are set, to the terminal device 2 through the transmission unit 107. For example, the configuration of the downlink signal and/or the configuration of the uplink signal may include a parameter relating to the resource allocation. Furthermore, the configuration of the downlink signal and/or the configuration of the uplink signal may include a parameter that is used for sequence calculation. Moreover, in some cases, the radio resource described above is referred to as a time frequency resource, a subcarrier, a resource element (RE), a resource element group (REG), a control channel element (CCE), a resource block (RB), a resource block group (RBG), or the like.

Information relating to the configurations and/or the control, which are described above, may be defined as an information element. Furthermore, the information relating to the configurations and the control, which are described above, may be defined as an RRC message. Furthermore, the information relating to the configurations and/or the control, which are described above, may be transmitted to the terminal device 2, with the system information. Furthermore, the information relating to the configuration and/or the control, which are described above, may be transmitted to the terminal device 2, with the dedicated signaling.

Furthermore, the higher layer processing unit 101 sets at least one TDD UL/DL configuration (TDD config, tdd-Config, or uplink-downlink configuration(s)) for the system information block type 1. The TDD UL/DL configuration may be defined as illustrated in FIG. 3. A configuration of the TDD may be indicated by configuring an index. Moreover, as a downlink reference, a second TDD UL/DL configuration may be set. Furthermore, multiple types of system information blocks may be prepared. For example, the system information block type 1 includes an information element relating to the TDD UL/DL configuration. Furthermore, the system information block type 2 includes an information element relating to the radio resource control. Moreover, a certain information element may include a parameter relating to the certain information element, as an information element. For example, a so-called parameter in the physical layer may be defined as an information element in the higher layer. Furthermore, one portion of the information element may be referred to as a parameter. Furthermore, what results from putting together (bundling together or listing up) multiple types of parameters may be referred to as an information element.

Moreover, according to the present invention, an identity, an identifier, or an identification is referred to as an ID (an identifier, an identification code, or an identification number). As IDs (UE IDs) that are configured in a UE-specific manner, there are a cell radio network temporary identifier (C-RNTI), a semi-persistent scheduling C-RNTI (SPS C-RNTI), a temporary C-RNTI, a TPC-PUSCH RNTI, a TPC-PUCCH RNTI, and a random value for contention resolution. These IDs are used on a cell basis. The IDs are set by the higher layer processing unit 101.

Furthermore, the higher layer processing unit 101 sets various identifiers for the terminal devices 2, and notifies the terminal device 2 of the various identifiers through the transmission unit 107. For example, the RNTI is configured and notified to the terminal device 2. Furthermore, a physical cell ID, a virtual cell ID, or an ID that is equivalent to the virtual cell ID is set and is notified. For example, as IDs that are equivalent to the virtual cell ID, there are IDs (a PUSCH ID, a PUCCH ID, a scrambling initiation ID, a reference signal ID (RS ID), and the like) that can be configured in a manner that is specific to the physical channel. The physical cell ID or the virtual cell ID is used for sequence generation of the physical channel or of the physical signal.

The higher layer processing unit 101 generates control information for controlling the reception unit 105 and the transmission unit 107, based on the uplink control information (UCI) that is notified on the PUCCH from the terminal device 2, and on a buffer condition that is notified from the terminal device 2 or various pieces of configuration information (the RRC message, the system information, the parameter, and the information element) of each of the terminal devices 2 that are configured by the higher layer processing unit 101, and outputs the generated control information to the control unit 103. Moreover, at least one among the ACK/NACK, the SR, and the CSI is included in the UCI. Moreover, at least one among the CQI, the PMI, and the RI is included in the CSI.

The higher layer processing unit 101 configures a transmit power for the uplink signal (the PRACH, the PUCCH, the PUSCH, the UL DMRS, the P-SRS, or the A-SRS) and a parameter relating to the transmit power.

Furthermore, the higher layer processing unit 101 transmits a transmit power for the downlink signal (the CRS, the DL DMRS, the CSI-RS, the PDSCH, the PDCCH/EPDCCH, or the like) and a parameter relating to the transmit power to the terminal device 2 through the transmission unit 107. More precisely, the higher layer processing unit 101 transmits the information relating to the power control for the uplink and the information relating to the power control for the downlink to the terminal device 2 through the transmission unit 107. In other words, the higher layer processing unit 101 sets a configuration of a parameter relating to power control by each of the base station apparatus 1 and the terminal device 2. For example, the higher layer processing unit 101 notifies the terminal device 2 of a parameter (the parameter relating to the power control for the downlink) relating to transmit power for the base station apparatus 1.

Furthermore, the higher layer processing unit 101 notifies the terminal device 2 of a parameter relating to a maximum transmit power for the terminal device 2.

Furthermore, the higher layer processing unit 101 notifies the terminal device 2 of information relating to power control for various physical channels.

Furthermore, the higher layer processing unit 101 sets the transmit power for the terminal device 2, in such a manner that the PUSCH and the like satisfy prescribed channel quality according to information indicating the amount of interference from a neighbor base station apparatus, information indicating the amount of interference, which is notified from the neighbor base station apparatus and which is given to the neighbor base station apparatus 1, channel quality that is input from the channel measurement unit 109, or the like, or considering interference to the neighbor base station apparatus 1, and transmits information indicating these configurations to the terminal device 2 through the transmission unit 107.

Specifically, the higher layer processing unit 101 transmits a nominal power ($P_{O\_NOMINAL\_PUSCH}$ (p0-NominalPUSCH) or $P_{O\_NOMINAL\_PUCCH}$ (p0-NominalPUCCH)) for each of the PUSCH and the PUCCH, a channel loss compensation coefficient (attenuation coefficient) $\alpha_c$ (alpha), a power offset (deltaPreambleMsg3) for message 3, a power offset (deltaFList-PUCCH) that is stipulated for every PUCCH format, and the like, as information (a shared parameter relating to the uplink power control) that is shared among the terminal devices 2 or a parameter common to the terminal devices 2, with the system information. At this time, a power offset (deltaF-PUCCH-Format3) in the PUCCH format 3 and a power offset (deltaF-PUCCH-Format1bCS) in a delta PUCCH format 1bCS may be notified additionally. Furthermore, these parameters may be notified with the RRC message (the higher layer signaling or the dedicated signaling).

Furthermore, the higher layer processing unit 101 notifies a UE-specific PUSCH power $P_{O\_UE\_PUSCH}$ (p0-UE-PUSCH), a delta MCS enabler Ks (deltaMCS-Enabled), an accumulation enabler (accumulationEnabled), a UE-specific PUCCH power (p0-UE-PUCCH), a P-SRS power offset (pSRS-Offset), and a filter coefficient (filterCoefficient), as a parameter (a dedicated parameter relating to the uplink power control) that can be configured for every terminal device 2, with the RRC message. At this time, a power offset (deltaTxD-OffsetListPUCCH) for transmit diversity in each PUCCH format and an A-SRS power offset (pSRS-OffsetAp) may be notified. The delta MCS enabler is a parameter (information) that indicates whether or not delta MCS is applied. In a case where the delta MCS is enabled, the processing is performed with Ks=1.25. In a case where the delta MCS is not enabled, the processing is performed with Ks=0. The accumulation enabler is a parameter (information) that indicates whether or not accumulation (aggregation processing) by a transmit power control command is performed. In a case where the accumulation is enabled, the terminal device 2 performs the accumulation (the aggregation processing) of the power correction values that are obtained by the TPC command, and then sets the transmit power based on a result (an aggregation value or an accumulation value) of performing the accumulation. Furthermore, in a case where the accumulation is not enabled, the terminal device 2 sets the transmit power based on the power correction value that is obtained from one TPC command. Moreover, $\alpha_c$ that is mentioned here is a coefficient that, together with a path loss value, is used for setting the transmit power and that indicates the extent to which a path loss is compensated for, in other words, a coefficient (an attenuation coefficient or a channel loss compensation coefficient) for determining to what extent the transmit power is increased or decreased according to the path loss (more precisely, for determining to what extent the transmit power is adjusted). Normally, $\alpha_c$ is a value from 0 to 1. If $\alpha_c$ is 0, the adjustment of the power in accordance with the pass loss is not made. If $\alpha_c$ is 1, the transmit power for the terminal device 2 is adjusted in such a manner that the path loss does not have an effect on the base station apparatus 1. These pieces of information may be transmitted as re-configuration information to the terminal device 2.

Furthermore, the higher layer processing unit 101 may notify a parameter (a power offset (messagePowerOffsetGroupB) for a group B, a power lamping step (powerRampingStep), or an initial reception target power (preambleInitialReceivedTargetPower) for a preamble) relating to power control for the random access channel. Furthermore, the higher layer processing unit 101 may notify a power ratio (p-C) between the PDSCH and CSI-RS, a reference signal power (referenceSignalPower) for the base station apparatus 1 (or the CRS that is transmitted from the base station apparatus 1), a power ratio $P_A$(p-a) between the PDSCH and the CRS on a subframe on which the CRS is not present, an index $P_B$(p-b) that indicates a power ratio between the PDSCH and the CRS on the subframe on which the CRS is present, and a power shift $\Delta_{offset}$ (nomPDSCH-RS-EPRE-Offset) of the power ratio between the PDSCH and the CRS, as the parameter relating to the power control for the downlink.

Furthermore, the higher layer processing unit 101 may notify a parameter (P-Max) for limiting a maximum transmit power for the terminal device 2 in a carrier frequency, with the system information (for example, the SIB1). Some of these parameters may be notified with the higher layer signaling. Configurations of the parameters relating to the power control may be set for every serving cell. The configurations of the parameters relating to the power control may be performed for every subframe set. The reference signal power for the base station apparatus 1 may be referred to as the transmit power for the base station apparatus 1.

Furthermore, the higher layer processing unit 101 may set the transmit power for the downlink signal or for the uplink signal, or the parameter relating to the transmit power for every terminal device 2. Furthermore, the higher layer processing unit 101 may configure a transmit power for a downlink or uplink signal that is common to the terminal devices 2, or a parameter relating to the transmit power. Information relating to these parameters may be transmitted, as information relating to the power control for the uplink and/or information relating to the power control for the downlink, to the terminal device 2.

The higher layer processing unit 101 performs configuration of various IDs relating to various physical channels or physical signals, and outputs pieces of information relating to the configuration of the IDs to the reception unit 105 and the transmission unit 107 through the control unit 103. For example, the higher layer processing unit 101 configures a value of the RNTI (UE ID) at which the CRC that is included in the downlink control information format is scrambled. Furthermore, the higher layer processing unit 101 may configure values of various identifiers, such as a cell radio network temporary identifier (C-RNTI), a temporary C-RNTI, a paging-RNTI (P-RNTI), a random access-RNTI (RA-RNTI), and a semi-persistent scheduling C-RNTI (SPS C-RNTI).

Furthermore, the higher layer processing unit 101 configures a value of an ID such as a physical cell ID, a virtual cell ID, or a scramble initialization ID. These pieces of configuration information are output to each processing unit through the control unit 103. Furthermore, the pieces of configuration information may be transmitted, as the RRC message, the system information, the UE-specific dedicated information, and the information element, to the terminal device 2. Furthermore, some of the RNTIs may be transmitted using an MAC control element (CE).

Furthermore, the higher layer processing unit 101 transmits information relating to a resource for the PUCCH format 1/1a/1b to the terminal device 2 through the transmission unit 107.

Furthermore, the higher layer processing unit 101 transmits information relating to a resource for the PUCCH format 2/2a/2b to the terminal device 2 through the transmission unit 107.

Furthermore, the higher layer processing unit 101 transmits information relating to a resource for the PUCCH format 3 to the terminal device 2 through the transmission unit 107.

Furthermore, the higher layer processing unit 101 transmits information relating to a PUCCH configuration, which includes information relating to the PUCCH format, to the terminal device 2 through the transmission unit 107. Moreover, the information relating to the PUCCH configuration may be notified using the higher layer signaling.

Furthermore, the higher layer processing unit 101 may configure the virtual cell ID (an ID for scrambling) for every PUCCH format, and may transmit the configured virtual ID to the terminal device 2 through the transmission unit 107.

Furthermore, the higher layer processing unit 101 transmits information relating to the CSI reporting (CQI reporting) to the terminal device 2 through the transmission unit 107. Moreover, the information relating to the CSI reporting (the CQI reporting) may be notified by the higher layer signaling.

A parameter (simultaneousAckNackAndCQI or simultaneousAckNackAndCQI-Format3) indicating whether or not to perform concurrent transmission of the ACK/NACK and the CQI (the CSI) may be included in the information relating to the CSI reporting. Furthermore, an index (cqi-pmi-ConfigIndex) relating to a CQI PMI configuration may be included in the information relating to the CSI reporting. Furthermore, an index (ri-ConfigIndex) relating to an RI configuration may be included in the information relating to the CSI reporting. Furthermore, an index relating to the PUCCH resource for the CQI (the CSI) may be included in the information relating to the CSI reporting. A parameter relating to a CSI measurement subframe set may be included in the information relating to the CSI reporting. An index (cqi-PUCCH-ResourceIndx) relating to the PUCCH resource for the CQI (the CSI) may be included in the information relating to the CSI reporting. Multiple indexes or multiple parameters relating to the subframe set may be configured. Furthermore, an index (cqi-PUCCH-ResourceIndxP1) relating to the PUCCH resource for an antenna port 1 for the CQI (the CSI) may be included in the information relating to the CSI reporting. Furthermore, information indicating whether or not to perform the multiple-times CSI reporting in the PUCCH format 3 may be included in the information relating to the CSI reporting.

The MAC CE is transmitted through the PDSCH. The MAC CE is information or a signal that is processed in a MAC layer.

The control unit 103 generates a control signal for performing the control of the reception unit 105 and the transmission unit 107, based on control information from the higher layer processing unit 101. The control unit 103 outputs the generated control signal to the reception unit 105 and the transmission unit 107 and performs the control of the reception unit 105 and the transmission unit 107.

In accordance with the control signal that is input from the control unit 103, the reception unit 105 outputs information, which results from demultiplexing, demodulating, and decoding a reception signal that is received from the terminal device 2 through the transmit and receive antenna 111, to the higher layer processing unit 101.

The wireless reception unit 1057 converts (down-converts) an uplink signal received through the transmit and receive antenna 111 into an intermediate frequency (IF), removes an unnecessary frequency component, controls an amplification level in such a manner that a signal level is suitably maintained, performs orthogonal demodulation based on an in-phase component of and an orthogonal component of the received signal, and converts an analog signal that results from performing the orthogonal demodulation, into a digital signal.

Furthermore, the wireless reception unit 1057 removes a portion equivalent to a guard interval (GI) from the digital signal that results from the conversion. The wireless reception unit 1057 performs fast Fourier transform (FFT) on the signal from which the guard interval is removed, extracts a signal in the frequency domain, and outputs the extracted signal to the demultiplexing unit 1055.

The demultiplexing unit 1055 demultiplexes the signal that is input from the wireless reception unit 1057 into signals such as the PUCCH, the PUSCH, the UL DMRS, and the SRS. Moreover, the demultiplexing is performed based on allocation information on a radio resource, which is determined in advance by the base station apparatus 1 and is notified to each terminal device 2. Furthermore, the demultiplexing unit 1055 makes an adjustment of channels, that is, the PUCCH and the PUSCH, from a channel estimate that is input from the channel measurement unit 109. Furthermore, the demultiplexing unit 1055 outputs the UL DMRS and the SRS, which result from the demultiplexing, to the channel measurement unit 109.

The demodulation unit 1053 performs inverse discrete Fourier transform (IDFT) on the PUSCH, acquires a modulation symbol, and performs modulation of the reception signal on each of the modulation symbols on the PUCCH and the PUSCH, using a modulation scheme that is prescribed in advance or that is notified by the base station apparatus 1 to each of the terminal devices 2 with the downlink control information, such as binary phase shift keying (BPSK), quadrature phase shift keying (QPSK), 16 quadrature amplitude modulation (16 QAM), or 64 quadrature amplitude modulation (64 QAM).

The decoding unit 1051 performs decoding on the coding bits on the PUCCH and the PUSCH, which result from the demodulation, at a coding rate in compliance with a coding scheme that is prescribed in advance, or at a coding rate that is prescribed in advance or is notified in advance by the base station apparatus 1 to the terminal device 2 with the uplink grant (UL grant), and outputs the data information and the uplink control information, which result from the decoding, to the higher layer processing unit 101.

The channel measurement unit 109 measures the channel estimate, the channel quality, and the like from the UL DMRS and the SRS, which are uplink demodulation reference signals that are input from the demultiplexing unit 1055, and outputs a result of the measurement to the demultiplexing unit 1055 and the higher layer processing unit 101. Furthermore, the channel measurement unit 109 measures received powers and/or received qualities of first to n-th signals, and outputs a result of the measurement to the demultiplexing unit 1055 and the higher layer processing unit 101.

The transmission unit 107 generates a reference signal for the downlink (a downlink reference signal) in accordance with the control signal that is input from the control unit 103, codes and modulates the data information that is input from the higher layer processing unit 101 and the downlink control information, and multiplexes the PDCCH (EPDCCH), the PDSCH, and the downlink reference signal, and transmits the downlink signal to the terminal device 2 through the transmit and receive antenna 111.

Furthermore, in a case where multiple subframe sets or multiple TDD UL/DL configurations are set for a certain terminal device 2 that belongs to a cell to which the TDD scheme is applied, the transmission unit 107 transmits the downlink signal based on the downlink subframe that is indicated in a downlink reference TDD UL/DL configuration. Furthermore, the transmission unit 107 transmits the downlink signal based on the downlink subframe that is indicated in the TDD UL/DL configuration which is included in the SIB1.

The coding unit 1071 performs coding, such as turbo coding, convolutional coding, and block coding, on the downlink control information that is input from the higher layer processing unit 101 and on the data information. The modulation unit 1073 modulates the coding bits with the modulation scheme such as the QPSK, the 16 QAM, or the 64 QAM. The downlink reference signal generation unit 1079 generates the downlink reference signal, with a sequence that is obtained according to a rule that is prescribed in advance based on a cell identifier (a cell ID, a cell identity, or a cell identification) and the like for identifying the base station apparatus 1 and that is already known to the terminal device 2. The multiplexing unit 1075 multiplexes each modulated channel and the generated downlink reference signal.

The wireless transmission unit 1077 performs inverse fast Fourier transform (IFFT) on a modulation symbol that results from the multiplexing, performs the modulation in compliance with an OFDM scheme, attaches the guard interval to an OFDM symbol that results from the OFDM modulation, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency, removes unnecessary frequency components, performs power amplification, and outputs a final result to the transmit and receive antenna 111 for transmission.

The transmission unit 107 generates a sequence for each downlink signal (the physical channel/the physical signal), sets a transmit power for each downlink signal, and transmits the generated sequence to the terminal device 2. At this time, at the beginning of each radio frame, the transmission unit 107 initializes a sequence generator for each downlink signal, using an initial value for each downlink signal. Moreover, a pseudo-random sequence generator may be included in the sequence generator. Furthermore, a scrambling sequence generator may be included in the sequence generator.

Figure 2:
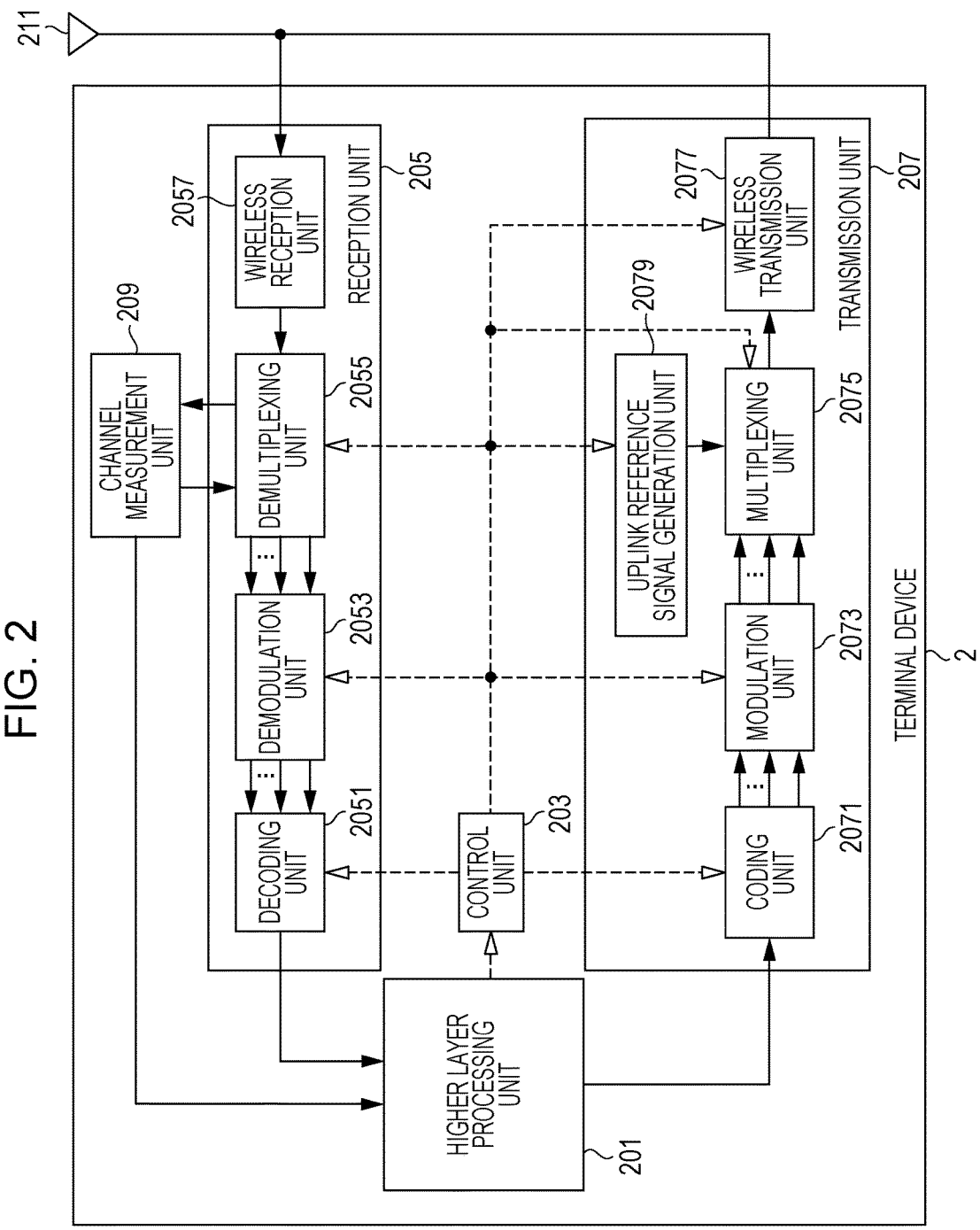
FIG. 2 is a schematic block diagram illustrating a configuration of a terminal device 2 according to the first embodiment of the present invention.

FIG. 2 is a schematic block diagram illustrating a configuration of the terminal device 2 according to the present embodiment. As illustrated, the terminal device 2 is constituted to include a higher layer processing unit 201, a control unit 203, a reception unit 205, a transmission unit 207, a channel measurement unit 209, and a transmit and receive antenna 211. Furthermore, the reception unit 205 is constituted to include a decoding unit 2051, a demodulation unit 2053, a demultiplexing unit 2055, and a wireless reception unit 2057. Reception processing by the terminal station device 2 is performed in the higher layer processing unit 201, the control unit 203, the reception unit 205, and the transmit and receive antenna 211. Furthermore, the transmission unit 207 is constituted to include a coding unit 2071, a modulation unit 2073, a multiplexing unit 2075, and a wireless transmission unit 2077. Furthermore, transmission processing by the terminal device 2 is performed in the higher layer processing unit 201, the control unit 203, the transmission unit 207, and the transmit and receive antenna 211.

The higher layer processing unit 201 outputs the uplink data information that is generated by a user operation and the like, to the transmission unit. Furthermore, the higher layer processing unit 201 performs the processing of the medium access control (MAC) layer, the packet data convergence protocol (PDCP) layer, the radio link control (RLC) layer, and the radio resource control (RRC) layer.

The higher layer processing unit 201 manages various pieces of configuration information of the terminal device 2 itself. Furthermore, the higher layer processing unit 201 generates information that is arranged in each uplink channel and outputs the generated information to the transmission unit 207. The higher layer processing unit 201 generates the control information for performing the control of the reception unit 205 and the transmission unit 207, based on various pieces of configuration information of the terminal device 2 itself, which are configured based on the downlink control information that is notified from the base station apparatus 1 on the PDCCH and on radio resource control information that is notified on the PDSCH, and which are managed by the higher layer processing unit 201, and outputs the generated control information to the control unit 203.

Furthermore, the higher layer processing unit 201 sets various parameters (an information element and an RRC message) of each signal, based on pieces of information relating to the first to n-th configurations, which are notified from the base station apparatus 1. Furthermore, these pieces of information that are set are generated and are output to the transmission unit 207 through the control unit 203.

The higher layer processing unit 201 acquires from the reception unit 205 information indicating a sounding subframe (an SRS subframe or an SRS transmission subframe) that is a subframe for which to reserve a radio resource for transmitting the SRS that is broadcast by the base station apparatus 1, and a bandwidth of the radio resource that is reserved to transmit the SRS within the sounding subframe, information indicating a subframe on which to transmit a periodic SRS that is notified by the base station apparatus 1 to the terminal device 2, a frequency band, and the amount of cyclic shift that is used in a CAZAC sequence for the P-SRS, and information indicating a frequency band in which to transmit an A-SRS that is notified by the base station apparatus 1 to the terminal device 2, and the amount of cyclic shift that is used in a CAZAC sequence for the aperiodic SRS.

The higher layer processing unit 201 performs control of SRS transmission in accordance with the information described above. Specifically, the higher layer processing unit 201 controls the transmission unit 207 in such a manner that, in accordance with information relating to the periodic SRS described above, the periodic SRS is transmitted one-time or periodically. Furthermore, in a case where, in the SRS request (an SRS indicator) that is input from the reception unit 205, the transmission of the A-SRS is requested, the higher layer processing unit 201 transmits the A-SRS only the number of times (for example, one-time) that is prescribed in advance, in accordance with information relating to the aperiodic SRS.

Furthermore, the higher layer processing unit 201 performs control of the transmit power for the PRACH, the PUCCH, the PUSCH, the P-SRS, and the A-SRS, based on information relating to the control of the transmit power for various uplink signals that are transmitted from the base station apparatus 1. Specifically, the higher layer processing unit 201 configures the transmit power for the various uplink signals based on various pieces of information relating to the uplink power control, which are acquired from the reception unit 205. For example, the transmit power for the SRS is controlled based on $P_{0\_PUSCH}$, $\alpha_c$, a power offset $P_{SRS\_OFFSET}$ (0) (a first power offset (pSRS-Offset)) for the P-SRS, a power offset $P_{SRS\_OFFSET}$ (1) (a second power offset (pSRS-OffsetAp)) for the A-SRS, and a TPC command for the PUSCH. More precisely, the transmit power for the SRS is set based on the power control for the PUSCH. Moreover, the higher layer processing unit 201 causes $P_{SRS\_OFFSET}$ to switch between the first power offset and the second power offset according to whether the SRS is the P-SRS or the A-SRS.

Furthermore, in a case where a third power offset is configured for the P-SRS and/or the A-SRS, the higher layer processing unit 201 sets the transmit power based on the third power offset. Moreover, a value of the third power offset may be configured to be in a wider range than that of the first power offset or the second power offset. The third power offset may be configured for each of the P-SRS and the A-SRS. More precisely, the information relating to the uplink power control is a parameter (an information element or an RRC message) relating to control of transmit powers for various uplink physical channels. Some of these pieces of information may be transmitted with the system information. Furthermore, some of the pieces of information may be transmitted with the higher layer signaling. Some of the pieces of information may be transmitted with the physical channel or the physical signal.

Furthermore, the higher layer processing unit 201 suitably configures a maximum transmit power ($P_{CMAX, c}$) for the terminal device 2 for the serving cell c, according to a condition. In some cases, the higher layer processing unit 201 sets the transmit power for the uplink signal based on a configuration of a parameter relating to the power control, but the maximum transmit power is exceeded. In such a case, the higher layer processing unit 201 instructs the transmission unit 207 to transmit the uplink signal at the maximum transmit power. More precisely, if a calculated transmit power and the maximum transmit power are compared with each other and the calculated transmit power is lower than the maximum transmit power, the uplink signal is transmitted at the calculated transmit power. If the calculated transmit power is higher than the maximum transmit power, the uplink signal is transmitted at the maximum transmit power.

Furthermore, in a case where, in a certain serving cell and on a certain subframe, a sum of a transmit power for the first uplink reference signal and a transmit power for the physical uplink shared channel exceeds the maximum transmit power (for example, $P_{CMAX}$) that is configured for the terminal device 2, the higher layer processing unit 201 outputs indication information to the transmission unit 207 through the control unit 203, in such a manner that the physical uplink shared channel is transmitted. Furthermore, in a case where, in a certain serving cell and on a certain subframe, a sum of the transmit power for the first uplink reference signal and a transmit power for the physical uplink control channel exceeds the maximum transmit power that is configured for the terminal device 2, the higher layer processing unit 201 outputs the indication information to the transmission unit 207 through the control unit 203, in such a manner that the physical uplink control channel is transmitted.

Furthermore, in a case where, in a certain serving cell and on a certain subframe, a sum of a transmit power for the second uplink reference signal and the transmit power for the physical uplink shared channel exceeds a maximum output power $P_{CMAX}$ (UEtotal configure maximum output power) that is configured for the terminal device 2, the higher layer processing unit 201 outputs the uplink data (UL-SCH) to the transmission unit 207 through the control unit 203, in such a manner that the transmission is performed using the PUSCH. Furthermore, in a case where, in a certain serving cell (for example, the serving cell c) and on a certain subframe (for example, the subframe i), a sum of the transmit power for the second uplink reference signal and the transmit power for the PUCCH exceeds the maximum output power, the higher layer processing unit 201 performs outputting to the transmission unit 207 through the control unit 203, in such a manner that the PUCCH is transmitted. Furthermore, in a case where the communication is performed in multiple serving cells at the same time, the higher layer processing unit 201 controls the transmit power for the uplink signal that is transmitted in each serving cell, in such a manner that the maximum output power $P_{CMAX}$ is not exceeded.

Furthermore, in a case where multiple physical channels are transmitted at the same timing (for example, on a subframe), the higher layer processing unit 201 can control the transmit power for the various physical channels or can control the transmission of the various physical channels according to priorities of various physical channels. The higher layer processing unit 201 outputs the control information to the transmission unit 207 through the control unit 203.

Furthermore, in a case where carrier aggregation (cell aggregation) that uses multiple component carriers (multiple cells) which correspond to multiple serving cells or each of the multiple serving cells is performed, the higher layer processing unit 201 can control the transmit power for the various physical channels or can control the transmission of the various physical channels according to the priorities of the physical channels. Furthermore, the higher layer processing unit 201 may perform the transmission control of the various physical channels that are transmitted from a cell, according to a priority of the cell. The higher layer processing unit 201 outputs the control information to the transmission unit 207 through the control unit 203.

The higher layer processing unit 201 outputs the indication information to the transmission unit 207 through the control unit 203 in such a manner that the generation of the uplink reference signal and so forth are performed based on information relating to a configuration of the uplink reference signal, which is notified from the base station apparatus 1. More precisely, the higher layer processing unit 201 outputs the information relating to the configuration of the uplink reference signal to an uplink reference signal generation unit 2079 through the control unit 203.

In a case where the terminal device 2 supports the function of performing the concurrent transmission of the PUSCH and the PUCCH, the higher layer processing unit 201 transmits information on the function to the base station apparatus 1 through the transmission unit 207.

In a case where a parameter relating to a resource for the PUCCH format 3 is configured, the higher layer processing unit 201 outputs a notification that the communication can be performed using the PUCCH format 3, to the transmission unit 207 through the control unit 203.

In a case where the terminal device 2 supports a function of performing channel selection for transmission diversity in the PUCCH format 1b, the higher layer processing unit 201 transmits information on the function to the base station apparatus 1 through the transmission unit 207.

In a case where the terminal device 2 supports a function of performing multi-ACK and the CSI reporting, the higher layer processing unit 201 transmits information on the function to the base station apparatus 1 through the transmission unit 207.

In a case where the terminal device 2 supports a function of performing multi-CSI reporting, the higher layer processing unit 201 transmits information on the function to the base station apparatus 1 through the transmission unit 207.

Based on the control information from the higher layer processing unit 201, the control unit 203 generates the control signal for performing the control of the reception unit 205 and the transmission unit 207. The control unit 203 outputs the generated control signal to the reception unit 205 and the transmission unit 207, and performs the control of the reception unit 205 and the transmission unit 207.

In accordance with a control signal that is input from the control unit 203, the reception unit 205 demultiplexes, demodulates, and decodes a reception signal that is received from the base station apparatus 1 through the transmit and receive antenna 211, and outputs the resulting information to the higher layer processing unit 201.

Furthermore, the reception unit 205 receives the downlink signal based on the downlink subframe that is indicated in the TDD UL/DL configuration which is included in the SIB1.

The reception unit 205 performs suitable reception processing according to whether or not the information relating to the first configuration and/or the information relating to the second configuration is received. For example, in a case where any one of the information relating to the first configuration and the information relating to the second control information is received, a first control information field is detected from the received downlink control information format. In a case where the information relating to the first configuration and the information relating to the second control information are received, a second control information field is detected from the received downlink control information format.

The wireless reception unit 2057 converts (down-converts) a downlink signal that is received through each receive antenna into an intermediate frequency, removes an unnecessary frequency component, controls an amplification level in such a manner that a signal level is suitably maintained, performs orthogonal demodulation based on an in-phase component of and an orthogonal component of the received signal, and converts an analog signal that results from performing the orthogonal demodulation, into a digital signal. The wireless reception unit 2057 removes a portion equivalent to the guard interval from the digital signal that results from the conversion, performs the Fast Fourier Transform on the signal from which the guard interval is removed, and extracts a signal in the frequency domain.

The demultiplexing unit 2055 demultiplexes the extracted signal into the physical downlink control channel (PDCCH), the PDSCH, and the downlink reference signal (DRS). Moreover, the demultiplexing is performed based on the allocation information on the radio resource and the like that are notified with the downlink control information. Furthermore, the demultiplexing unit 2055 makes an adjustment of channels, that is, the PDCCH and the PDSCH, from a channel estimate that is input from the channel measurement unit 209. Furthermore, the demultiplexing unit 2055 outputs the downlink reference signal, which results from the demultiplexing, to the channel measurement unit 209.

The demodulation unit 2053 performs demodulation, which is in compliance with a QPSK modulation scheme on the PDCCH and outputs a result of the demodulation to the decoding unit 2051. In a case where the decoding unit 2051 attempts to decode the PDCCH and succeeds in the decoding, the decoding unit 2051 outputs the downlink control information that results from the decoding, to the higher layer processing unit 201. The demodulation unit 2053 performs the demodulation, which is in compliance with the modulation scheme that is notified with the downlink control information, such as the QPSK, the 16 QAM, the 64 QAM, or the like, on the PDSCH, and outputs a result of the demodulation to the decoding unit 2051. The decoding unit 2051 performs the decoding for a coding rate that is notified with the downlink control information, and outputs the data information that results from the decoding, to the higher layer processing unit 201.

The channel measurement unit 209 measures a downlink path loss from the downlink reference signal that is input from the demultiplexing unit 2055, and outputs the measured path loss to the higher layer processing unit 201. Furthermore, the channel measurement unit 209 calculates a downlink channel estimate from the downlink reference signal and outputs the calculated downlink channel estimate to the demultiplexing unit 2055.

Furthermore, the channel measurement unit 209 performs received power measurement or received quality measurement of the first signal and/or the second signal in accordance with various pieces of information relating to measurement, which is notified from the higher layer processing unit 201 through the control unit 203, or various pieces of information relating to a measurement report. A result of the measurement is output to the higher layer processing unit 201.

Furthermore, in a case where the channel measurement unit 209 is instructed to perform the channel estimation of the first signal and/or the second signal, the channel measurement unit 209 may output a result relating to the channel estimation of each signal to the higher layer processing unit 201. At this point, the first signal or the second signal is a reference signal (a pilot signal, a pilot channel, or a reference signal), and in addition to the first signal or the second signal, a third signal or a fourth signal may be provided. More precisely, the channel measurement unit 209 measures channels for one or more signals. Furthermore, the channel measurement unit 209 measures a signal for performing the channel measurement in accordance with the control information that is notified from the higher layer processing unit 201 through the control unit 203.

Furthermore, in a case where in the TDD scheme, multiple subframe sets or multiple TDD UL/DL configurations are set, the channel measurement unit 209 measures the downlink signal (the CRS or the CSI-RS) based on the downlink subframe that is indicated in the downlink reference TDD UL/DL configuration.

In accordance with the control signal (the control information) that is input from the control unit 203, the transmission unit 207 generates the uplink demodulation reference signal (UL DMRS) and/or the sounding reference signal (SRS), codes and modulates the data information that is input from the higher layer processing unit 201, multiplexes the PUCCH, the PUSCH, and the generated UL DMRS and/or SRS, adjusts the transmit power for the PUCCH, the PUSCH, the UL DMRS, and the SRS, and transmits a result of the multiplexing to the base station apparatus 1 through the transmit and receive antenna 211.

Furthermore, in a case where information relating to the result of the measurement is output from the higher layer processing unit 201, the transmission unit 207 transmits the information that is output, to the base station apparatus 1 through the transmit and receive antenna 211. Furthermore, in a case where the channel state information that is the result relating to the channel estimation is output from the higher layer processing unit 201, the transmission unit 207 feeds the channel state information back to the base station apparatus 1. More precisely, the higher layer processing unit 201 generates the channel state information (the CSI, the CQI, the PMI, or the RI) based on the result of the measurement, which is notified from the channel measurement unit 209, and feeds the generated channel state information back to the base station apparatus 1 through the control unit 203. When a prescribed grant (or a prescribed downlink control information format) is detected in the reception unit 205, the transmission unit 207 transmits the uplink signal that corresponds to the prescribed grant, on the first uplink subframe that appears after a prescribed subframe occurs later than a subframe from which the grant is detected. For example, in the reception unit 205, when the grant is detected on the subframe i, the transmission unit 207 transmits the uplink signal, on the first uplink subframe that appears after a subframe i+k occurs. At this point, k may be a prescribed value. Furthermore, k may be managed using a table.

Furthermore, a transmission subframe for the uplink signal is the subframe i, the transmission unit 207 configures the transmit power for the uplink signal using the transmit power control command that is received on a subframe i−k. At this point, k may be a prescribed value. Furthermore, k may be managed using a table. Furthermore, k may be associated with the transmission subframe.

In a case where the reception unit 205 receives any one of the information relating to the first configuration and the information relating to the second configuration and where any one of the first configuration and the second configuration is set, the transmission unit 207 sets the transmit power for each of the P-SRS and the A-SRS based on the parameter that is used for the power control for the PUSCH, and transmits the A-SRS. In a case where the reception unit 205 receives the information relating to the first configuration and the information relating to the second configuration and where the first configuration and the second configuration are set, in a case where multiple subframe sets are configured, the transmission unit 207 sets the transmit power for the P-SRS based on the parameter for the power control for the PUSCH that is transmitted on the first subframe set or the second subframe set, and transmits the A-SRS. Furthermore, in a case where the subframe on which the A-SRS is transmitted is included in the first subframe set, the transmission unit 207 sets the transmit power for the A-SRS based on the parameter for the power control for the PUSCH that is transmitted on the first subframe set, and transmits the A-SRS. Furthermore, in a case where the transmission on the second subframe set takes place, the transmission unit 207 sets the transmit power for the A-SRS based on the parameter for the power control for the PUSCH that is transmitted on the second subframe set, and transmits the A-SRS.

In the case where the multiple subframe sets are configured, the transmission unit 207 may switch a transmit power control parameter set, depending on which subframe set the transmission subframe for the uplink signal belongs to.

In a case where the multiple-times CSI reporting takes place on the same subframe in an overlapping manner, the transmission unit 207 drops the CSI report that has a low priority.

In a case where different PUCCH reporting types of CSI reporting take place on the same subframe in an overlapping manner, the transmission unit 207 drops a PUCCH reporting type of CSI report that has a low priority.

In a case where in different serving cells, the PUCCH reporting types of CSI reporting that have the same priority take place on the same subframes in an overlapping manner, the transmission unit 207 drops the CSI report on the serving cell, except for the serving cell that has the smallest serving cell index. In this case, only the CSI reporting on the serving cell that has the smallest serving cell index is performed.

In a case where a transmission mode 10 is configured, and in a case where in a different serving cell, the CSI reporting that corresponds to a CSI process with different CSI process IDs takes place on the same subframe in the PUCCH reporting type that has the same priority, in an overlapping manner, the transmission unit 207 drops the CSI report on the CSI process except for the CSI process that has the smallest CSI process index. In this case, only the CSI reporting on the CSI process that has the smallest CSI process index is performed.

In a case where the CSI reporting on the serving cell for which transmission modes 1 to 9 are configured and the CSI reporting on the serving cell for which the transmission mode 10 is configured collide with each other on the same subframe in the PUCCH reporting type that has the same priority, the transmission unit 207 drops the CSI report that corresponds to the CSI process with CSI process ID>1 in a different serving cell.

In a case where the CSI reporting on the serving cell for which transmission modes 1 to 9 are configured and the CSI reporting on the CSI process with CSI process ID=1 in a different serving cell for which the transmission mode 10 is configured collide with each other on the same subframe in the PUCCH reporting type that has the same priority, the transmission unit 207 drops the CSI report on the serving cell with the largest serving cell index.

The transmission unit 207 transmits a specific PUCCH reporting type of CSI report, on a second PUCCH resource. Furthermore, the second PUCCH resource is configured by the higher layer processing unit 201.

If the concurrent transmission of the PUSCH and the PUCCH is not configured for the terminal device 2, or if the concurrent transmission of the PUSCH and the PUCCH is configured for the terminal device 2 and the transmission of the PUSCH is not performed, the transmission unit 207 drops the CSI in a case where the contention between the CSI and the positive SR is incurred on the same subframe.

If multiple ACKs (multi-ACK) and the CSI reporting are configured for the terminal device 2, the transmission unit 207 performs the ACK and the P-CSI reporting on a multi-cell using the PUCCH format 3.

If the multiple-times CSI reporting (multi-CSI reporting) is configured for the terminal device 2, in a case where the multiple-times CSI reporting takes place in an overlapping manner, the transmission unit 207 performs the transmission using the PUCCH format 3. Moreover, the multiple-times CSI reporting may be the CSI on multiple subframe sets. The multiple-times CSI reporting may be the CSI reporting on multiple serving cells. The multiple-times CSI reporting may be the CSI reporting on multiple serving cells and/or multiple subframe sets. The multiple-times CSI reporting may be the CSI reporting on multiple PUCCH reporting types in one serving cell and/or one subframe set. At this point, in a case where the CSI reporting on each subframe set does not take place on the same subframe, each CSI reporting may be performed using the PUCCH format 2. That is, in this case, each CSI report may not be transmitted using the PUCCH format 3.

If a multi-CSI process is configured for the terminal device 2, in a case where multiple-times CSI reporting takes place in an overlapping manner, the transmission unit 207 performs the CSI reporting on each of the multiple CSI processes using the PUCCH format 3.

If the multi-CSI process is configured for the terminal device 2, in the case where the multiple-times CSI reporting takes place in an overlapping manner, when PUSCH transmission on the same subframe takes place, the transmission unit 207 performs the CSI reporting on each of the multiple CSI processes on the PUSCH.

In a case where the virtual cell ID is configured for every PUCCH format, according to the PUCCH format that is transmitted, the transmission unit 207 may configure a sequence that is used for each PUCCH format based on the virtual cell ID.

The coding unit 2071 performs the coding, such as the turbo coding, the convolutional coding, and the block coding, on the uplink control information that is input from the higher layer processing unit 201 and on the data information. The modulation unit 2073 modulates the coding bits, which are input from the coding unit 2071, with the modulation scheme such as the BPSK, the QPSK, the 16 QAM, or the 64 QAM.

The uplink reference signal generation unit 2079 generates the uplink reference signal based on the information on the configuration of the uplink reference signal. More precisely, the uplink reference signal generation unit 2079 generates the CAZAC sequence that is obtained according to the rule which is prescribed in advance based on the cell identifier for identifying the base station apparatus 1, the bandwidth to which the uplink demodulation reference signal, the first uplink reference signal, and the second uplink reference signal are mapped, and the like, and that is already known to the base station apparatus 1. Furthermore, in accordance with the control signal that is input from the control unit 203, the uplink reference signal generation unit 2079 gives the cyclic shift to the CAZAC sequences for the uplink demodulation reference signal, the first uplink reference signal, and the second uplink reference signal that are generated.

The uplink reference signal generation unit 2079 may initialize reference sequences for the uplink demodulation reference signal, the sounding reference signal, and/or the uplink reference signal, based on a prescribed parameter. The prescribed parameters may be the same in each reference signal. Furthermore, the prescribed parameter may be a parameter that is configured independently for each reference signal. More precisely, if a parameter that is independently configured is not present, the uplink reference signal generation unit 2079 can initialize a reference sequence for each reference signal with an initial value that is based on the same parameter. At this point, the initializing of the reference sequence may include initializing the sequence generator for the reference sequence.

In accordance with the control signal being input from the control unit 203, the multiplexing unit 2075 rearranges PUSCH modulation symbols in parallel and then performs the Discrete Fourier Transform (DFT) on the in-parallel-rearranged PUSCH modulation symbols, and multiplexes PUCCH and PUSCH signals and generated UL DMRS and SRS.

The wireless transmission unit 2077 performs the inverse fast Fourier transform on a signal that results from the multiplexing, performs the modulation in compliance with an SC-FDMA scheme, attaches the guard interval to an SC-FDMA symbol that results from performing the SC-FDMA modulation, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency (radio frequency), removes unnecessary frequency components, performs power amplification, and outputs a final result to the transmit and receive antenna 211 for transmission.

A parameter ($P_{O\_NOMINAL\_PUSCH}$ or $P_{O\_UE\_PUSCH}$) relating to a power level of the PUSCH may be included in the parameter that is used for the power control for the PUSCH. Furthermore, the channel loss compensation coefficient $\alpha_c$ may be included in the parameter that is used for the power control for the PUSCH. Furthermore, the power adjustment value (the power correction value) that is obtained by the TPC command may be included in the parameter that is used for the power control for the PUSCH.

The transmission unit 207 generates a sequence for each uplink signal (the physical channel/the physical signal), sets a transmit power for each uplink signal, and transmits the generated sequence to the base station apparatus 1. At this time, at the beginning of each radio frame, the transmission unit 207 initializes a sequence generator for each uplink signal, using an initial value for each uplink signal. Moreover, the pseudo-random sequence generator may be included in the sequence generator. Furthermore, the scrambling sequence generator may be included in the sequence generator.

According to the embodiment of the present invention, the base station apparatus 1 may transmit a TPC command that corresponds to each subframe set, to the terminal device 2 for which multiple subframe sets are configured, with the TPC command being set for the same DCI format. Furthermore, the base station apparatus 1 may transmit a TCP command field that corresponds to the first subframe set in the same type of DCI format, to the terminal device 2 for which the multiple subframe sets are configured, with the TCP command field being set as a TPC command field that corresponds to the second subframe set. More precisely, the base station apparatus 1 may replace the TPC command field that corresponds to the first subframe set with the TPC command field that corresponds to the second subframe set and then may transmit the TPC command field that corresponds to the second subframe set. More precisely, the TPC command field that corresponds to the first subframe set and the TPC command field that corresponds to the second subframe set may be shared as the same frame. Furthermore, the base station apparatus 1 may transmit one portion of the control information field to the terminal device 2 for which multiple subframe sets are configured, with the one portion being set as the TPC command field corresponding to the second subframe set. The terminal device 2 can detect the TPC command field corresponding to the second subframe set, from the DCI format that is configured by the base station apparatus 1. Moreover, whether or not the TPC command that corresponds to the second subframe set can be applied may be indicated by control information that is different from the information relating to the first configuration and the information relating to the second configuration.

According to the embodiment of the present invention, the base station apparatus 1 may set multiple configurations of parameters relating to the power control for the terminal device 2. The multiple parameters that are set may be parameters that are set to be cell-specific. Furthermore, the multiple parameters that are set may be parameters that are set to be UE-specific. Furthermore, the multiple parameters that are set may be parameters that are set to be cell-specific and parameters that are set to be UE-specific. Furthermore, the multiple parameters of the same type that are set may be specific parameters that are included in parameters which are set to be cell-specific or parameters which are set to be UE-specific. For example, the configuration of the parameter relating to the power control may include at least one among a parameter and a parameter set for controlling the transmit power for the PUSCH, the transmit power or the PUCCH, or the transmit power for the SRS. Furthermore, the configuration of the parameter relating to the power control may include at least one among a parameter and a parameter set for controlling the transmit power for the PDSCH, the transmit power for the PDCCH, the transmit power for the CRS, the transmit power for the CSI-RS, and the transmit power for the DL DMRS. More precisely, a parameter that is not set for a configuration of a parameter relating to second power control can substitute for a parameter that is set for a configuration of a parameter relating to first power control. For the parameter that is not set for the configuration of the parameter relating to the second power control, a default value may be used.

For example, with different types of power control, that is, the first power control and the second power control, switching between parameters (sets) relating to different cell-specific power control are performed and thus a power for a signal is controlled. Furthermore, with the different types of power control, switching between parameters (sets) relating to different UE-specific power control are performed and thus the power for the signal is controlled. Furthermore, with the different types of power control, switching between parameters (sets) relating to different cell-specific or UE-specific power control are performed and thus the power for the signal is controlled. Furthermore, with the different types of power control, accumulation transmit power control is performed in different loops.

According to the embodiment of the present invention, a parameter relating to the power control that will be described below may be configured for every subframe set.

As configurations of parameters relating to first uplink power control, there are a configuration (a configuration (UplinkPowerControlCommon) of a shared parameter relating to the uplink power control) of a parameter that is configured to be cell-specific (shared among the terminal devices within a cell) and a configuration (a configuration (UplinkPowerControlDedicated) of a dedicated parameter relating to the uplink power control) of a parameter that is configured for every terminal device. As configurations of the shared parameters, there are a nominal PUSCH power (p0-NominalPUSCH) that is a PUSCH power which is able to be configured to be cell-specific, an attenuation coefficient (a channel loss compensation coefficient) $\alpha_c$(alpha) of fractional transmit control, a nominal PUCCH power (p0-NominalPUCCH) that is a PUCCH power which is able to be configured to be cell-specific, a power adjustment value (a power offset) $\Delta_{F\_PUCCH}$ (deltaFList-PUCCH) for every PUCCH format, and a power adjustment value (a power offset) (deltaPreambleMsg3) in a case where preamble message 3 is transmitted. Furthermore, as configurations of the dedicated parameters, there are a UE-specific PUSCH power (p0-UE-PUSCH) that is a PUSCH power which is able to be configured to be UE-specific, information (deltaMCS-Enabled) indicating whether or not a power adjustment value Ks in compliance with a modulation coding scheme is considered, information (accumulationEnabled) indicating whether or not the accumulation transmit power control (accumulation by the TPC command) is performed, a UE-specific PUCCH power (p0-UE-PUCCH) that is a PUCCH power which is able to be configured to be UE-specific, a power offset $P_{SRS\_OFFSET}$ (pSRS-Offset or pSRS-OffsetAp) for the periodic SRS and the aperiodic SRS, and a filter coefficient (filterCoefficient) of a received power (Reference Signal Received Power (RSRP)) for the reference signal. These pieces of information are able to be configured for the primary cell, but the same configuration can also be performed on the secondary cell. Moreover, a configuration of the dedicated parameters for the secondary cell may include information (pathlossReferenceLinking) indicating that calculation of a path loss is performed using a path loss measurement reference signal for the primary cell or the secondary cell.

Furthermore, no parameter that is included in a configuration of a shared parameter relating to second uplink power control (for the primary cell), or a configuration of a shared parameter relating to uplink power control for a second secondary cell may be included. In this case, the base station apparatus 1 selects release and transmits information relating to the configuration of the shared parameter to the terminal device 2. Furthermore, a parameter that is not set as a configuration of a shared parameter relating to second uplink power control may be the same configuration as a configuration of a shared parameter relating to the first uplink power control.

A path loss reference resource indicating the downlink reference signal (a downlink radio resource) for measuring a path loss may be configured for the configuration of the dedicated parameter relating to the uplink power control for the first primary cell/secondary cell. Furthermore, no parameter that is included in a configuration of a dedicated parameter relating to the second uplink power control (for the primary cell), or a configuration of a dedicated parameter relating to the uplink power control for the second secondary cell may be configured. In this case, the base station apparatus 1 selects the release, and transmits information on the release to the terminal device 2. Furthermore, a parameter that is not set as a configuration of a dedicated parameter relating to the second uplink power control may be the same configuration as a configuration of a dedicated parameter relating to the first uplink power control. More precisely, in a case where the path loss reference resource is not configured in the configuration of the dedicated parameter relating to the second uplink power control, the calculation of the path loss may be performed based on the path loss reference resource that is configured with the configuration of the dedicated parameter relating to the first uplink power control.

Moreover, the configuration of the parameter relating to the first uplink power control and the configuration of the parameter relating to the second uplink power control may be transmitted to the terminal device 2, in a state of being included in the same information element or the same RRC message.

In a case where multiple configurations of the parameters relating to the uplink power control (for example, the configuration of the parameter relating to the first uplink power control and the configuration of the parameter relating to the second uplink power control) are set for terminal device 2, the configuration of the parameter relating to the first uplink power control may be applied to the uplink signal that is transmitted on the first subframe set, and the configuration of the parameter relating to the second uplink power control may be applied to the uplink signal that is transmitted on the second subframe set. Furthermore, in a case where multiple configurations of the parameters relating to the downlink power control (for example, the configuration of the parameter relating to the first downlink power control and the configuration of the parameter relating to the second downlink power control) are set for terminal device 2, the configuration of the parameter relating to the first downlink power control may be applied to the downlink signal that is transmitted on the first subframe set, and the configuration of the parameter relating to the second downlink power control may be applied to the downlink signal that is transmitted on the second subframe set.

Among the parameters that are set for the configuration of the parameter relating to the power control, at least one may be transmitted to the terminal device 2 with the system information. Among the parameters that are set for the configuration of the parameter relating to the power control, at least one may be transmitted to the terminal device 2 with the higher layer signaling (the RRC signaling or the dedicated signaling). Among the parameters that are set for the configuration of the parameter relating to the power control, at least one may be transmitted to the terminal device 2 on the physical channel (in the DCI format). Among the parameters that are set for the configuration of the parameter relating to the power control, at least one may be configured by default for the terminal device 2.

In a case where, in each of the first configuration and the second configuration, different types of subframes are configured for the same subframe (one subframe), such as an uplink subframe and a downlink subframe, a downlink subframe and a special subframe, or an uplink subframe and a special subframe, in most cases, such a subframe is referred to as a flexible subframe. More precisely, the flexible subframe is a subframe that is able to be processed as a different type of subframe according to a situation. In contrast, the fixed subframe is a subframe that is configured, as the same type of subframe, in the first configuration and the second configuration. For example, in a case where in the first configuration and the second configuration, the uplink subframe is indicated with the subframe i, the subframe i is a fixed subframe. In a case where in the first configuration and the second configuration, different types of subframes are indicated with the subframe i, the subframe i is the flexible subframe. Multiple fixed subframes and multiple flexible subframes each may be configured as a subframe set.

The transmit power control (the accumulation transmit power control or absolute transmit power control) by the TPC command may be performed independently for every subframe set. At this time, with the accumulation transmit power control in each subframe set, in a case where a power (p0-UE-PUSCH, or p0-UE-PUCCH) for the physical channel (the PUSCH or the PUCCH), which is included in the configuration of the parameter relating to the uplink power control that corresponds to each subframe set, and which is configured for every terminal device 2, is reconfigured (changed), an aggregation value (a cumulation value, an integration value, and an additional value) that is obtained by the accumulation may also be re-set (initialized). Furthermore, in a case where the random access response message is received on the downlink subframe that corresponds to the uplink subframe that is included in each subframe set, the aggregation value that is obtained by the accumulation that corresponds to each subframe set may be re-set (initialized). The terminal device 2 may independently re-set the aggregation value that is obtained by the accumulation for every subframe set.

The TPC command is set for a grant (an uplink grant) relating to the uplink or a grant (a downlink grant) relating to the downlink and is transmitted to the terminal device 2. As grants (uplink grants) relating to the uplink, there are a semi-persistent grant (semi-persistent scheduling grant), a dynamic scheduled grant, and a random access response grant.

The semi-persistent grant is used for indicating periodic (regular or quasi-static) data transmission. At this point, the semi-persistent grant includes the DCI format to which the CRC parity bit scrambled by the SPS C-RNTI is attached. The semi-persistent grant is used for indicating user data transmission and resource allocation. At this point, the dynamic scheduled grant includes the DCI format to which the CRC parity bit scrambled by the C-RNTI is attached.

The random access response grant is used for indicating transmission of data that includes user information (information of the terminal device 2) and resource allocation for the transmission of the data, in response to the random access response that is transmitted from the base station apparatus 1. As described above, random accelerator response grants include a random access response grant in the contention-based random access procedure. Transmission of these pieces of data is performed using the PUSCH. More precisely, these grants each include resource allocation to the PUSCH, indication of the transmission on the PUSCH, scheduling of the PUSCH.

At this point, the indication of the transmission on the PUSCH by the semi-persistent grant includes indication of the resource allocation to the PUSCH by the semi-persistent grant or indication of the scheduling of the PUSCH. The indication of the transmission on the PUSCH by the dynamic scheduled grant includes indication of the resource allocation to the PUSCH by the dynamic scheduled grant or indication of the scheduling of the PUSCH. The indication of the transmission on the PUSCH by the random access response grant includes indication of the resource allocation to the PUSCH by the random access response grant or indication of the scheduling of the PUSCH. More precisely, the indication of the transmission on the PUSCH by each grant includes indication of the resource allocation to the PUSCH that corresponds to each grant or indication of the scheduling of the PUSCH.

For example, in a case where only one of the first configuration and the second configuration is set based on the received information, when the PUSCH is scheduled by the dynamic scheduled grant, the terminal device 2 sets the transmit power for the PUSCH based on the first power control (a first power control method). In a case where both of the first configuration and the second setting are set, when the PUSCH is scheduled by the dynamic scheduled grant, the terminal device 2 sets the transmit power for the PUSCH based on the second power control (a second power control method). At this time, in a case where the transmission of the SRS is requested by the same grant (a positive SRS request is detected), the transmit power for the SRS is set based on the power control that is applied to the PUSCH. Furthermore, even in a case where the PUSCH is scheduled by the semi-persistent grant, the transmit power for the PUSCH may be set by performing the same processing. The configurations of the parameters relating to the power control may be configured for every subframe set. The configurations of the parameters relating to the power control may be configured for every serving cell. Some of the parameters may be shared among the subframe sets and among the serving cells. In a case where a power control ID is included in the configuration of the subframe set, for the subframe that is transmitted and received on the subframe set, the terminal device 2 sets the transmit power and/or the received power based on the configuration of the parameter relating to the power control that is associated with the power control ID. In a case where the subframe set and the power control ID are associated with each other, the terminal device 2 sets the power based on the configuration of the parameter relating to the power control.

Furthermore, in a case where one of the first configuration and the second configuration is set based on the received information, the transmit power for the PUSCH that is scheduled by the random access response grant is configured based on third power control (a third power control method). Even in a case where both of the first configuration and the second configuration are configured based on the received information, the transmission for the PUSCH is configured based on the third power control. More precisely, in this case, the terminal device 2 performs the common power control without depending on the configuration that is set.

Moreover, various parameters, which are included in the configuration of the parameter relating to the first power control, the configuration of the parameter relating to the second power control, a configuration of a parameter relating to the third power control and a configuration of the parameter, each may be set independently. Furthermore, the configuration of the parameter relating to the third power control may be included in a configuration of the random access channel.

Independent parameters (preamble InitialReceivedTargetPower ($P_{O\_PRE}$), and $\Delta_{PREAMBLE\_Msg3}$) may be configured for information relating to the transmit power control for the uplink signal that corresponds to the random access response grant. Furthermore, a dedicated TPC command ($\delta_{msg2}$) may be applied to the uplink transmit power that corresponds to the random access response grant. Furthermore, these parameters may be configured for every subframe set.

In a case where multiple pieces of information relating to the power control for the uplink signal that corresponds to the random access response grant are set independently, processing may be performed in the same manner as with the power control for the uplink signal that corresponds to a different grant.

That is, according to a type of received grant, switching between performing processing for one type of power control and performing processing for two types of power control is performed.

Moreover, according to the embodiment of the present invention, there are a grant that enables switching between the two power control methods depending on whether or not both of the first configuration and the second configuration are set and a grant that enables application of the same power control method without depending on whether or not both of first setting and the second configuration are set. The grant that enables performing of suitable power control considering interference and the grant that enables performing of power control without considering the interference can be distinguished.

When the uplink signal is scheduled by the dynamic scheduled grant or the semi-persistent grant, the terminal device 2 for which one of the first configuration and the second configuration is set, or the terminal device 2 for which multiple subframe sets for one serving cell are configured sets the transmit power for the uplink signal based on the first power control method. When the uplink signal is scheduled by the dynamic scheduled grant or the semi-persistent grant, the terminal device 2 for which both of the first configuration and the second configuration are set sets the transmit power for the uplink signal based on the second power control method. Furthermore, when the uplink signal is scheduled by the random access response grant, the terminal device 2 at all times sets the transmit power for the uplink signal based on the third power control method without depending on the configuration that is set.

Moreover, according to the embodiment of the present invention, in a case where the first configuration and the second configuration are set, or in a case where multiple subframe sets are configured in one serving cell, when the random access response message is received, the terminal device 2 may set re-set (initialize) the aggregation value that is obtained by the accumulation by the TPC command which is included in the first uplink power control and/or the second uplink power control. Furthermore, in a case where a UE-specific power parameter ($P_{O\_UE\_PUSCH}$ or $P_{O\_UE\_PUCCH}$) is configured for each of the information relating to the first uplink power control and the information relating to the second uplink power control for the terminal device 2, when these power parameters are re-set (value-changed) by the higher layer, the aggregation value that is obtained by the accumulation of the power correction value by the TPC command which is included in each uplink power control may be re-set (initialized). The aggregation value that is obtained by the accumulation by the TPC command may be referred to as the power adjustment value.

At this point, in a case where the transmit power control for the uplink signal that is scheduled by the random access response grant is common to the first subframe set and the second subframe set, that is, to multiple subframe sets, when the random access response message is received, the terminal device 2 re-sets the aggregation value that is obtained by the accumulation. More precisely, although the power control by the accumulation is independently performed with the first uplink power control and the second uplink power control, the aggregation value that is obtained by the accumulation may be re-set.

Furthermore, in a case where the UE-specific power parameter ($P_{O\_UE\_PUSCH}$ or $P_{O\_UE\_PUCCH}$) is common to the information relating to the first power control and the information relating to the second power control, when the UE-specific power parameter is re-set (a value is changed), the aggregation value that is obtained by the accumulation is re-set. More precisely, although the power control by the accumulation is independently performed with the first power control and the second power control, the aggregation value that is obtained by the accumulation may be re-set.

In a case where both of the first configuration and the second configuration are set, when the PUSCH is scheduled by the semi-persistent grant, if a transmission subframe for the PUSCH is the fixed subframe (the first subframe), that is, if the PUSCH is scheduled for the fixed subframe, the terminal device 2 sets the transmit power for the PUSCH that corresponds to the semi-persistent grant, based on a parameter (for example, $P_{O\_NOMINAL\_PUSCH}$ or $P_{O\_UE\_PUSCH}$) that is configured for the information relating to the first power control. Furthermore, if a transmission subframe for the PUSCH is the flexible subframe (the second subframe), that is, if the PUSCH is scheduled for the flexible subframe, the terminal device 2 sets the transmit power for the PUSCH that corresponds to the semi-persistent grant, based on a parameter (for example, $P_{O\_NOMINAL\_PUSCH}$ or $P_{O\_UE\_PUSCH}$) that is set for the information relating to the second power control.

In a case where both of the first configuration and the second configuration are set, or in a case where multiple subframe sets are configured for one serving cell, when the PUSCH is scheduled by the dynamic scheduled grant, if the transmission subframe for the PUSCH is the fixed subframe (the first subframe), that is, if the PUSCH is scheduled for the fixed subframe, the terminal device 2 sets the transmit power for the PUSCH that corresponds to the dynamic scheduled grant, based on a parameter (for example, $P_{O\_NOMINAL\_PUSCH}$ or $P_{O\_UE\_PUSCH}$) that is set for the configuration of the parameter relating to the first power control. Furthermore, if the transmission subframe for the PUSCH is the flexible subframe (the second subframe), that is, if the PUSCH is scheduled for the flexible subframe, the terminal device 2 sets the transmit power for the PUSCH that corresponds to the dynamic scheduled grant, based on a parameter (for example, $P_{O\_NOMINAL\_PUSCH}$ or $P_{O\_UE\_PUSCH}$) that is set for the configuration of the parameter relating to the second power control.

In the case where both of the first configuration and the second configuration are set, when the PUSCH is scheduled by the random access response grant, the terminal device 2 sets the transmit power for the PUSCH that corresponds to the random access response grant, based on a parameter that is set for a configuration of a parameter relating to the same power control, without depending on whether or not the transmission subframe for the PUSCH is the fixed subframe or the flexible subframe.

Moreover, in a case where the first configuration and the second configuration are set, in a case where the uplink signal is scheduled in the downlink control information (DCI) format that is detected in a common search space (CSS), and in a case where the uplink signal is scheduled in the downlink control information format that is detected in a UE-specific search space (USS), an independent power control method may be applied to the terminal device 2. More precisely, in the case where both of the first configuration and the second configuration are set, when the uplink signal is scheduled in the DCI format that is detected in the CSS, the terminal device 2 sets the transmit power for the uplink signal based on the first power control method. Furthermore, when the uplink signal is scheduled in the DCI format that is detected in the USS, the terminal device 2 sets the transmit power for the uplink signal based on the second power control method. Furthermore, when the uplink signal is scheduled in the DCI format that is detected in the USS, the transmit power for the uplink signal may be configured based on the first power control method or the second power control method.

Furthermore, in a case where the uplink signal is scheduled for the uplink subframe that is included in the first subframe set, in the DCI format that is detected in the USS, and in a case where the uplink signal is scheduled for the uplink subframe that is included in the second subframe set, the transmit power control (the accumulation transmit power control or the absolute transmit power control) by the TPC command that is set in the DCI format may be independently performed.

Moreover, in a case where the uplink signal is scheduled in the DCI format that is detected in the CSS, common transmit power control may be performed without depending on the first subframe set and the second subframe set.

Moreover, according to the embodiment of the present invention, in the case where one of the first configuration and the second configuration is set, when the transmission of the uplink signal is indicated by the first DCI format, the terminal device 2 may set the transmit power for the uplink signal based on the first power control method (or the second power control method). Furthermore, in the case where both of the first configuration and the second configuration are set, when the first subframe set and the second subframe set can be configured and the transmission of the uplink signal is indicated by the first DCI format for the uplink subframe that is included in the first subframe set, the terminal device 2 may set the transmit power for the uplink signal based on the first power control method. Furthermore, when the transmission of the uplink signal is indicated by the first DCI format for the uplink subframe that is included in the second subframe set, the terminal device 2 may set the transmit power for the uplink signal based on the second power control method.

For example, in some cases, in re-transmission of the same uplink data (the transport block) on the PUSCH, the CRC that is attached to the DCI format that indicates the re-transmission of the PUSCH is scheduled using the C-RNTI, and is scheduled using the temporary C-RNTI. In a case where the CRC is scheduled using the C-RNTI, on the uplink subframe that is included in the first subframe set, the transmit power for the PUSCH may be set based on the first power control method, and on the uplink subframe that is included in the second subframe set, the transmit power for the PUSCH may be set based on the second power control method. In a case where the CRC is scheduled using the temporary C-RNTI, on the uplink subframe that is included in the first subframe set and the uplink subframe that is included in the second subframe set, the transmit power for the PUSCH may be set based on the same power control method (for example, the third power control method).

Furthermore, in a case where the DCI format that indicates the re-transmission is detected, the terminal device 2 may set the transmit power for the uplink signal that is re-transmitted, based on the same uplink power control method, without depending on the subframe set.

In a case where the transmission of the uplink signal (for example, the PUSCH) is indicated by the PDCCH (the EPDCCH) that includes the DCI format to which the CRC scrambled with the C-RNTI is attached (in a case where the resource for the uplink signal is allocated), when the transmission of the uplink signal is on the uplink subframe that is included in the first subframe set, the transmit power for the uplink signal is set based on the first power control method. Furthermore, when the transmission of the uplink signal is on the uplink subframe that is included in the second subframe set, the transmit power for the uplink signal is set based on the second power control method. At this time, in a case where transmission of a different uplink signal (for example, the SRS) is indicated, a transmit power for the different uplink is set based on the same power control method as with the transmit power for the uplink signal. In a case where the transmission of the uplink signal (for example, the PUSCH) is indicated by the PDCCH (the EPDCCH) that includes the DCI format to which the CRC scrambled with the temporary C-RNTI is attached, when the transmission of the uplink signal is on the uplink subframe that is included in the first subframe set, the transmit power for the uplink signal is set based on the third power control method. Furthermore, when the transmission of the uplink signal is on the uplink subframe that is included in the second subframe set, the transmit power for the uplink signal is set based on the third power control method.

When multiple conditions are satisfied, the terminal device 2 can switch between performing the power control for the uplink signal that corresponds to multiple subframe sets based on a common power control method and performing the power control for the uplink signal that corresponds to the multiple subframe sets based on an independent power control method.

For a specific identifier, the terminal device 2 can perform switching between the power control methods, depending on whether the first configuration and/or the second configuration are set, or whether multiple subframe sets are configured for one serving cell. Alternatively, for a different identifier, the terminal device 2 sets the transmit power based on a prescribed power control method, without depending on whether the first configuration and/or the second configuration are set or without depending on whether multiple subframe sets are configured.

In the case where both of the first configuration and the second configuration are set, when it is assumed that the transmission of the uplink signal that is accompanied by the C-RNTI is performed, with the uplink subframe that is included in the first subframe set, the terminal device 2 may set the transmit power for the uplink signal based on the first power control method. Furthermore, with the uplink subframe that is included in the second subframe set, the terminal device 2 may set the transmit power for the uplink signal based on the second power control method. When the transmission of the uplink signal that is accompanied by the temporary C-RNTI is performed, the transmit power for the uplink signal may be set based on the common power control method, without depending on the first subframe set or the second subframe set.

Moreover, according to the embodiment of the present invention, the reception processing may include detection processing (detection). Furthermore, the reception processing may include demodulation processing (demodulation). Furthermore, the reception processing may include decoding processing (decode or decoding).

Moreover, according to the embodiment of the present invention, for example, when it comes to on a radio frame that is constituted from 10 subframes, the subframe set may refer to a group of specific subframes. As one example, the first subframe set may be constituted from #0, #1, #2, #5, #6, and #7 subframes, and the second subframe set may be constituted from #3, #4, #8, and #9 subframes. These subframe sets may be constituted based on specific information. Furthermore, these subframe sets may be configured in advance by the terminal device 2. Furthermore, the base station apparatus 1 may individually notify the terminal device 2 of these subframe sets in a dynamic or semi-static manner. These subframe sets may be notified in the DCI format or with the higher layer signaling.

Moreover, according to the embodiment of the present invention, the base station apparatus 1 transmits information relating to a configuration of a subframe, which is for configuring a subframe set, to the terminal device 2. Furthermore, the base station apparatus 1 transmits configuration information on a parameter relating to the power control to the terminal device 2. The terminal device 2 configures multiple subframe sets based on the configuration of the subframe. Furthermore, the terminal device 2 performs the power control that corresponds to each of the multiple subframe sets, based on the configuration of the parameter relating to the power control.

Moreover, according to the embodiment of the present invention, the terminal device 2 may configure the first subframe set and the second subframe set, based on the first configuration and the second configuration. At this point, in the first configuration and the second configuration, the first subframe set is a set of subframes in which the same subframes that are the same types of subframes (an uplink subframe and an uplink subframe, a downlink subframe and a downlink subframe, and a special subframe and a special subframe) are set. In the first configuration and the second configuration, the second subframe set is a set of subframes in which the same subframes that are different types of subframes (a downlink subframe and an uplink subframe, a downlink subframe and a special subframe, and an uplink subframe and a special subframe) are set. For example, the first configuration and the second configuration may be configured based on the TDD UL/DL configuration.

Moreover, according to the embodiment of the present invention, in the case where both of the first configuration and the second configuration are set, terminal device 2 may set a subframe (an uplink subframe) on which an uplink signal is transmitted, based on the first configuration, and may set a subframe (a downlink subframe) on which a downlink signal is received, based on the second configuration. At this point, in a case where a subframe that is configured as an uplink subframe using the first configuration and a subframe that is set as a downlink subframe using the second configuration are the same, that is, in a case where both of the uplink subframe and the downlink subframe are configured as the same subframe, in some cases, such a subframe is referred to as a flexible subframe. In a case where an uplink signal is transmitted on the flexible subframe, transmit power control for the uplink signal may be performed independently of a different uplink subframe.

Moreover, according to the embodiment of the embodiment, in a case where the carrier aggregation (the cell aggregation) in which the communication is performed using multiple component carriers (multiple serving cells or multiple cells) is performed, multiple subframe sets may be configured for every cell. More precisely, a subframe patter of the subframe set that is configured for every cell may not be shared among cells. One subframe set may be shared among cells.

Moreover, according to the embodiment of the present invention, a configuration of a subframe set may be for only one set. A set (a group) of subframes that are included in the configuration of the subframe set may be defined as the first subframe set, and a set (a group) of subframes that are not included in the configuration of the subframe set may be defined as the second subframe set. The base station apparatus 1 notifies the terminal device 2 of the configuration of the subframe set with the higher layer signaling. A parameter that is set for the configuration of the subframe set may be notified with the higher layer signaling (the L3 signaling or the RRC signaling) and information as to whether or not the configuration of the subframe set is actually applied may be notified in the DCI format (the L1 signaling).

Moreover, in addition to the configuration method described above, there is provided a method in which, in a case where the first subframe set and the second subframe set are configured based on the first configuration and the second configuration, information relating to the TDD UL/DL configuration is included in one of the first configuration and the second configuration, and information indicating the flexible frame or information indicating the fixed subframe is included in the other. Moreover, the information indicating the fixed subframe is information that indicates a subframe that is not processed as the flexible subframe in the first configuration. Furthermore, the information indicating the fixed subframe may be information that indicates a specific type of subframe.

Moreover, in a case where the first configuration and the second configuration are the same (or indicate the same configuration), multiple subframe sets may not be configured.

Moreover, the terminal device 2 may configure or in advance define a priority of the physical channel/the physical signal that is transmitted according to a type of physical channel.

Moreover, according to the embodiment of the present invention, the terminal device 2 may report to the base station apparatus 1 a result of measurement of the received power, which is based on a second downlink reference signal. The terminal device 2 may perform such reporting periodically. Furthermore, the terminal device 2 may perform the reporting in a case where a certain condition is satisfied.

Moreover, according to the embodiment of the present invention, in a case where the received power that is based on the second downlink reference signal is measured, the terminal device 2 may perform the transmit power control for the uplink signal based on the received power. Furthermore, the terminal device 2 may determine the downlink path loss based on the received power.

Moreover, according to the embodiment of the present invention, in a case where a sum of transmit powers for various uplink signals, which include the transmit powers for the first uplink reference signal and/or the second uplink reference signal, exceeds a maximum output power (UE total configured maximum output power (PCMAX)) that is configured for the terminal device 2, the terminal device 2 may not transmit the first uplink reference signal and/or the second uplink reference signal.

Moreover, the embodiment of the present invention may be realized by combining the embodiments. For example, the first embodiment and the second embodiment may be combined. Furthermore, the second embodiment and the third embodiment may be combined. Furthermore, a basic aspect and a modification example may be combined.

Moreover, according to the embodiment of the present invention, the subframe on which the uplink signal is actually transmitted and/or the subframe on which the downlink signal is actually received may be set based on a parameter (for example, a third configuration) that is set independently of the first configuration and the second configuration.

Moreover, according to the embodiment of the present invention, the first configuration and/or the second configuration may be notified with the system information block type 1 (SIB1) or the RRC message. Furthermore, the first configuration and the second configuration may be notified with the same SIB1 or the same RRC message.

Moreover, according to the embodiment of the present invention, the first configuration may be notified with the SIB1 and the second configuration may be notified with the L1 signaling.

Moreover, according to the embodiment of the present invention, the first configuration and the second configuration may be configured for the same RRC message, the same system information or the same information element. Furthermore, the first configuration and the second configuration may be configured for a different RRC message, a different system information, or a different information element. Furthermore, the first configuration and the second configuration may be configured independently as different parameters. Furthermore, the first configuration and/or the second configuration may be notified in a semi-static manner. Furthermore, the first configuration and/or the second configuration may be notified dynamically.

At this point, according to the embodiment of the present invention, in a case where the first configuration is the TDD UL/DL configuration that is notified with the system information block type 1 (SIB1) or the RRC message, the second configuration may be the following configurations. For example, the second configuration may be an additional TDD UL/DL configuration (the second TDD UL/DL configuration). Furthermore, the second configuration may information (a flexible subframe pattern) that indicates the flexible subframe. Furthermore, to the second configuration may be information (a fixed subframe pattern) that indicates the fixed subframe. Furthermore, the second configuration may be information that indicates a subframe that corresponds (or that is included in the first subframe set) to the first subframe set described above. Furthermore, the second configuration may be information that indicates a subframe that corresponds (or that is included in the second subframe set) to the second subframe set described above. Furthermore, the second configuration may be information that indicates a subframe to which the PDCCH/EPDCCH (the DCI format) that is accompanied by the TPC command for the flexible subframe is allocable. Furthermore, the second configuration may be information that indicates a subframe on which the CRS is receivable. Furthermore, the second configuration may be information that indicates a subframe on which the CSI-RS is receivable. Furthermore, the second configuration is information that indicates a subframe on which the reporting of the channel state information (the CSI, the CQI, the PMI, or the RI) is possible. Furthermore, the second configuration may be information that indicates a subframe for limiting measurement in the time domain with respect to measurement (received power RSRP, receive quality RSRQ, and wireless link monitoring) in the primary cell. More precisely, the second configuration may be information that indicates a subframe for performing measurement. Furthermore, the second configuration may be information that indicates a subframe for limiting the measurement in the time domain with respect to measurement in an adjacent cell. Furthermore, the second configuration may be information that indicates a subframe for limiting the measurement in the time domain with respect to measurement in the secondary cell. Furthermore, the second configuration may be configured based on a measurement subframe pattern. Furthermore, the second configuration may be information that indicates a subframe on which the downlink signal is receivable. Furthermore, the second configuration may be information that is addable. Furthermore, the second configuration may be information as to whether or not the transmission of the physical uplink control channel is possible in the second cell (the secondary cell). Furthermore, the second configuration may be information that indicates a subframe on which transmission of the HARQ is possible. Furthermore, the second configuration may be information that indicates a subframe on which power headroom reporting is possible. Furthermore, the second configuration may be information that indicates a subframe that is associated with reporting of certain channel state information (the CSI, the CQI, the PMI, or the RI). Furthermore, the second configuration may be information that is configured separately from the information which indicates the subframe that is associated with the reporting of certain channel state information (the CSI, the CQI, the PMI, or the RI) that is different from that in the second configuration. More precisely, the third configuration and a fourth configuration may be configured separately from the second configuration, and any one of the third configuration and the fourth configuration may be information that indicates a subframe in the same manner as the second configuration. More precisely, the third configuration and the fourth configuration may be configured separately from the second configuration, and any one of the third configuration and the fourth configuration may be information that is configured separately of the information which indicates the subframe that is associated with the reporting of certain channel state information (the CSI, the CQI, the PMI, or the RI). Furthermore, such reporting may be on the channel state information (the CSI, the CQI, the PMI, or the RI) that is calculated based on a CSI-RS, a zero power CSI-RS, and/or a CSI-IM resource, which is included in the associated subframe pattern (set). The same may also be applied to all the configurations up to and including the n-th configuration, which are described above. Furthermore, multiple second configurations may be configured, and the switching between the first power control method and the second power control method may be performed based on any one of the multiple second configurations. That is, the second configuration may be the additional TDD UL/DL configuration (the second TDD UL/DL configuration). For the second configuration, the information may be configured that indicates the subframe which is associated with the reporting of certain channel state information (the CSI, the CQI, the PMI, or the RI). Furthermore, the second configuration may be information that indicates whether or not concurrent connection (dual connectivity) to multiple base station apparatuses or multiple types of cells is possible. Moreover, the second configuration may be determined in a manner that is peculiar to the system. Furthermore, the second configuration may be notified as shared information or the system information. The second configuration may be notified dynamically. The second configuration may be indicated with a field that is set in the DCI format. The second configuration may be notified in a semi-static manner. Furthermore, the second configuration may be notified with the higher layer signaling. Furthermore, the second configuration may be notified individually, as the UE-specific dedicated information, to every terminal device 2. The terminal device 2 may notify the base station apparatus 1 of information that indicates whether or not the second configuration can be set (re-configured), using information (Capability, UE capability, or UE-EUTRA-Capability) on a function of the terminal device 2. At this point, the information that indicates the subframe may be information that indicates a subframe pattern (or a set of subframes or a combination of subframes). The information that indicates the subframe may be information that indicates which subframe has a correspondence.

In a case where one of the first configuration and the second configuration is the TDD UL/DL configuration that is notified with the system information block type 1 (SIB1) or the RRC message, the other may be the configuration (the instruction information) described above.

Furthermore, the first configuration and/or the second configuration may be configured using a bitmap. Moreover, the bitmap may be constituted from 10 bits, 20 bits, 40 bits, or 80 bits.

Furthermore, for the first configuration and/or the second configuration, the configuration that includes the uplink subframe, the downlink subframe, and the special subframe may be designated with an index (or an information bit or a bit sequence that indicates the index) based on a table. For example, the table may be the TDD UL/DL configurations (uplink-downlink configuration). The TDD UL/DL configuration may be configured as illustrated in FIG. 3.

Multiple subframe sets may be determined in a manner that is peculiar to the system. Furthermore, multiple subframe sets may be configured by default in advance for the terminal device 2. Furthermore, multiple subframe sets may be defined in advance. For example, in the TDD UL/DL configuration as illustrated in FIG. 3, a set of subframes that are configured as the same types of subframes and a set of subframes that are configured as different types of subframes may be handled as different sets (groups). When it comes to TDD UL/DL configuration (uplink-downlink configuration) indexes 0 to 6, one subframe set may be constituted from subframe numbers #0, #1, #2, and #5, and one subframe set may be constituted from subframe numbers #3, #4, #6, #7, #8, and #9. Furthermore, in a case where the special subframe and the downlink subframe are regarded as the same types of subframes, one subframe may be constituted from subframe numbers #0, #1, #2, #5, and #6, and one subframe may be constituted from subframe numbers #3, #4, #7, #8, and #9. In the case where multiple subframe sets are configured, information (multi-subframeset-Enabled) that indicates the configuration of the multiple subframe sets may be transmitted from the base station apparatus 1 to the terminal device 2. In the case where multiple subframe sets are configured, information that indicates the configuration of the flexible subframe may be transmitted from the base station apparatus 1 to the terminal device 2. Furthermore, some of the pieces of information may be transmitted with the higher layer signaling. At this time, the information may be transmitted with the L1 signaling.

Moreover, according to the embodiment of the present invention, information that gives an indication may be referred to as a parameter or an indicator that gives an indication.

Moreover, according to the embodiment of the present invention, the second configuration may be the additional TDD UL/DL configuration (the second TDD UL/DL configuration). Furthermore, the second configuration may be information that indicates the flexible subframe. Furthermore, the second configuration may be the information (the flexible subframe pattern) that indicates the flexible subframe. Furthermore, the second configuration may be the information (the fixed subframe pattern) that indicates the fixed subframe. At this time, although an uplink reference UL-DL configuration and a downlink reference UL-DL configuration are calculated from the first configuration and the second configuration using a table or the like, this poses no problem. In other words, the uplink reference UL-DL configuration and the downlink reference UL-DL configuration may be determined using a table or the like as the third configuration in addition to the first configuration and the second configuration.

Moreover, according to the embodiment of the present invention, the base station apparatus 1 and the terminal device 2 may configure one of the first configuration and the second configuration as the uplink reference UL-DL configuration, and may configure the other as the downlink reference UL-DL configuration. For example, the terminal device 2 may receive two configurations, that is, the first configuration and the second configuration, and then may configure the two configurations for the uplink reference UL-DL configuration and the downlink reference UL-DL configuration. Moreover, the DCI format (for example, the DCI format 0/4) associated with the uplink may be transmitted on the downlink subframe that is configured with the uplink reference UL-DL configuration.

Furthermore, the uplink reference UL-DL configuration and the downlink reference UL-DL configuration each may be configure using the same table. However, in a case where indexes for the uplink reference UL-DL configuration and the downlink reference UL-DL configuration are configured based on the same table, it is preferable that the uplink reference UL-DL configuration and the downlink reference UL-DL configuration are configured with different indexes. More precisely, it is preferable that the uplink reference UL-DL configuration and the downlink reference UL-DL configuration are configured with different subframe patterns.

According to the embodiment of the present invention, in a case where both of the first configuration and the second configuration are the TDD UL/DL configurations, according to a condition, one may be configured for the uplink reference UL-DL configuration, and the other may be configured for the downlink reference UL-DL configuration. Moreover, the uplink reference UL-DL configuration may be used to determine a correspondence between a subframe to which at least the physical downlink control channel is allocated and a subframe to which the physical uplink shared channel to which the physical downlink control channel described above corresponds is allocated, and although directions (more precisely, the uplink and the downlink) in which signals are actually transmitted are different, this poses no problem. The downlink reference UL-DL configuration may be used to determine a correspondence between a subframe in which at least the physical downlink shared channel is allocated and a subframe on which the HARQ-ACK corresponding to the physical downlink shared channel is transmitted, and although the directions (more precisely, the uplink and the downlink) in which the signals are actually transmitted are different, this poses no problem. That is, the uplink reference UL-DL configuration is used to specify (select or determine) a correspondence between a subframe n to which the PDCCH/EPDCCH/PHICH is allocated and a subframe n+k to which the PUSCH to which the PDCCH/EPDCCH/PHICH corresponds is allocated. In a case where one primary cell is configured, or in a case where one primary cell and one secondary cell are configured and where the uplink reference UL-DL configuration for the primary cell and the uplink reference UL-DL configuration for the secondary cell are the same, in each of the two serving cells, the corresponding uplink reference UL-DL configuration is used to determine the correspondence between the subframe to which the PDCCH/EPDCCH/PHICH is allocated and the subframe to which the PUSCH to which the PDCCH/EPDCCH/PHICH corresponds is allocated. Furthermore, the downlink reference UL-DL configuration is used to specify (select or determine) a correspondence between a subframe n to which the PDSCH is allocated and a subframe n+k on which the HARQ-ACK corresponding to the PDSCH is transmitted. In the case where one primary cell is set, or in a case where one primary cell and one secondary cell are configured and where the downlink reference UL-DL configuration for the primary cell and the downlink reference UL-DL configuration for the secondary cell are the same, in each of the two serving cells, the corresponding downlink reference UL-DL configuration is used to specify (select or determine) the correspondence between the subframe n to which the PDSCH is allocated and the subframe n+k on which the HARQ-ACK corresponding to the PDSCH is transmitted.

Furthermore, when a TDD UL/DL configuration (a first TDD UL/DL configuration) for an uplink transmission reference and a TDD UL/DL configuration (the second TDD UL/DL configuration) for a downlink transmission reference are configured for the terminal device 2, and the information relating to the power control is configured for the terminal device 2, in the subframe pattern that is indicated with the first TDD UL/DL configuration and the second TDD UL/DL configuration, in a case where the same types of subframe that are the same subframes are configured, the power control for the subframe is performed based on the first power control method. Furthermore, in a case where different types of subframes are set with the first TDD UL/DL configuration and the second TDD UL/DL configuration, the power control for the subframe is performed based on the second power control method.

The first TDD UL/DL configuration and/or the second TDD UL/DL configuration may be notified in a semi-static manner. Furthermore, the first TDD UL/DL configuration and/or the second TDD UL/DL configuration may be notified dynamically. In a case where different indexes are set with the first TDD UL/DL configuration and the second TDD UL/DL configuration, multiple subframe sets may be configured. More precisely, a set of the same types of subframes and a set of different types of subframes may be configured with two TDD UL/DL configurations. These sets may be scheduled independently.

In a case where the second TDD UL/DL configuration (for example, tdd-Config-v12, tdd-Config-r12, tdd-ConfigUlreference-v12, or tdd-ConfigDLreference-r12) as the second configuration is configured/added as a parameter, the terminal device 2 may transmit the uplink signal based on the first TDD UL/DL configuration, and may receive the downlink signal based on the second TDD UL/DL configuration. On a certain subframe, in a case where the transmission of the uplink signal and the reception of the downlink signal take place, to which transmission preference is given may be determined based on transmission direction setting information (information relating to the third configuration).

Moreover, according to the embodiment of the present invention, the first configuration and/or the second configuration may be the TDD UL/DL configuration (TDD configuration, tdd-Config, or uplink-downlink configuration(s)). Furthermore, the first configuration and/or the second configuration may be a subframe pattern that is indicated by the bitmap. Furthermore, one of the first configuration and the second configuration may be information that indicates the uplink subframe, and the other may be information that indicates the downlink subframe. These pieces of indication information may be defined using a table, and may be defined using the bitmap.

Moreover, the base station apparatus 1 may instruct the terminal device 2 for which the first configuration and the second configuration are able to be set, as to the uplink subframe, with one of the first configuration and the second configuration, and as to the downlink subframe, with the other. Furthermore, in a case where one of the first configuration and the second configuration is set, the terminal device 2 recognizes a subframe other than the subframe that is indicated, as a different type of subframe and performs transmission and reception processing. For example, in a case where the uplink subframe is indicated with the first configuration, and the downlink subframe is indicated with the second configuration, the terminal device 2 for which only the first configuration is set recognizes a subframe other than the uplink subframe that is indicated, as the downlink subframe or the special subframe, based on the first configuration, and performs the reception processing/transmission processing. Furthermore, the terminal device 2 for which only the second configuration is set recognizes a subframe other than the downlink subframe that is indicated, as the uplink subframe or the special subframe, based on the second configuration, and performs the transmission processing/reception processing. Moreover, with the first configuration and the second configuration, the uplink subframe and the downlink subframe may be configured for the same subframe.

For example, in a case where the first configuration and the second configuration are set, the terminal device 2 may perform the transmission of the uplink signal based on the first configuration, and may perform the reception of the downlink signal based on the second configuration. Furthermore, in the case where the first configuration and the second configuration are set, the terminal device 2 may perform the reception of the downlink signal based on the first configuration, and may perform the transmission of the uplink signal based on the second configuration. Based on the third configuration, it may be determined which configuration the transmission of the uplink signal and the reception of the downlink signal is performed based on.

At this point, when the first configuration is defined as the TDD UL/DL configuration, the second configuration may be information (a parameter) that indicates the flexible subframe. Moreover, the second configuration may be managed using a table. Furthermore, the second configuration may be information that indicates a subframe that is configured as the flexible subframe by the bitmap.

Moreover, according to the embodiment of the present invention, the flexible subframe is a subframe that is an uplink subframe and is a downlink subframe. Furthermore, the flexible subframe is a subframe that is a downlink subframe and is a special subframe. Furthermore, the flexible subframe is a subframe that is an uplink subframe and is a special subframe. More precisely, the flexible subframe is a subframe that is the first subframe and is the second subframe. For example, furthermore, a subframe that is configured as the flexible subframe is processed as the first subframe (for example, the uplink subframe) in the case of condition 1, and is processed as the second subframe (for example, the downlink subframe) in the case of condition 2.

Moreover, the flexible subframe may be configured based on the first configuration and the second configuration. For example, in a case where a certain subframe i is configured as the uplink subframe with the first configuration and is configured as the downlink subframe with the second configuration, the subframe i is the special subframe. The flexible subframe may be configured based on information indicating a subframe pattern of the flexible subframe.

Furthermore, according to the embodiment of the present invention, the first configuration and the second configuration may not be two TDD UL/DL configurations, and may be one TDD UL/DL configuration and a flexible subframe pattern (a downlink candidate subframe pattern, an uplink candidate subframe pattern, or an additional subframe). When it comes to a subframe index that is indicated with the flexible subframe pattern, although it is indicated with the TDD UL/DL configuration that the uplink subframe is present, if the uplink signal is not transmitted on the subframe, the terminal device 2 can receive the downlink signal. Furthermore, although it is indicated with the TDD UL/DL configuration that the downlink subframe is present, if it is indicated in advance that the uplink signal is transmitted on the subframe, the terminal device 2 can transmit the uplink signal. A specific subframe may be indicated as a subframe for an uplink/downlink candidate.

When both of the first configuration and the second configuration are set, based on a certain condition, the terminal device 2 may recognize one as a subframe set for the uplink and may recognize the other as a subframe set for the downlink. At this point, the subframe set for the uplink is a set of subframes that are configured for transmission of the PUSCH and transmission of the PHICH, and the subframe set for the downlink is a set of subframes that are configured for transmission of the PDSCH and transmission of the HARQ. Information indicating a subframe relationship between the PUSCH and the PHICH and information indicating a subframe relationship between the PDSCH and the HARQ may be configured in advance for the terminal device 2. More precisely, one of the first configuration and the second configuration may be information that indicates a subframe pattern of the uplink subframe and the other may be information that indicates a subframe pattern of the downlink subframe. These pieces of information may be configured using the bitmap.

Moreover, according to the embodiment of the present invention, in a case where the first configuration and the second configuration are configured and thus two subframe sets are configured, the accumulation transmit power control and/or the absolute transmit power control by the TPC command may be performed independently for every subframe set. For example, when the third configuration is received, the terminal device 2 may perform the transmit power control by the TPC command for every subframe set. At this point, in some cases, the accumulation transmit power control and the absolute transmit power control are referred to as a closed loop transmit power control. At this point, the accumulation transmit power control is to perform power correction while considering the power correct value that is configured for the TPC command that was received in the past, and the absolute transmit power control is power control that is performed while considering only the power correction value that is obtained by the TPC command which is received on a subframe that immediately precedes a subframe on which the uplink signal is transmitted. More precisely, the absolute transmit power control is power control that is performed while considering only the power correction value that is obtained by a recent TPC command. At this point, the absolute transmit power control by the TPC command is to control the transmit power while considering only the power correction value that is obtained by the TPC command that receives immediately before the transmission subframe for the uplink signal without considering the power correction value that is obtained by the TPC command that received in the past. More precisely, the terminal device 2 applies only the power correction value that is obtained by the recent TPC command among the detected TPC commands. The absolute transmit power control is to control the transmit power considering the power correction value that is obtained by the recent TPC command. The accumulation transmit power control is to control the transmit power considering the power correction value that is obtained by the TPC command that was received in the past. The accumulation transmit power control is performed on every subframe set that includes the transmission subframe.

Moreover, according to the embodiment of the present invention, the power control may include a power control method, a power control procedure, a power control process, and the like. More precisely, the first uplink power control may include a first uplink power control method, a first uplink power control procedure, or the like.

Moreover, according to the embodiment of the present invention, in a case where the first configuration and the second configuration are set and thus two or more subframe sets are independently configured, the maximum transmit power ($P_{CMAX,c}$) and/or the minimum transmit power for the serving cell c, which is configured for every terminal device 2, may be configured for each of the subframe sets. Furthermore, the maximum output power $P_{CMAX}$ (UE total configured maximum output power) and the minimum output power that are configured by the terminal device 2 may be configured for every subframe set. More precisely, the terminal device 2 may set multiple independent maximum transmit powers and/or multiple independent minimum transmit powers.

Furthermore, in a case where resource allocations for various uplink signals are the same, the base station apparatus 1 can detect the various uplink signals using a difference in a signal sequence between the uplink signals. More precisely, the base station apparatus 1 can identify each of the uplink signals using the difference in the signal sequence between the received uplink signals. Furthermore, the base station apparatus 1 can determine whether or not the transmission is destined for the base station apparatus 1 itself, using the difference in the signal sequence between the received uplink signals.

Moreover, in a case where, with the second downlink reference signal, the base station apparatus 1 instructs the terminal device 2 to measure the received power, the terminal device 2 may calculate the downlink path loss based on a result of the measurement and may use the calculated downlink path loss for the downlink transmit power control.

In some cases, the received power measurement here is referred to as reference signal received power (RSRP) measurement or reception signal power measurement. Furthermore, in some cases, the received quality measurement is referred to as reference signal received quality (RSRQ) measurement or reception signal quality measurement.

Furthermore, the resource allocation (mapping to resource elements or mapping to physical resources) to the second downlink reference signal may be frequency-shifted. The frequency shift of the second downlink reference signal may be determined based on the physical cell ID. Furthermore, the frequency shift of the second downlink reference signal may be determined based on the virtual cell ID.

As one example, the base station apparatus 1 notifies the terminal device 2 of information indicating whether or not the received power measurement of the second downlink reference signal is performed. In a case where the indication information indicates that the received power measurement of the second downlink reference signal can be performed, the terminal device 2 performs the received power measurement of the second downlink reference signal. At this time, the terminal device 2 may perform the received power measurement of the first downlink reference signal in a parallel manner. In a case where the indication information for the terminal device 2 indicates that the received power measurement of the second downlink reference signal is difficult to perform, the terminal device 2 performs the received power measurement of only the first downlink reference signal. Moreover, information indicating whether or not the received quality measurement of the second downlink reference signal is performed may be included in the indication information. Furthermore, the received power measurement of a third downlink reference signal may be performed without depending on the indication information.

Furthermore, as another example, the base station apparatus 1 notifies the terminal device 2 of information indicating whether the received power measurement of the first downlink reference signal is performed or the received power measurement of the second downlink reference signal is performed. In a case where the instruction information indicates that the received power measurement of the first downlink reference signal is performed, the terminal device 2 performs the received power measurement of the first downlink reference signal. In a case where the indication information indicates that the received power measurement of the second downlink reference signal is performed, the terminal device 2 performs the received power measurement of the second downlink reference signal. More precisely, the indication information is information indicating switching between the received power measurements. Furthermore, the information indicating whether or not the received quality measurement is performed may be included in the indication information. In this example, the indication information is described as information that indicates the switching between the received power measurements of two downlink reference signals, but may be information that indicates the switching among the received power measurements of three or more downlink reference signals. Furthermore, the received power measurement of the third downlink reference signal may be performed without depending on the indication information. Furthermore, the transmit power for the second downlink reference signal and/or the transmit power for the third downlink reference signal may be set based on the transmit power for the first downlink reference signal. For example, a power ratio (the power offset) between the first downlink reference signal and the second downlink reference signal (or the third downlink reference signal) may be configured.

In the case of the downlink, for the downlink subframe that is included in the first subframe set, the received power measurement of the downlink signal may be performed without considering the power offset, and for the downlink subframe that is included in the second subframe set, the received power measurement of the downlink signal may be performed while considering the power offset. The power offset may be configured in advance by the base station apparatus 1. Furthermore, the power offset may be configured for the DCI format relating to the downlink and may be indicated.

Moreover, according to the embodiment of the present invention, although the first configuration and the second configuration are set, if multiple subframe sets are not configured, the accumulation/absolute transmit power control may be in common use.

Moreover, according to the embodiment of the present invention, in the terminal device 2, for the flexible subframe, the power control (the uplink power control, or the downlink power control) may be performed that is different from that in the case of the uplink subframe/downlink subframe/special subframe that is not configured as the flexible subframe. Furthermore, for the flexible subframe and the uplink subframe/downlink subframe/special subframe, the closed loop transmit power control (the accumulation transmit power control) may be performed independently. For example, on that subframe, the power may be controlled using a parameter that is different form that in the case of a different uplink subframe or downlink subframe. Furthermore, on the flexible subframe and the uplink subframe/ downlink subframe, a parameter that is used for signal generation may be configured independently. For example, a virtual cell ID, a scramble ID, or the like may be configured independently. At this point, the generating of the signal includes generating a signal sequence. Furthermore, the generating of the signal includes determining the radio resource that is allocated to the signal.

Moreover, according to the embodiment of the present invention, the first subframe set may be constituted from subframes each of which is a small interference source (more precisely, causes a small amount of interference, or causes weak interference) for the terminal device 2. The second subframe set may be constituted from subframes each of which is a large interference source (more precisely, causes a large amount of interference, or causes high interference) for the terminal device 2. At this point, the subframe that is a small interference source is a subframe in which the downlink subframe and the uplink subframe are not configured to be the same subframes. Furthermore, the subframe that is a large interference source is a subframe in which the downlink subframe and the uplink subframe are configured to be the same subframes. The subframe that is a large interference source is a subframe on which an uplink signal that is transmitted from a different terminal device 2 can be an interference source when the terminal device 2 receives a downlink signal, and is subframe on which a downlink signal that is transmitted from a different base station apparatus can be an interference source when the base station apparatus 1 receives an uplink signal.

Moreover, according to the embodiment of the present invention, the same RSRP and path loss value may be applied as is the case with the first power control and the second power control. Received power measurement control may be shared among the downlink subframes that are included in two subframe sets. Furthermore, the path loss measurement may be performed independently for every subframe set. Furthermore, the path loss measurement may be performed for every downlink subframe that is included in the subframe set. Furthermore, a reference signal (a path loss reference resource) for the path loss measurement for the first subframe set may be a CRS and a reference signal for the path loss measurement for the second subframe set may be a CSI-RS. More precisely, the reference signal for the path loss measurement may be configured for every subframe set. Furthermore, a path loss value that is measured independently may be applied to the power that is controlled independently for every subframe set. Furthermore, for the path loss reference resource, a type of reference signal for the path loss measurement and a configuration of a resource (a time frequency resource, a resource element, or a subframe) for the reference signal for the path loss measurement may be indicated.

Moreover, according to the embodiment of the present invention, in a case where the transmission of the PUSCH and the PUCCH on the flexible subframe takes place, if a sum of these transmit powers exceeds the maximum output power that is configured for the terminal device 2, a maximum value of the transmit power for the PUSCH may be a value that results from subtracting the transmit power for the PUCCH from the maximum output power.

Moreover, according to the embodiment of the present invention, although a power parameter is common to multiple power control methods, this poses no problem. More precisely, some of the parameters may be common to the multiple power control methods. For example, a parameter that is set only for the configuration of the parameter relating to the first power control can be used in the second power control method and the third power control method when the need arises.

Furthermore, according to the embodiment of the present invention, in a case where on a subframe for which a resource for the PUCCH format 3 is configured, multiple-times CSI reporting takes place, the terminal device 2 may perform the multiple-times CSI reporting in the PUCCH format 3.

Furthermore, according to the embodiment of the present invention, in a case where on a certain subframe, multiple-times CSI reporting takes place, if on a certain subframe, the resource for the PUCCH format 3 is not configured, the terminal device 2 may drop the multiple-times CSI reporting.

Furthermore, according to the embodiment of the present invention, in the case where on a certain subframe, multiple-times CSI reporting takes place, if on a certain subframe, the resource for the PUCCH format 3 is configured and the transmission of the PUSCH takes place, the terminal device 2 may perform the multiple-times CSI reporting on the PUSCH.

Furthermore, according to the embodiment of the present invention, the base station apparatus 1 may control the terminal device 2 in such a manner that the uplink signal is transmitted on the uplink subframe that collides with the downlink subframe and on the uplink subframe that does not collide with the downlink subframe, using an uplink index.

The accumulation transmit power control may be shared between the two subframe sets. The accumulation may be in common use without depending on the subframe set.

Moreover, according to the embodiment of the present invention, the TPC command (TPC command for (scheduled) PUSCH) for the PUSCH that is used in the first power control method is set for the DCI format 0/4 or the DCI format 3/3A, and the TPC command for the PUSCH that is used in the second power control method is set for the DCI format 0/4. Furthermore, the TPC command (TPC command for PUCCH) for the PUCCH that is used in the first power control method is set for the DCI format 1/1A/1B/1D/2/2A/2B/2C/2D/3/3A, and the TPC command for the PUCCH that is used in the second power control method is set, for example, for the DCI format 1/1A/1B/1D/2/2A/2B/2C/2D.

Furthermore, although the same TPC command is present, switching between corresponding to the first power control method and corresponding to the second power control method may be performed depending on which subframe set the uplink subframe on which the uplink signal to which the detected TPC command corresponds is transmitted is included in.

Furthermore, the accumulation control may be performed independently in a case where the TPC command that is set for the DCI format 0 corresponds to the uplink subframe that is included in the first subframe set, and in a case where the TPC command that is set for the DCI format 0 corresponds to the uplink subframe that is included in the second subframe set. For example, in a case where the DCI format 0 and the DCI format 3 are detected on the same subframe, when it is assumed that the DCI format 0 schedules the uplink signal for the uplink subframe which is included in the first subframe set, the terminal device 2 sets an uplink power based on the TPC command that is set for the DCI format 0. Furthermore, when it is assumed that the DCI format 0 schedules the uplink signal for the uplink subframe which is included in the second subframe set, the terminal device 2 sets the uplink power based on the TPC command that is set for the DCI format 0. Moreover, the transmit power for the uplink signal that corresponds to the uplink subframe which is included in the first subframe set is set based on the TPC command that is set for the DCI format 3. More precisely, when the first configuration and the second configuration are set, the subframe set and the DCI format may be associated with each other.

A result of RSRP measurement may be shared between the two subframe sets. The RSRP may be in common use without depending on the subframe set.

Furthermore, the accumulation transmit power control may be performed independently with the subframe set. The accumulation by the TPC command that is received on the fixed subframe and the accumulation by the TPC command that is received on the flexible subframe are controlled independently.

For example, in the case where the first configuration and the second configuration are set, the accumulation transmit power control (the closed-loop transmit power control) may be performed independently for every subframe set.

In a case where the accumulation transmit power control is performed for every subframe set, the timing at which the DCI format that includes each TPC command field is received may be defined in advance.

Furthermore, the result of the RSRP measurement may be independent with the subframe set. The measurement control of the RSRP by the CRS that is received on the downlink subframe that is the fixed subframe and of the RSRP by the CRS that is received on the flexible subframe may be performed independently.

In a case where the two subframe sets are configured based on the first configuration and the second configuration, when it is assumed that the second subframe set is the subframe pattern of the flexible subframe, the second configuration may be information that indicates the subframe on which the DCI format that includes the TPC command field for the flexible subframe is receivable.

Each of the subframe on which the TPC command that is applicable to the uplink subframe which is included in the first subframe set is transmitted and the subframe on which the TPC command that is applicable to the uplink subframe which is included in the second subframe set is transmitted may be configured. Correspondence (mapping or association) between an uplink subframe and a downlink subframe on which the DCI format that includes the TPC command for the uplink subframe is transmitted may be managed using a table.

Moreover, according to the embodiment of the present invention, the first configuration and/or the second configuration may be information that indicates a period for switching between the uplink and the downlink and a configuration of each subframe.

Moreover, according to the embodiment of the present invention, the transmit power control for the uplink signal and/or the downlink signal may be performed on a flexible subframe and a subframe other than the flexible subframe.

Moreover, according to the embodiment of the present invention, in the case where both of the first configuration and the second configuration are set, the terminal device 2 may not transmit the first uplink reference signal (for example, the P-SRS) to a cell (a serving cell) for which the first configuration is set. Furthermore, according to the embodiment of the present invention, in the case where both of the first configuration and the second configuration are set, the terminal device 2 may not transmit the uplink reference signal for which a specific transmission subframe is configured by the higher layer.

Moreover, according to the embodiment of the present invention, the resource element or the resource block is described as being used as a mapping unit for various uplink signals or downlink signals and the symbol, the subframe, or the radio frame is described as being used as a communication unit for the time direction, but no limitation to this is imposed. Although, instead of these, domain and time units are used that are constituted from an arbitrary frequency and time, respectively, the same effect can be obtained. Moreover, according to the embodiment of the present invention, the case where the demodulation is performed using the RS that is processed in a precoded manner is described, and a port that is equivalent to a MIMO layer is described as being used as a port corresponding to the RS that is processed in a precoded manner, but no limitation to this is imposed. In addition, the same effect can be obtained by applying the present invention to ports that correspond to different reference signals, respectively. For example, a unprecoded (non-precoded) RS can be used instead of a precoded RS, and, as the port, a port that is equivalent to an output terminal that is available after the precoding processing, or a port that is equivalent to a physical antenna (or a combination of physical antennas) can be used.

Moreover, according to the embodiment of the present invention, the accumulated transmit power control (accumulation) by the TPC command or the absolute transmit power control (absolute) may be performed.

Moreover, according to the embodiment of the present invention, the uplink transmit power control is power control for the uplink physical channel/physical signal (the PUSCH, the PUCCH, the PRACH, the SRS, the DMRS, or the like), and the power control includes pieces of information relating to switching or (re-) configuring of various parameters that are used in the configuration of the power for various uplink physical channels. Furthermore, the downlink transmit power control is power control for the downlink physical channel/physical signal (the CRS, the UERS (DL DMRS), the CSI-RS, the PDSCH, the PDCCH/EPDCCH, the PBCH, the PSS/SSS, the PMCH, the PRS, or the like), and the power control includes pieces of information relating to switching between or (re-) configuring of various parameters that are used in the configuration of the power for various downlink physical channels.

Moreover, according to the embodiment of the present invention, the transmission of the DCI format also means that various pieces of downlink control information that are set being associated with the DCI format are transmitted using the radio resource that is set for the PDCCH/EPDCCH. More precisely, the transmission of the DCI format also means that the base station apparatus 1 transmits the downlink control information, on the PDCCH/EPDCCH.

Moreover, according to the embodiment of the present invention, the base station apparatus 1 may be able to configure multiple virtual cell IDs for one terminal device 2. For example, the base station apparatus 1 and a network that include at least one base station apparatus 1 may be able to configure the virtual cell ID independently for every physical channel/physical signal. Furthermore, multiple virtual cell IDs may be able to be configured for one physical channel/physical signal. More precisely, the virtual cell ID may be set for every configuration of a parameter relating to each physical channel/physical signal. Furthermore, the virtual cell ID may be shared among the multiple physical channels/physical signals.

According to the embodiment of the present invention, a subframe pattern (measSubframePatternPCell) for primary cell measurement, such as RSRP/RSRQ/radio link monitoring, a subframe pattern (csi-measSubframeSet1 or csi-measSubframeSet2) for measuring the CSI, and a subframe pattern (epdcch-SubframePattern) for monitoring the EPDCCH are configured for the primary cell.

According to the embodiment of the present invention, a subframe pattern (epdcch-SubframePattern) for monitoring the EPDCCH is configured for the secondary cell.

According to the embodiment of the present invention, a subframe pattern (measSubframePatternNeigh) for measuring the RSRP and the RSRQ in the carrier frequency is configured for an adjacent cell.

According to the embodiment of the present invention, the subframe pattern (csi-measSubframeSet1 or csi-measSubframeSet2) for measuring the CSI may be common to the primary cell and the secondary cell.

According to the embodiment of the present invention, the subframe pattern may be configured independently in the FDD and the TDD. For example, in the FDD, the subframe pattern may be expressed as a bit stream of 40 bits, and in the TDD, the subframe pattern may be expressed as a bit stream of 20 bits in subframe configurations (the TDD UL/DL configurations) 1 to 5, as a bit stream of 70 bits in a subframe configuration 0, and as a bit stream of 60 bits in a subframe configuration 6. An initial bit or a leftmost bit in these bit streams corresponds to subframe #0 of a radio frame that satisfies a system frame number (SFN) mod x=0. In the bit stream, a subframe for which "1" is set is used. For example, in a case where the subframe pattern is expressed as "1011000011" in a bit stream of 10 bits, subframes #0, #2, #3, #8, and #9 are used.

According to the embodiment of the present invention, the TDD UL/DL configuration is transmitted (notified or transferred) from the base station apparatus 1 to the terminal device 2. Furthermore, the TDD UL/DL configuration may be notified with the SIB1. Furthermore, the TDD UL/DL configuration may be notified with the higher layer signaling (the RRC signaling or the RRC message). The base station apparatus 1 may notify the terminal device 2 that performs the communication using multiple TDD UL/DL configurations, of the TDD UL/DL configuration with the L1 signaling or the L2 signaling.

According to the embodiment of the present invention, in one cell, in the case where the multiple TDD UL/DL configurations are set, one is used as an uplink reference, and another one is used as a downlink reference. The TDD UL/DL configuration that is configured as the uplink reference is used to perform processing relating to the uplink transmission/reception, such as the timing of the transmission of the PUSCH, the timing of the reception of the PHICH for the PUSCH, or the timing of the reception of the uplink grant. Furthermore, the TDD UL/DL configuration that is configured as the downlink reference is used to perform processing relating to the downlink transmission/reception, such as the timing (monitoring) of the reception of the PDCCH/EPDCCH/PDSCH, the timing of the reception of the downlink grant, or the timing of the transmission of the PUCCH that is accompanied by the HARQ-ACK.

According to the embodiment of the present invention, in a case where multiple TDD UL/DL configurations (UL/DL configurations) are set for the primary cell, each subframe pattern in the primary cell may be determined based on the TDD UL/DL configuration that is notified with the SIB1. Furthermore, each subframe pattern in the primary cell may be determined based on the TDD UL/DL configuration that is notified with the higher layer signaling (the RRC signaling or the RRC message). Furthermore, each subframe pattern in the primary cell may be determined based on the TDD UL/DL configuration that is notified with the L1 signaling (the downlink grant, the uplink grant, the PDCCH/EPDCCH, or the DCI format). Furthermore, each subframe pattern in the primary cell may be determined based on the TDD UL/DL configuration that is notified with the L2 signaling (the MAC CE). Furthermore, each subframe pattern in the primary cell may be determined based on the TDD UL/DL configuration (an uplink reference UL/DL configuration) that is used as the uplink reference. Furthermore, each subframe pattern in the primary cell may be determined based on the TDD UL/DL configuration (a downlink reference UL/DL configuration) that is used as the downlink reference. Furthermore, each subframe pattern in the primary cell may be determined based on the common TDD UL/DL configuration. Furthermore, each subframe in the primary cell may be determined independently. For example, the subframe pattern for the primary cell measurement may be determined based on the TDD UL/DL configuration that is notified with the SIB1, and the subframe pattern for monitoring the EPDCCH may be determined based on the TDD UL/DL configuration that is notified with the higher layer signaling (the RRC signaling or the RRC message). The subframe pattern for the primary cell measurement may be determined based on the TDD UL/DL configuration that is notified with the SIB1, and the subframe pattern for measuring the CSI may be determined based on the L1 signaling. Specifically, the subframe pattern for the primary cell measurement may be based on a bit stream that corresponds to subframe configuration (the TDD UL/DL configuration) 0, the subframe pattern for monitoring the EPDCCH may be based on a subframe configuration (the TDD UL/DL configuration) 3, and the subframe pattern for measuring the CSI may be based on the subframe configuration (the TDD UL/DL configuration) 6. Moreover, a value of the subframe configuration (the TDD UL/DL configuration) is one example, and a different value of the subframe configuration may be available.

According to the embodiment of the present invention, in a case where multiple TDD UL/DL configurations (UL/DL configurations) are set for the secondary cell, a subframe pattern in the secondary cell may be determined based on the TDD UL/DL configuration that is notified with the system information for the secondary cell. Furthermore, the subframe pattern in the secondary cell may be determined based on the TDD UL/DL configuration that is notified with the higher layer signaling (the RRC signaling or the RRC message). Furthermore, the subframe pattern in the secondary cell may be determined based on the TDD UL/DL configuration that is notified with the L1 signaling (the downlink grant, the uplink grant, the PDCCH/EPDCCH, or the DCI format). Furthermore, the subframe pattern in the secondary cell may be determined based on the TDD UL/DL configuration that is notified with the L2 signaling (the MAC CE). Furthermore, the subframe pattern in the secondary cell may be determined based on the TDD UL/DL configuration (the uplink reference UL/DL configuration) that is configured as the uplink reference. Furthermore, the subframe pattern in the secondary cell may be determined based on the TDD UL/DL configuration (the downlink reference UL/DL configuration) that is configured as the downlink reference. Moreover, in a case where the subframe pattern for measuring the CSI is configured independently of the primary cell, the subframe pattern for measuring the CSI in the secondary cell may be determined independently of the primary cell.

According to the embodiment of the present invention, in a case where multiple TDD UL/DL configurations (UL/DL configurations) are set for each of the primary cell and the second cell, each subframe pattern in each of the primary cell and the secondary cell may be determined based on the common TDD UL/DL configuration. For example, the TDD UL/DL configuration that is notified with the SIB1 may be available. The TDD UL/DL configuration that is notified with the higher layer signaling may be available. The TDD UL/DL configuration that is notified with the L1/L2 signaling may be available. The TDD UL/DL configuration (the uplink reference UL/DL configuration) that is configured as the uplink reference may be available. The TDD UL/DL configuration (the downlink reference UL/DL configuration) that is configured as the downlink reference may be available. Furthermore, each subframe pattern in each of the primary cell and the secondary cell may be determined independently. For example, the subframe pattern in the primary cell may be determined based on the TDD UL/DL configuration that is notified with the SIB1, and the subframe pattern in the secondary cell may be determined based on the TDD UL/DL configuration that is notified with the L1/L2 signaling. Furthermore, the subframe pattern in the primary cell may be based on the TDD UL/DL configuration that is configured as the uplink reference, and the subframe pattern in the secondary cell may be based on the TDD UL/DL configuration that is configured as the downlink reference.

According to the embodiment of the present invention, in the case where multiple TDD UL/DL configurations (UL/DL configurations) are set for each of the primary cell and the second cell, the uplink reference UL/DL configuration of the primary cell may be notified with the SIB1 (or system information other than the SIB1). Furthermore, the uplink reference UL/DL configuration of the primary cell may be notified with the higher layer signaling (the RRC signaling or the RRC message). Furthermore, the uplink reference UL/DL configuration of the primary cell may be notified with the higher layer signaling (the RRC signaling or the RRC message) that is common/dedicated to the terminal devices. The uplink reference UL/DL configuration of the primary cell may be notified with the L1/L2 signaling. The downlink reference UL/DL configuration of the primary cell may be notified with the same method as indicated with the uplink reference UL/DL configuration of the primary cell. Furthermore, the uplink reference UL/DL configuration and the downlink reference UL/DL configuration of the primary cell may be configured as independent parameters.

According to the embodiment of the present invention, in the case where multiple TDD UL/DL configurations (UL/DL configurations) are set for each of the primary cell and the second cell, the uplink reference UL/DL configuration may be notified with the higher layer signaling (the RRC signaling or the RRC message) that is equivalent to the system information. Furthermore, the uplink reference UL/DL configuration of the secondary cell may be notified with the higher layer signaling (the RRC signaling and the RRC message) that is not equivalent to the system information and that is common/dedicated to the terminal devices. The uplink reference UL/DL configuration of the secondary cell may be notified with the L1/L2 signaling. The downlink reference UL/DL configuration of the secondary cell may be notified with the same method as indicated with the uplink reference UL/DL configuration of the secondary cell. Furthermore, the uplink reference UL/DL configuration and the downlink reference UL/DL of the secondary cell may be configured as independent parameters.

According to the embodiment of the present invention, the downlink reference UL/DL configuration (the TDD UL/DL configuration) for the serving cell is determined based on the TDD UL/DL configuration of the primary cell and the TDD UL/DL configuration of the secondary cell.

According to the embodiment of the present invention, in the case where multiple TDD UL/DL configurations (UL/DL configurations) are set for each of the primary cell and the second cell, the downlink reference UL/DL configuration for the serving cell may be determined with the TDD UL/DL configuration notified with the SIB1 being for the primary cell and with the TDD UL/DL configuration notified with the higher layer signaling being for the secondary cell. The downlink reference UL/DL configuration for the serving cell may be determined with the UL/DL configuration of the primary cell as the TDD UL/DL configuration notified with the SIB1 and with the UL/DL configuration of the secondary cell as the TDD UL/DL configuration notified with the L1 signaling. Furthermore, the downlink reference UL/DL configuration for the serving cell may be determined with the UL/DL configuration of the primary cell as the downlink reference UL/DL configuration and with the UL/DL configuration of the secondary cell as the downlink reference UL/DL configuration. Furthermore, the downlink reference UL/DL configuration for the serving cell may be determined with the UL/DL configuration of the primary cell as the downlink reference UL/DL configuration and with the UL/DL configuration of the secondary cell as the uplink reference TDD UL/DL configuration. Furthermore, the downlink reference UL/DL configuration for the serving cell may be determined with the UL/DL configuration of the primary cell as the uplink reference TDD UL/DL configuration and with the UL/DL configuration of the secondary cell as the downlink reference TDD UL/DL configuration. The UL/DL configurations of the primary cell and the secondary cell are one example and, under other conditions, the TDD UL/DL configuration that is notified may be available.

According to the embodiment of the present invention, the uplink reference UL/DL configuration (the TDD UL/DL configuration) for the serving cell is determined based on the TDD UL/DL configuration of a certain serving cell and the TDD UL/DL configuration of a different serving cell.

According to the embodiment of the present invention, in a case where multiple TDD UL/DL configurations (UL/DL configurations) are set for each of the multiple serving cell, the uplink reference UL/DL configuration for the serving cell may be determined with the TDD UL/DL configuration notified with the SIB1 being for a certain serving cell and with the TDD UL/DL configuration notified with the higher layer signaling being for a different serving cell. Furthermore, the uplink reference UL/DL configuration for the serving cell may be determined with the UL/DL configuration of a certain serving cell as the TDD UL/DL configuration notified with the SIB1 and with the UL/DL configuration of a different serving cell as the TDD UL/DL configuration notified with the L1 signaling. Furthermore, the uplink reference UL/DL configuration for the serving cell may be determined with the UL/DL configuration of a certain serving cell as the uplink reference UL/DL configuration and with the UL/DL configuration of a different serving cell as the uplink reference UL/DL configuration. Furthermore, the uplink reference UL/DL configuration for the serving cell may be determined with the UL/DL configuration of a certain serving cell as the uplink reference UL/DL configuration and with the UL/DL configuration of a different serving cell as the downlink reference UL/DL configuration. Furthermore, the TDD UL/DL configuration in the multiple serving cells is one example, and the TDD UL/DL configuration that is configured under other conditions may be available.

According to the embodiment of the present invention, in a case where multiple TDD UL/DL configurations (the UL/DL configurations) are set for each of the multiple serving cells (the primary cell and the secondary cell) and where cross carrier scheduling is performed, downlink transmission/reception processing in the primary cell may be performed based on the UL/DL configuration for the serving cell. Furthermore, uplink transmission/reception processing in the primary cell is performed based on the uplink reference UL/DL configuration for the serving cell. In this case, in the primary cell, if it is assumed that the downlink grant for the secondary cell is detected, downlink reception (PDSCH reception) of the secondary cell is performed based on the downlink reference UL/DL configuration for the serving cell. Furthermore, the HARQ-ACK for the downlink reception of the secondary cell is transmitted on the PUCCH of the primary cell. At this time, the transmission of the PUCCH is performed based on the downlink reference UL/DL configuration for the serving cell. Furthermore, in this case, in the primary cell, if it is assumed that the uplink grant for the secondary cell is detected, uplink reception (the PUSCH transmission) of the secondary cell is performed based on the uplink reference UL/DL configuration for the serving cell. The PHICH for the uplink transmission of the secondary cell is transmitted in the primary cell. At this time, the transmission of the PHICH is performed based on the uplink reference UL/DL configuration for the serving cell. That is, in this case, the terminal device 2 and the base station apparatus 1 performs transmission/reception for the uplink/downlink based on the uplink reference UL/DL configuration and the downlink reference UL/DL configuration. Furthermore, in this case, with respect to the PUSCH transmission (for the serving cell c or a cell different from the serving cell c) that is scheduled from the serving cell c on the subframe n, the terminal device 2 is determined with a PHICH resource for the serving cell c on a subframe $n+k_{PHICH}$. $K_{PHICH}$ is determined based on the uplink reference UL/DL configuration for the serving cell. In this case, if the PUSCH (for the serving cell c or a cell different from the serving cell c) that is scheduled, on the subframe n, from the serving cell c is received, the base station apparatus 1 transmits the HARQ-ACK for the PUSCH using the PHICH resource for the serving cell c on the subframe $n+k_{PHICH}$.

At this point, when it comes to the cross carrier scheduling, the uplink grant (the DCI format associated with the uplink) or the downlink grant (the DCI format associated with the downlink grant) is transmitted in a certain cell, with a carrier indicator field (CIF) being included in the uplink grant or the downlink grant, and thus the uplink grant or the downlink grant to different cells can be transmitted. More precisely, the uplink/downlink transmission to multiple cells can be controlled in one cell using the DCI format in which the CIF is included.

According to the embodiment of the present invention, in a case where multiple TDD UL/DL configurations (UL/DL configurations) are set for an adjacent secondary cell, a subframe pattern in the adjacent cell may be determined based on the TDD UL/DL configuration that is notified with the system information for the adjacent cell. Furthermore, the subframe pattern in the adjacent cell may be determined based on the TDD UL/DL configuration that is notified with the higher layer signaling (the RRC signaling or the RRC message). Furthermore, the subframe pattern in the adjacent cell may be determined based on the TDD UL/DL configuration that is notified with the higher layer signaling (the RRC signaling or the RRC message) that is common/dedicated to the terminal device. Furthermore, the subframe pattern in the adjacent cell may be determined based on the TDD UL/DL configuration that is notified with the L1 signaling (the downlink grant, the uplink grant, the PDCCH/EPDCCH, or the DCI format). Furthermore, the subframe pattern in the adjacent cell may be determined based on the TDD UL/DL configuration that is notified with the L2 signaling (the MAC CE). Furthermore, the subframe pattern in the adjacent cell may be determined based on the TDD UL/DL configuration (the uplink reference UL/DL configuration) that is configured as the uplink reference. Furthermore, the subframe pattern in the adjacent cell may be determined based on the TDD UL/DL configuration (the downlink reference UL/DL configuration) that is configured as the downlink reference.

According to the present invention, the uplink power control has been described so far, but the downlink power control may also be controlled in the same manner.

According to the present invention, the uplink power control has been described so far, but downlink channel estimation communication may also be controlled in the same manner. Furthermore, the present invention may be applied to control of channel state information reporting. The present invention may be applied to control of the received power measurement. According to the present invention, the downlink power control may also be controlled in the same manner.

Moreover, according to the embodiment of the present invention, for example, the setting of the power includes setting a value of the power, the calculating of the power includes calculating the value of the power, the measuring of the power includes measuring the value of the power, and the reporting of the power includes reporting the value of the power. In this manner, the term power includes the meaning of a suitable power value as well.

Moreover, according to the embodiment of the present invention, for example, the calculating of the path loss includes calculating a value of the path loss. In this manner, the expression path loss includes the meaning of a value of a suitable path loss as well.

Moreover, according to the embodiment of the present invention, the configuring of various parameters includes configuring of various values of various parameters. In this manner, the expression various parameter includes the meaning of values of various suitable parameters as well.

A program running on the base station apparatus 1 and the terminal device 2 according to the present invention is a program (a program that causes a computer to operate) that controls a CPU and the like in such a manner as to realize the functions according to the embodiments of the present invention, which are described above. Then, pieces of information that are handled in the apparatus and the device are temporarily accumulated in a RAM while being processed. Thereafter, the pieces of information are stored in various ROMs or HDDs, and when the need arises, is read by the CPU to be modified or written. As a recording medium on which to store the program, of a semiconductor medium (for example, a ROM, a nonvolatile memory card, or the like), an optical storage medium (for example, a DVD, an MO, an MD, a CD, a BD, or the like), a magnetic storage medium (for example, a magnetic tape, a flexible disk, or the like), and the like, any one may be available. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where programs are distributed on the market, the programs, each of which is stored on a portable recording medium, can be distributed, or the program can be transmitted to a server computer that is connected through a network such as the Internet. In this case, a storage device of the server computer is also included in the present invention. Furthermore, some or all portions of the base station apparatus 1 and the terminal device 2 according to the embodiments described above may be realized as an LSI that is a typical integrated circuit. Each functional block of the base station apparatus 1 and the terminal device 2 may be individually built into a chip, and some or all functional blocks may be integrated into a chip. Furthermore, a technique for the integrated circuit is not limited to an LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

The embodiments of the invention are described in detail above referring to the drawings, but the specific configuration is not limited to the embodiments and also includes an amendment to a design and the like that fall within the scope that does not depart from the gist of the present invention. Furthermore, various modifications are possible within the scope of the present invention defined by claims, and embodiments that are made by suitably combining technical means that are disclosed according to the different embodiments are also included in the technical scope of the present invention. Furthermore, a configuration in which a constituent element that achieves the same effect is substituted for the one that is described according to the embodiment of the present invention is also included in the technical scope of the present invention.

Moreover, the invention in the present application is not limited to the embodiments described above. Furthermore, application of the terminal device according to the invention in the present application is not limited to the mobile station. It goes without saying that the terminal device can be applied to a stationary-type electronic apparatus that is installed indoors or outdoors, or a non-movable-type electronic apparatus, for example, an AV apparatus, a kitchen apparatus, a cleaning or washing machine, an air conditioner, office equipment, a vending machine, and other household apparatuses. Furthermore, the present invention is suitable for use in a wireless base station apparatus, a wireless terminal device, a wireless communication system, or a wireless communication method.

The present invention as described above may have the following features.

(1) According to an aspect of the present invention, there is provided a terminal device that communicates with a base station apparatus, the terminal device including: a reception unit that receives first information relating to a configuration of enhanced interference management and traffic adaptation (eIMTA) and second information relating to a channel state information (CSI) subframe set, through higher layer signaling; and a transmission unit that drops a CSI report which uses a physical uplink control channel (PUCCH) considering priorities among subframe sets in a case where, in the second information, a first CSI subframe set and a second CSI subframe set are configured.

(2) According to the aspect of the present invention, in the terminal device described above, the transmission unit drops a CSI report that corresponds to the second CSI subframe set, if PUCCH reporting types have the same priority, in a case where at least one CSI report among multiple CSI reports that collide with one another on a certain subframe corresponds to each of the first CSI subframe set and the second CSI subframe set.

(3) According to the aspect of the present invention, in the terminal device described above, the transmission unit drops a CSI report that corresponds to the second CSI subframe set, in a case where multiple CSI reports that collide with one another on a certain subframe are PUCCH reporting types on the same serving cell, which have the same priority.

(4) According to the aspect of the present invention, in the terminal device described above, the transmission unit transmits a hybrid automatic repeat request-acknowledgement (HARQ-ACK) that corresponds to a subframe which belongs to the first CSI subframe set and an HARQ-ACK that corresponds to a subframe which belongs to the second CSI subframe set, in a PUCCH format 3, if it is assumed that an HARQ-ACK is transmitted on a certain subframe, in a case where the PUCCH format 3 is configured.

(5) According to another aspect of the present invention, there is provided a base station apparatus that communicates with a terminal device, the base station apparatus including: a transmission unit that transmits first information relating to a configuration of enhanced interference management and traffic adaptation (eIMTA) and second information relating to a channel state information (CSI) subframe set, through higher layer signaling; and a reception unit that receives a CSI report which corresponds to a first CSI subframe set and a CSI report which corresponds to a second CSI subframe set, in a case where the first information is configured and where the first CSI subframe set and the second CSI subframe set are configured based on the second information.

(6) According to the aspect of the present invention, in the base station apparatus described above, the transmission unit configures a resource for a PUCCH format 3 in a case where a hybrid automatic repeat request-acknowledgement (HARQ-ACK) that corresponds to a subframe which belongs to the first CSI subframe set and an HARQ-ACK that corresponds to a subframe which belongs to the second CSI subframe set are received through the same physical uplink control channel (PUCCH).

(7) According to still another aspect of the present invention, there is provided a method for use in a terminal device that communicates with a base station apparatus, the method including: a step of receiving first information relating to a configuration of enhanced interference management and traffic adaptation (eIMTA) and second information relating to a channel state information (CSI) subframe set, through higher layer signaling; and a step of dropping a CSI report which uses a physical uplink control channel (PUCCH) considering priorities among subframe sets in a case where, in the second information, a first CSI subframe set and a second CSI subframe set are configured.

(8) According to the aspect of the present invention, the method described above further includes a step of transmitting a hybrid automatic repeat request-acknowledgement (HARQ-ACK) that corresponds to a subframe which belongs to the first CSI subframe set and an HARQ-ACK that corresponds to a subframe which belongs to the second CSI subframe set, in a PUCCH format 3, if it is assumed that an HARQ-ACK is transmitted on a certain subframe, in a case where the PUCCH format 3 is configured.

(9) According to still another aspect of the present invention, there is provided a method for use in a base station apparatus that communicates with a terminal device, the method including: a step of transmitting first information relating to a configuration of enhanced interference management and traffic adaptation (eIMTA) and second information relating to a channel state information (CSI) subframe set, through higher layer signaling; and a step of receiving a CSI report which corresponds to a first CSI subframe set and a CSI report which corresponds to a second CSI subframe set, in a case where the first information is configured and where the first CSI subframe set and the second CSI subframe set are configured based on the second information.

(10) According to the aspect of the present invention, the method described above further includes a step of configuring a resource for a PUCCH format 3 in a case where a hybrid automatic repeat request-acknowledgement (HARQ-ACK) that corresponds to a subframe which belongs to the first CSI subframe set and an HARQ-ACK that corresponds to a subframe which belongs to the second CSI subframe set are received through the same physical uplink control channel (PUCCH).

Accordingly, suitable transmission control can be performed.

INDUSTRIAL APPLICABILITY

The present invention can be applied to a mobile phone, a personal computer, a tablet-type computer, and the like.

REFERENCE SIGNS LIST

1 BASE STATION APPARATUS
2 TERMINAL DEVICE
101 HIGHER LAYER PROCESSING UNIT
103 CONTROL UNIT
105 RECEPTION UNIT
107 TRANSMISSION UNIT
109 CHANNEL MEASUREMENT UNIT
111 TRANSMIT AND RECEIVE ANTENNA
1051 DECODING UNIT
1053 DEMODULATION UNIT
1055 DEMULTIPLEXING UNIT
1057 WIRELESS RECEPTION UNIT
1071 CODING UNIT
1073 MODULATION UNIT
1075 MULTIPLEXING UNIT
1077 WIRELESS TRANSMISSION UNIT
1079 DOWNLINK REFERENCE SIGNAL GENERATION UNIT
201 HIGHER LAYER PROCESSING UNIT
203 CONTROL UNIT
205 RECEPTION UNIT
207 TRANSMISSION UNIT
209 CHANNEL MEASUREMENT UNIT
211 TRANSMIT AND RECEIVE ANTENNA
2051 DECODING UNIT
2053 DEMODULATION UNIT
2055 DEMULTIPLEXING UNIT
2057 WIRELESS RECEPTION UNIT
2071 CODING UNIT
2073 MODULATION UNIT
2075 MULTIPLEXING UNIT
2077 WIRELESS TRANSMISSION UNIT
2079 UPLINK REFERENCE SIGNAL GENERATION UNIT

The invention claimed is:
1. A terminal device comprising:
a receiver configured to receive first information relating to a configuration of enhanced interference management and traffic adaptation (eIMTA) and second information relating to one or more channel state information (CSI) subframe sets; and
a transmitter configured to:
transmit a first CSI report, the terminal device being configured in any one of transmission modes 1 to 9; and
drop a second CSI report corresponding to a second CSI subframe set in a case that (i) a first CSI subframe set and the second CSI subframe set are configured based on the second information and (ii) multiple CSI reports of a same serving cell collide with each other, the multiple CSI reports having a same priority, wherein
the first CSI subframe set and the second CSI subframe set are indicated by parameters of third information included in the second information, and the third information is a subframe pattern for CSI measurement.
2. The terminal device according to claim 1, wherein
the transmitter is configured to drop the second CSI report corresponding to the second CSI subframe set, in a case that reporting types of a Physical Uplink Control Channel (PUCCH) have a same priority and a third CSI report corresponding to the first CSI subframe set and the second CSI report corresponding to the second CSI subframe set are collided in a certain subframe.
3. The terminal device according to claim 1, wherein
the transmitter is configured to transmit, using a PUCCH format 3, a hybrid automatic repeat request-acknowledgement (HARQ-ACK) that corresponds to a subframe belonging to the first CSI subframe set and a subframe belonging to the second CSI subframe set in a case that the PUCCH format 3 is configured.
4. A base station apparatus comprising:
a transmitter configured to transmit first information relating to a configuration of enhanced interference management and traffic adaptation (eIMTA) and second information relating to one or more channel state information (CSI) subframe sets by a higher layer signal; and
a receiver configured to:
receive a first CSI report from a terminal device configured in any one of transmission modes 1 to 9; and
receive the first CSI report corresponding to a first CSI subframe set, in a case that (i) the first CSI subframe set and a second CSI subframe set are configured based on the second information and (ii) multiple CSI reports of a same serving cell collide with each other, the multiple CSI reports having a same priority, wherein
the first CSI subframe set and the second CSI subframe set are indicated by parameters of third information included in the second information, and the third information is a subframe pattern for CSI measurement.
5. A method in a terminal device, the method comprising:
receiving first information relating to a configuration of enhanced interference management and traffic adaptation (eIMTA) and second information relating to pattern of one or more channel state information (CSI) subframe sets;
transmitting a first CSI report, wherein the terminal device is configured in any one of transmission modes 1 to 9; and
dropping a second CSI report corresponding to a second CSI subframe set in a case that (i) a first CSI subframe set and the second CSI subframe set are configured based on the second information and (ii) multiple CSI reports of a same serving cell collide with each other, the multiple CSI reports having a same priority, wherein the first CSI subframe set and the second CSI subframe set are indicated by parameters of third information included in the second information, and the third information is a subframe pattern for CSI measurement.

6. The method according to claim 5, wherein dropping the second CSI report corresponding to the second CSI subframe set, in a case that reporting types of a PUCCH have a same priority and a third CSI report corresponding to the first CSI subframe set and the second CSI report corresponding to the second CSI subframe set are collided in a certain subframe.

* * * * *